(12) United States Patent
Hori et al.

(10) Patent No.: US 6,950,984 B2
(45) Date of Patent: Sep. 27, 2005

(54) METHOD, SYSTEM FOR, AND PROGRAM PRODUCT FOR GENERATING A DISPLAY RULE FOR A STRUCTURED DOCUMENT, AND FOR CHANGING A STRUCTURED DOCUMENT AND ITS DOCUMENT TYPE DEFINITION

(75) Inventors: Masahiro Hori, Yamato (JP); Goh Kondoh, Yamato (JP); Teruo Koyanagi, Yamato (JP); Kohichi Ono, Yamato (JP)

(73) Assignee: International Business Machines Corp, Armonk, NY (US)

( * ) Notice: Subject to any disclaimer, the term of this patent is extended or adjusted under 35 U.S.C. 154(b) by 668 days.

(21) Appl. No.: 09/791,943

(22) Filed: Feb. 23, 2001

(65) Prior Publication Data

US 2001/0018696 A1 Aug. 30, 2001

(30) Foreign Application Priority Data

Feb. 23, 2000 (JP) .................................... 2000-045466

(51) Int. Cl.$^7$ ........................ G06F 17/00; G06F 15/00
(52) U.S. Cl. ................. 715/513; 715/500; 715/501.1; 715/511; 715/514; 715/515; 715/516; 715/517
(58) Field of Search .......................... 715/500, 501.1, 715/511, 513, 514, 515, 516, 517

(56) References Cited

U.S. PATENT DOCUMENTS 6,006,242 A * 12/1999 Poole et al. ................. 715/531
6,012,098 A * 1/2000 Bayeh et al. ................ 709/246
6,202,072 B1 * 3/2001 Kuwahara .................... 715/513
6,292,932 B1 * 9/2001 Baisley et al. .............. 717/114
6,446,256 B1 * 9/2002 Hyman et al. .............. 717/143
6,490,603 B1 * 12/2002 Keenan et al. .............. 715/513
6,542,912 B2 * 4/2003 Meltzer et al. ........... 715/501.1
6,635,088 B1 * 10/2003 Hind et al. .................. 715/513
6,636,845 B2 * 10/2003 Chau et al. .................... 707/1
2001/0014899 A1 * 8/2001 Fujikawa ..................... 707/513
2002/0065814 A1 * 5/2002 Okamoto et al. .............. 707/3
2002/0085032 A1 * 7/2002 Fong et al. .................. 345/760

* cited by examiner

*Primary Examiner*—Heather Herndon
(74) *Attorney, Agent, or Firm*—Ronald L. Drumheller; Richard M. Goldman

(57) ABSTRACT

A technique is provided for automatically and visually generating a display rule for a structured document based on an exemplary operation. Base display rule generation means 21 generates a first display rule 29, which is a base, by using a document type definition 27 for a structured document 26 and a default generation rule 28 that is determined in advance. Display document generation means 22 employs the first display rule 29 and the structured document 26 to generate a first display document 30 and an element correlation file 31. Tie first display document 30 is edited in a display document visual editing environment 23, and a second display document 32 and an editing operation history file 33 are generated. Display rule updating means 24 refers to the second display document 32, the editing operation history file 33, the element correlation file 31 and the structured document 26 to generate a second display rule 34 that reflects the editing contents.

17 Claims, 70 Drawing Sheets

(a)

(b)
```
RuleGenByHeaderAndDL() {            ← (1)
    RuleGenOfElemByHeaderAndDL(root,1);   ← (2)
}
```

(a)

(b)

```
RuleGenOfElemByHeaderAndDL(Element elem, int level) {     ← (1)
    startElement("DIV");                                   ← (2)
    putHeader(level,elem.getName());                       ← (3)
    RuleGenOfAttrByDL(elem);                               ← (4)
    if(!elem.isLeaf()) {                                   ← (5)
        Elements list = elem.getElements();                ← (6)
        forall(Element e in list) {                        ← (7)
            RuleGenOfElemByHeaderAndDL(e,level+1);         ← (8)
        }                                                  ← (9)
    } else {                                               ← (10)
        putElement("P", elem.getContent());                ← (11)
    }                                                      ← (12)
    endElement("DIV");                                     ← (13)
}                                                          ← (14)
```

(a)

(b)
```
RuleGenOfAttrByDL(Element elem) {                    ← (1)
    if(elem.hasAttributes()) {                       ← (2)
        Attributes list = elem.getAttributes();      ← (3)
        startElement("DL");                          ← (4)
        forall(Attribute attr in list) {             ← (5)
            putElement("DT", attr.getName());        ← (6)
            putElement("DD", attr.getValue());       ← (7)
        }                                            ← (8)
        endElement("DL");                            ← (9)
    }                                                ← (10)
}                                                    ← (11)
```

(a)

(b)
```
RuleGenByTABLE() {                              ← (1)
    startElement("ELEMENT");                    ← (2)
    RuleGenByTHEAD(root.getElement(1));         ← (3)
    RuleGenByTBODY(root);                       ← (4)
    endElement("ELEMENT");                      ← (5)
}                                               ← (6)
```

(a)

(b)
```
RuleGenByTHEAD(Element elem) {           ←(1)
    startElement("THEAD");                ←(2)
    startElement("TR");                   ←(3)
    Elements list = elem.getElements();   ←(4)
    forall(Element e in list) {           ←(5)
        putElement("TH", e.getName());    ←(6)
    }                                     ←(7)
    endElement("TR");                     ←(8)
    endElement("THEAD");                  ←(9)
}
```

(a)

(b)
```
RuleGenByTBODY(Element elem) {          ←(1)
    startElement("TBODY");              ←(2)
    Elements list = elem.getElements(); ←(3)
    forall(Element e in list) {         ←(4)
        RuleGenByTR(e);                 ←(5)
    }                                   ←(6)
    endElement("TBODY");                ←(7)
}                                       ←(8)
```

(a)

(b)
```
RuleGenByTR(Element elem) {              ←(1)
    startElement("TR");                   ←(2)
    Elements list = elem.getElements();   ←(3)
    forall(Element e in list) {           ←(4)
        putElement("TD", e.getName());    ←(5)
    }                                     ←(6)
    endElement("TR");                     ←(7)
}                                         ←(8)
```

(a)

(b)
```
RuleGenOfElemBySimpleEnum(Element elem) {      ←(1)
    startElement("DIV");                        ←(2)
    putContent(elem.getName());                 ←(3)
    putBR();                                    ←(4)
    RuleGenOfAttrByDL(elem);                    ←(5)
    if(!elem.isLeaf()) {                        ←(6)
        Elements list = elem.getElements();     ←(7)
        forall(Element e in list) {             ←(8)
            RuleGenOfElemBySimpleEnum(e);       ←(9)
        }                                       ←(10)
    } else {                                    ←(11)
        putContent(elem.getContent());          ←(12)
    }                                           ←(13)
    endElement("DIV");                          ←(14)
}                                               ←(15)
```

(a)

(b)

```
RuleGenByBLOCKQUOTE() {                    ←(1)
    RuleGenOfElemByBLOCKQUOTE(root,1);     ←(2)
}                                          ←(3)
```

(a)

(b)

```
RuleGenOfElemByBLOCKQUOTE(Element elem, int level) {        ←(1)
    putHeader(level,elem.getName());                         ←(2)
    RuleGenOfAttrByDL(elem);                                 ←(3)
    startElement("BLOCKQUOTE");                              ←(4)
    if(!elem.isLeaf()) {                                     ←(5)
        Elements list = elem.getElements();                  ←(6)
        forall(Element e in list) {                          ←(7)
            RuleGenOfElemByBLOCKQUOTE(e,level+1);            ←(8)
        }                                                    ←(9)
    } else {                                                 ←(10)
        putElement("P", elem.getContent());                  ←(11)
    }                                                        ←(12)
    endElement("BLOCKQUOTE");                                ←(13)
}                                                            ←(14)
```

(a)

(b)

```
Table tbl;                                                      ←(1)
for(element of display document after editing node) {           ←(2)
    OPs ops = table.get(node);                                  ←(3)
    if(!ops.isEmpty()) {                                        ←(4)
        History hist = new History;                             ←(5)
        for(all the operations in ops op) {                     ←(6)
            Node n = op.node();                                 ←(7)
            Node sn = element_correlation.getNodeInStructuredDocument(n);  ←(8)
            Record rec = op.record();                           ←(9)
            hist->add(sn, rec);                                 ←(10)
        }                                                       ←(11)
        tbl.add(node, hist);                                    ←(12)
    }                                                           ←(13)
}
```

(a)

(b)

```
forall(Element node in tbl.getNodes()) {      ←(1)
    History hist = tbl.get(node);             ←(2)
    rule.modify(node, hist);                  ←(3)
}                                             ←(4)
```

(a)
```
<?XML version="1.0" ?>
<!DOCTYPE fruitlist SYSTEM "fruitlist.dtd">
<fruitlist>
   <item>
      <name>apple</name>
      <price currency="Yen">100</price>
   </item>
   <item>
      <name>orange</name>
      <price currency="Yen">200</price>
   </item>
   <item>
      <name>banana</name>
      <price currency="Yen">300</price>
   </item>
   <item>
      <name>grape</name>
      <price currency="Yen">400</price>
   </item>
</fruitlist>
```

(b)
```
<!ELEMENT fruitlist (item)+>
<!ELEMENT item (name price)>
<!ELEMENT name (#PCDATA)>
<!ELEMENT price (#PCDATA)>
<!ATTLIST price currency CDATA>
```

(c)
```
<?XML version="1.0" ?>
<schema>
   <elementType name="fruitlist">
      <elementTypeRef name="item" minOccur="1"/>
   </elementType>
   <elementType name="item">
      <sequence>
         <elementTypeRef name="name" />
         <elementTypeRef name="price" />
      </sequence>
   </elementType>
   <elementType name="name">
      <elementTypeRef name="#PCDATA" />
   </elementType>
   <datatype name="priceType">
      <basetype name="integer"/>
      <minExclusive>0</minExclusive>
   </datatype>
   <elementType name="price">
      <dataTypeRef name="priceType" />
      <attrDecl name="currency" required="true">
         <dataTypeRef name="string" />
      </attrDecl>
   </elementType>
</schema>
```

Fig. 22

```
<?XML version="1.0" ?>
<xsl:stylesheet>
   <xsl:template match="/">
      <HTML>
         <BODY>
            <DIV>
               <H1>fruitlist</H1>         ←(200)
               <DIV>
                  <H2>item</H2>            ←(201)
                  <DIV>
                     <H3>name</H3>         ←(202)
                     <P><xsl:value-of select="text()" /></P> ←(204)
                  </DIV>
                  <DIV>
                     <H3>price</H3>        ←(203)
                     <DL>
                        <DT>currency</DT>  ←(206)
                        <DD><xsl:value-of select="@currency" /></DD>←(207)
                     </DL>
                     <P><xsl:value-of select="text()" /></P>←(205)
                  </DIV>
               </DIV>
               <DIV>
                  <H2>item</H2>
                  <DIV>
                     <H3>name</H3>
                     <P><xsl:value-of select="text()" /></P>
                  </DIV>
                  <DIV>
                     <H3>price</H3>
                     <DL>
                        <DT>currency</DT>
                        <DD><xsl:value-of select="@currency" /></DD>
                     </DL>
                     <P><xsl:value-of select="text()" /></P>
                  </DIV>
               </DIV>
                  :
                  :
            </DIV>
         </BODY>
      </HTML>
   </xsl:template>
</xsl:stylesheet>
```

Fig. 23

```
          <HTML>
            <BODY>
              <DIV>
                <H1>fruitlist</H1>
                <DIV>
                  <H2>item</H2>
                  <DIV>
                    <H3>name</H3>
                    <P>apple</P>         ←(208)
                  </DIV>
                  <DIV>
                    <H3>price</H3>
                    <DL>
                      <DT>currency</DT>
                      <DD>Yen</DD>       ←(210)
                    </DL>
                    <P>100</P>           ←(209)
                  </DIV>
                </DIV>
                <DIV>
                  <H2>item</H2>
                  <DIV>
                    <H3>name</H3>
                    <P>orange</P>
                  </DIV>
                  <DIV>
                    <H3>price</H3>
                    <DL>
                      <DT>currency</DT>
                      <DD>Yen</DD>
                    </DL>
                    <P>200</P>
                  </DIV>
                </DIV>
                :
                :
              </DIV>
            </BODY>
          </HTML>
```

Fig. 24

```
/fruitlist[1]/item[1]/name[1]
    /HTML[1]/BODY[1]/DIV[1]/DIV[1]/DIV[1]/P[1]          ←(211)
/fruitlist[1]/item[1]/price[1]
    /HTML[1]/BODY[1]/DIV[1]/DIV[1]/DIV[2]/P[1]
/fruitlist[1]/item[1]/price[1]/attribute::currency
    /HTML[1]/BODY[1]/DIV[1]/DIV[1]/DIV[2]/DL[1]/DD[1]

/fruitlist[1]/item[2]/name[1]
    /HTML[1]/BODY[1]/DIV[1]/DIV[2]/DIV[1]/P[1]
/fruitlist[1]/item[2]/price[1]
    /HTML[1]/BODY[1]/DIV[1]/DIV[2]/DIV[2]/P[1]
/fruitlist[1]/item[2]/price[1]/attribute::currency
    /HTML[1]/BODY[1]/DIV[1]/DIV[2]/DIV[2]/DL[1]/DD[1]

/fruitlist[1]/item[3]/name[1]
    /HTML[1]/BODY[1]/DIV[1]/DIV[3]/DIV[1]/P[1]
/fruitlist[1]/item[3]/price[1]
    /HTML[1]/BODY[1]/DIV[1]/DIV[3]/DIV[2]/P[1]
/fruitlist[1]/item[3]/price[1]/attribute::currency
    /HTML[1]/BODY[1]/DIV[1]/DIV[3]/DIV[2]/DL[1]/DD[1]

/fruitlist[1]/item[4]/name[1]
    /HTML[1]/BODY[1]/DIV[1]/DIV[4]/DIV[1]/P[1]
/fruitlist[1]/item[4]/price[1]
    /HTML[1]/BODY[1]/DIV[1]/DIV[4]/DIV[2]/P[1]
/fruitlist[1]/item[4]/price[1]/attribute::currency
    /HTML[1]/BODY[1]/DIV[1]/DIV[4]/DIV[2]/DL[1]/DD[1]
```

Fig. 25

```
     <?XML version="1.0" ?>
     <xsl:stylesheet>
       <xsl:template match="/">
         <HTML>
  5        <BODY>
             <DIV>
               <H1>fruitlist</H1>
               <DIV>
                 <H2>item</H2>
 10              <DIV>
                   <H3>name</H3>
                   <P><xsl:value-of select="text()" /></P>
                 </DIV>
                 <DIV>
 15                <H3>price</H3>
                   <DL>
                     <DT>currency</DT>
                     <DD><xsl:value-of select="@currency" /></DD>
                   </DL>
 20                <P><xsl:value-of select="text()" /></P>
                 </DIV>
               </DIV>
               <DIV>
                 <H2>item</H2>
 25              <DIV>
                   <H3>name</H3>
                   <P><xsl:value-of select="text()" /></P>
                 </DIV>
                 <DIV>
 30                <H3>price</H3>
                   <P><xsl:value-of select="text()" /></P>←(212)
                   <DL>
                     <DT>currency</DT>
                     <DD><xsl:value-of select="@currency" /></DD>
 35                </DL>
                 </DIV>
               </DIV>
                   :
                   :
 40          </DIV>
           </BODY>
         </HTML>
       </xsl:template>
     </xsl:stylesheet>
```

Fig. 28

```
<HTML>
    <BODY>
        <DIV>
            <DIV>
                <P>apple</P>
                <DIV>
                    <H3>price</H3>
                    <P>100</P>
                    <P>Yen</P>         ←(213)
                </DIV>
            </DIV>
            <DIV>
                <P>orange</P>
                <DIV>
                    <H3>price</H3>
                    <P>200</P>
                    <P>Yen</P>         ←(213)
                </DIV>
            </DIV>
            <DIV>
                <P>banana</P>
                <DIV>
                    <H3>price</H3>
                    <P>300</P>
                    <P>Yen</P>         ←(213)
                </DIV>
            </DIV>
            <DIV>
                <P>grape</P>
                <DIV>
                    <H3>price</H3>
                    <P>400</P>
                    <P>Yen</P>         ←(213)
                </DIV>
            </DIV>
        </DIV>
    </BODY>
</HTML>
```

Fig. 30

```
    <?XML version="1.0" ?>
    <xsl:stylesheet>
      <xsl:template match="/">
        <HTML>
5         <BODY>
            <DIV>
              <DIV>
                <P><xsl:value-of select="text()" /></P>
                <DIV>
10                <H3>price</H3>
                  <P><xsl:value-of select="text()" /></P>
                  <P><xsl:value-of select="@currency" /></P>
                </DIV>
              </DIV>
15            <DIV>
                <P><xsl:value-of select="text()" /></P>
                <DIV>
                  <H3>price</H3>
                  <P><xsl:value-of select="text()" /></P>
20                <P><xsl:value-of select="@currency" /></P>
                </DIV>
              </DIV>
                :
                :
25          </DIV>
          </BODY>
        </HTML>
      </xsl:template>
    </xsl:stylesheet>
```

Fig. 31

```
<HTML>
    <BODY>
        <DIV>
            <DIV>
                <P>apple</P>
                <DIV>
                    <H3>price</H3>
                    <P>100Yen</P>      ←(214)
                </DIV>
            </DIV>
            <DIV>
                <P>orange</P>
                <DIV>
                    <H3>price</H3>
                    <P>200Yen</P>      ←(214)
                </DIV>
            </DIV>
            <DIV>
                <P>banana</P>
                <DIV>
                    <H3>price</H3>
                    <P>300Yen</P>      ←(214)
                </DIV>
            </DIV>
            <DIV>
                <P>grape</P>
                <DIV>
                    <H3>price</H3>
                    <P>400Yen</P>      ←(214)
                </DIV>
            </DIV>
        </DIV>
    </BODY>
</HTML>
```

Fig. 33

```
<?XML version="1.0" ?>
<xsl:stylesheet>
   <xsl:template match="/">
      <HTML>
         <BODY>
            <DIV>
               <DIV>
                  <P><xsl:value-of select="text()" /></P>
                  <DIV>
                     <H3>price</H3>
                     <P>
                        <xsl:value-of select="text()" />
                        <xsl:value-of select="@currency" />
                     </P>
                  </DIV>
               </DIV>
               <DIV>
                  <P><xsl:value-of select="text()" /></P>
                  <DIV>
                     <H3>price</H3>
                     <P>
                        <xsl:value-of select="text()" />
                        <xsl:value-of select="@currency" />
                     </P>
                  </DIV>
               </DIV>
                  :
                  :
            </DIV>
         </BODY>
      </HTML>
   </xsl:template>
</xsl:stylesheet>
```

Fig. 34

(a)
```
<?XML version="1.0" ?>
<!DOCTYPE stocklist SYSTEM "stocklist.dtd">
<stocklist>
    <item>
        <name>FreePC 750J</name>
        <model>P6750-21J</model>
        <price currency="JPY">151000</price>
        <stock>3</stock>
    </item>
    <item>
        <name>FreePC 600E</name>
        <model>P660-40E</model>
        <price currency="USD">1999</price>
        <stock>0</stock>
    </item>
</stocklist>
```

(b)
```
<!ELEMENT stocklist (item)+>
<!ELEMENT item (name model price)>
<!ELEMENT name (#PCDATA)>
<!ELEMENT model (#PCDATA)>
<!ELEMENT price (#PCDATA)>
<!ELEMENT stock (#PCDATA)>
<!ATTLIST price currency CDATA>
```

(c)
```
<?XML version="1.0" ?>
<schema>
    <elementType name="stocklist">
        <elementTypeRef name="item" minOccur="1"/>
    </elementType>
    <elementType name="item">
        <sequence>
            <elementTypeRef name="name" />
            <elementTypeRef name="model" />
            <elementTypeRef name="price" />
            <elementTypeRef name="stock" />
        </sequence>
    </elementType>
    <elementType name="name">
        <elementTypeRef name="#PCDATA" />
    </elementType>
    <elementType name="model">
        <elementTypeRef name="#PCDATA" />
    </elementType>
    <datatype name="priceType">
        <basetype name="integer"/>
        <minExclusive>0</minExclusive>
    </datatype>
    <elementType name="price">
        <dataTypeRef name="priceType" />
        <attrDecl name="currency" required="true">
            <dataTypeRef name="string" />
        </attrDecl>
    </elementType>
    <datatype name="stockType">
        <basetype name="integer"/>
        <minExclusive>0</minExclusive>
    </datatype>
    <elementType name="stock">
        <dataTypeRef name="stockType" />
    </elementType>
</schema>
```

Fig. 35

```
<?XML version="1.0" ?>
<xsl:stylesheet>
  <xsl:template match="/">
    <HTML>
      <BODY>
        <DIV>
          <H1>stocklist</H1>
          <DIV>
            <H2>item</H2>
            <DIV>
              <H3>name</H3>
              <P><xsl:value-of select="text()" /></P>
            </DIV>
            <DIV>
              <H3>model</H3>
              <P><xsl:value-of select="text()" /></P>
            </DIV>
            <DIV>
              <H3>price</H3>
              <DL>
                <DT>currency</DT>
                <DD><xsl:value-of select="@currency" /></DD>
              </DL>
              <P><xsl:value-of select="text()" /></P>
            </DIV>
            <DIV>
              <H3>stock</H3>
              <P><xsl:value-of select="text()" /></P>
            </DIV>
          </DIV>
          :
        </DIV>
      </BODY>
    </HTML>
  </xsl:template>
</xsl:stylesheet>
```

Fig. 36

```
<HTML>
  <BODY>
    <DIV>
      <H1>stocklist</H1>
      <DIV>
        <H2>item</H2>
        <DIV>
          <H3>name</H3>
          <P>FreePC 750J</P>
        </DIV>
        <DIV>
          <H3>model</H3>
          <P>P6750-21J</P>
        </DIV>
        <DIV>
          <H3>price</H3>
          <DL>
            <DT>currency</DT>
            <DD>JPY</DD>
          </DL>
          <P>151000</P>
        </DIV>
        <DIV>
          <H3>stock</H3>
          <P>3</P>
        </DIV>
      </DIV>
      <DIV>
        <H2>item</H2>
        <DIV>
          <H3>name</H3>
          <P>FreePC 600E</P>
        </DIV>
        <DIV>
          <H3>model</H3>
          <P>P660-40E</P>
        </DIV>
        <DIV>
          <H3>price</H3>
          <DL>
            <DT>currency</DT>
            <DD>USD</DD>
          </DL>
          <P>1999</P>
        </DIV>
        <DIV>
          <H3>stock</H3>
          <P>0</P>
        </DIV>
      </DIV>
    </DIV>
  </BODY>
</HTML>
```

Fig. 37

```
    <HTML>
       <BODY>
          <DIV>
             <DIV>
                <H2>FreePC 750J</H2>
                <DIV>
                   <H3>model</H3>
                   <P>P6750-21J</P>
                </DIV>
                <DIV>¥151000</DIV>
                <DIV>
                   <H3>stock</H3>
                   <P>3</P>
                </DIV>
             </DIV>
             <DIV>
                <H2>FreePC 600E</H2>
                <DIV>
                   <H3>model</H3>
                   <P>P660-40E</P>
                </DIV>
                <DIV>$1999</DIV>
                <DIV>
                   <H3>stock</H3>
                   <P>0</P>
                </DIV>
             </DIV>
          </DIV>
       </BODY>
    </HTML>
```

Fig. 40

```
<?XML version="1.0" ?>
<xsl:stylesheet>
    <xsl:template match="/">
        <HTML>
            <BODY>
                <DIV>
                    <DIV>
                        <H2><xsl:value-of select="text()" /></H2>
                        <DIV>
                            <H3>model</H3>
                            <P><xsl:value-of select="text()" /></P>
                        </DIV>
                        <DIV>
                            <xsl:choose>
                                <xsl:when test="@currency=JPY">¥</xsl:when>
                                <xsl:when test="@currency=USD">$</xsl:when>
                                <xsl:otherwise>
                                    <xsl:value-of select="@currency" />
                                </xsl:otherwise>
                            </xsl:choose>
                            <xsl:value-of select="text()" />
                        </DIV>
                        <DIV>
                            <H3>quantity</H3>
                            <P><xsl:value-of select="text()" /></P>
                        </DIV>
                    </DIV>
                    :
                </DIV>
            </BODY>
        </HTML>
    </xsl:template>
</xsl:stylesheet>
```

Fig. 41

```
            <HTML>
              <BODY>
                <DIV>
                  <DIV>
 5                  <H2>FreePC 750J</H2>
                    <DIV>
                      <H3>model</H3>
                      <P>P6750-21J</P>
                    </DIV>
10                  <DIV>¥151000</DIV>
                    <DIV>
                      <H3>stock</H3>
                      <P>3</P>
                    </DIV>
15                </DIV>
                  <DIV>
                    <H2>FreePC 600E</H2>
                    <DIV>
                      <H3>model</H3>
20                    <P>P660-40E</P>
                    </DIV>
                    <DIV>$1999</DIV>
                    <DIV>
                      <H3>stock</H3>
25                    <P>N/A</P>
                    </DIV>
                  </DIV>
                </DIV>
              </BODY>
30          </HTML>
```

Fig. 43

```
<?XML version="1.0" ?>
<xsl:stylesheet>
    <xsl:template match="/">
        <HTML>
            <BODY>
                <DIV>
                    <DIV>
                        <H2><xsl:value-of select="text()" /></H2>
                        <DIV>
                            <H3>model</H3>
                            <P><xsl:value-of select="text()" /></P>
                        </DIV>
                        <DIV>
                            <xsl:choose>
                                <xsl:when test="@currency=JPY">¥</xsl:when>
                                <xsl:when test="@currency=USD">$</xsl:when>
                                <xsl:otherwise>
                                    <xsl:value-of select="@currency" />
                                </xsl:otherwise>
                            </xsl:choose>
                            <xsl:value-of select="text()" />
                        </DIV>
                        <DIV>
                            <H3>quantity</H3>
                            <xsl:choose>
                                <xsl:when test="text()=0">N/A</xsl:when>
                                <xsl:otherwise>
                                    <xsl:value-of select="text()" />
                                </xsl:otherwise>
                            </xsl:choose>
                        </DIV>
                    </DIV>
                    :
                </DIV>
            </BODY>
        </HTML>
    </xsl:template>
</xsl:stylesheet>
```

Fig. 44

```
<HTML>
    <BODY>
        <DIV>
            <H1>stocklist</H1>
            <DIV>
                <H2>item</H2>
                <DIV>
                    <H3>name</H3>
                    <P>FreePC 600E</P>
                </DIV>
                <DIV>
                    <H3>model</H3>
                    <P>P660-40E</P>
                </DIV>
                <DIV>
                    <H3>price</H3>
                    <DL>
                        <DT>currency</DT>
                        <DD>USD</DD>
                    </DL>
                    <P>1999</P>
                </DIV>
                <DIV>
                    <H3>stock</H3>
                    <P>0</P>
                </DIV>
            </DIV>
            <DIV>
                <TABLE BORDER>
                    <THEAD>
                        <TR>
                            <TH>name</TH>
                            <TH>model</TH>
                            <TH>currency</TH>
                            <TH>price</TH>
                            <TH>stock</TH>
                        </TR>
                    </THEAD>
                    <TBODY>
                        <TR>
                            <TD>FreePC 750J</TD>
                            <TD>P6750-21J</TD>
                            <TD>JPY</TD>
                            <TD ALIGN="RIGHT">151000</TD>
                            <TD ALIGN="RIGHT">3</TD>
                        </TR>
                        <TR>
                            <TD></TD>
                            <TD></TD>
                            <TD></TD>
                            <TD ALIGN="RIGHT"></TD>
                            <TD ALIGN="RIGHT"></TD>
                        </TR>
                    </TBODY>
                </TABLE>
            </DIV>
        </DIV>
    </BODY>
</HTML>
```

Fig. 46

```
<HTML>
    <BODY>
        <DIV>
            <H1>stocklist</H1>
            <DIV>
                <TABLE BORDER>
                    <THEAD>
                        <TR>
                            <TH>name</TH>
                            <TH>model</TH>
                            <TH>currency</TH>
                            <TH>price</TH>
                            <TH>stock</TH>
                        </TR>
                    </THEAD>
                    <TBODY>
                        <TR>
                            <TD>FreePC 750J</TD>
                            <TD>P6750-21J</TD>
                            <TD>JPY</TD>
                            <TD ALIGN="RIGHT">151000</TD>
                            <TD ALIGN="RIGHT">3</TD>
                        </TR>
                        <TR>
                            <TD>FreePC 600E</TD>
                            <TD>P660-40E</TD>
                            <TD>USD</TD>
                            <TD ALIGN="RIGHT">1999</TD>
                            <TD ALIGN="RIGHT">0</TD>
                        </TR>
                    </TBODY>
                </TABLE>
            </DIV>
        </DIV>
    </BODY>
</HTML>
```

Fig. 48

```
<?XML version="1.0" ?>
<xsl:stylesheet>
    <xsl:template match="/">
        <HTML>
            <BODY>
                <DIV>
                    <H1>stocklist</H1>
                    <DIV>
                        <TABLE BORDER>
                            <THEAD>
                                <TR>
                                    <TH>name</TH>
                                    <TH>model</TH>
                                    <TH>currency</TH>
                                    <TH>price</TH>
                                    <TH>stock</TH>
                                </TR>
                            </THEAD>
                            <TBODY>
                                <TR>
                                    <TD><xsl:value-of select="text()" /></TD>
                                    <TD><xsl:value-of select="text()" /></TD>
                                    <TD><xsl:value-of select="@currency" /></TD>
                                    <TD><xsl:value-of select="text()" /></TD>
                                    <TD><xsl:value-of select="text()" /></TD>
                                </TR>
                                :
                            </TBODY>
                        </TABLE>
                    </DIV>
                </DIV>
            </BODY>
        </HTML>
    </xsl:template>
</xsl:stylesheet>
```

Fig. 49

```
<HTML>
    <BODY>
        <DIV>
            <H1>stocklist</H1>
            <DIV>
                <TABLE BORDER>
                    <THEAD>
                        <TR>
                            <TH>name</TH>
                            <TH>model</TH>
                            <TH>currency</TH>
                            <TH>price</TH>
                            <TH>stock</TH>
                        </TR>
                    </THEAD>
                    <TBODY>
                        <TR>
                            <TD>FreedomPC 750J</TD>
                            <TD>P6750-21J</TD>
                            <TD>JPY</TD>
                            <TD ALIGN="RIGHT" BGCOLOR="#00FF00">
                                <B>151000</B>
                            </TD>
                            <TD ALIGN="RIGHT">3</TD>
                        </TR>
                        <TR>
                            <TD>FreedomPC 600E</TD>
                            <TD>P6600-40E</TD>
                            <TD>USD</TD>
                            <TD ALIGN="RIGHT" BGCOLOR="#00FF00">
                                <B>1999</B>
                            </TD>
                            <TD ALIGN="RIGHT">0</TD>
                        </TR>
                    </TBODY>
                </TABLE>
            </DIV>
        </DIV>
    </BODY>
</HTML>
```

Fig. 51

```
<?XML version="1.0" ?>
<xsl:stylesheet>
    <xsl:template match="/">
        <HTML>
            <BODY>
                <DIV>
                    <H1>stocklist</H1>
                    <DIV>
                        <TABLE BORDER>
                            <THEAD>
                                <TR>
                                    <TH>name</TH>
                                    <TH>model</TH>
                                    <TH>currency</TH>
                                    <TH>price</TH>
                                    <TH>stock</TH>
                                </TR>
                            </THEAD>
                            <TBODY>
                                <xsl:for-each select="stocklist/item">
                                    <TR>
                                        <TD>
                                            <xsl:apply-templates select="name"/>
                                        </TD>
                                        <TD>
                                            <xsl:apply-templates select="model"/>
                                        </TD>
                                        <TD>
                                            <xsl:apply-templates
                                                select="price/attribute::currency"/>
                                        </TD>
                                        <TD ALIGN="RIGHT" BGCOLOR="#00FF00">
                                            <B>
                                                <xsl:apply-templates select="price"/>
                                            </B>
                                        </TD>
                                        <TD ALIGN="RIGHT">
                                            <xsl:apply-templates select="stock"/>
                                        </TD>
                                    </TR>
                                </xsl:for-each>
                            </TBODY>
                        </TABLE>
                    </DIV>
                </DIV>
            </BODY>
        </HTML>
    </xsl:template>
</xsl:stylesheet>
```

| position in HTML table (XPath) | position in XML document (XPath) |
|---|---|
| /HTML[1]/BODY[1]/DIV[1]/DIV[2]/TABLE[1]/TBODY[1]/TR[1]/TD[1] | /stocklist[1]/item[1]/name[1] |
| /HTML[1]/BODY[1]/DIV[1]/DIV[2]/TABLE[1]/TBODY[1]/TR[1]/TD[2] | /stocklist[1]/item[1]/model[1] |
|  | /stocklist[1]/item[1]/price[1]/attribute::currency |
| /HTML[1]/BODY[1]/DIV[1]/DIV[2]/TABLE[1]/TBODY[1]/TR[1]/TD[4] | /stocklist[1]/item[1]/price[1] |
| /HTML[1]/BODY[1]/DIV[1]/DIV[2]/TABLE[1]/TBODY[1]/TR[1]/TD[5] | /stocklist[1]/item[1]/stock[1] |

(b)

HTML
/HTML[1]/BODY[1]/DIV[1]/DIV[2]/TABLE[1]/TBODY[1]/TR[1]

XML
/stocklist[1]/item[1]

(c)

HTML
/HTML[1]/BODY[1]/DIV[1]/DIV[2]/TABLE[1]/TBODY[1]/TR[position()>=1]

XML
/stocklist[1]/item[position()>=1]

(d)

| position in HTML table (XPath) | position in XML document (XPath) |
|---|---|
| /HTML[1]/BODY[1]/DIV[1]/DIV[2]/TABLE[1]/TBODY[1]/TR[position()>=1] | /stocklist[1]/item[position()>=1] |
| TD[1] | name[1] |
| TD[2] | model[1] |
| TD[3] | price[1]/attribute::currency |
| TD[4] | price[1] |
| TD[5] | stock[1] |

(e)
```
<xsl:for-each select="stocklist/item">
  <TR>
    <TD><xsl:apply-templates select="name"/></TD>
    <TD><xsl:apply-templates select="model"/></TD>
    <TD><xsl:apply-templates select="price/attribute::currency"/></TD>
    <TD ALIGN="RIGHT"><xsl:apply-templates select="price"/></TD>
    <TD ALIGN="RIGHT"><xsl:apply-templates select="stock"/></TD>
  </TR>
</xsl:for-each>
```

Fig. 53

```
<?XML version="1.0" ?>
<xsl:stylesheet>
  <xsl:template match="/">
    <HTML>
      <BODY>
        <DIV>
          <H1>stocklist</H1>
          <DIV>
            <TABLE BORDER>
              <THEAD>
                <TR>
                  <TH>name</TH>
                  <TH>model</TH>
                  <TH>currency</TH>
                  <TH>price</TH>
                  <TH>stock</TH>
                </TR>
              </THEAD>
              <TBODY>
                <xsl:for-each select="stocklist/item">
                  <TR>
                    <TD>
                      <xsl:apply-templates select="name"/>
                    </TD>
                    <TD>
                      <xsl:apply-templates select="model"/>
                    </TD>
                    <TD>
                      <xsl:apply-templates
                         select="price/attribute::currency"/>
                    </TD>
                    <TD ALIGN="RIGHT">
                      <xsl:apply-templates select="price"/>
                    </TD>
                    <TD ALIGN="RIGHT">
                      <xsl:apply-templates select="stock"/>
                    </TD>
                  </TR>
                </xsl:for-each>
              </TBODY>
            </TABLE>
          </DIV>
        </DIV>
      </BODY>
    </HTML>
  </xsl:template>
</xsl:stylesheet>
```

Fig. 54

(a)
```
<!ELEMENT Booklist 0 0 (Book)* >
<!ELEMENT Book - - (Title Author Pages) >
<!ELEMENT Title - - (#PCDATA) >
<!ELEMENT Author - - (#PCDATA) >
<!ELEMENT Pages - - (#PCDATA) >
```

(b)
```
<!DOCTYPE booklist SYSTEM "booklist.dtd">
<Booklist>
  <Book>
    <Title>Gallic Wars</Title>
    <Author>Gauis Julius Caesar</Author>
    <Pages>1200</Pages>
  </Book>
  <Book>
    <Title>Genji Monogatari</Title>
    <Author>Murasaki-Shikibu</Author>
    <Pages>2400</Pages>
  </Book>
  <Book>
    <Title>Odyssey</Title>
    <Author>Homer</Author>
    <Pages>400</Pages>
  </Book>
</Booklist>
```

Fig. 55

(a)
```
     <!DOCTYPE style-sheet system "booklist.dtd">

(element Booklist (make simple-page-sequence))
     (element Book (make paragraph
         font-family-name: "Times New Roman"
5        font-size: 10pt
         line-spacing: 11pt))
     (element Title (make sequence))
     (element Author (make sequence
         space-before: 20pt))
10   (element Pages (make sequence
         space-before: 20pt))
```

(b)

Gallic Wars   Gaius Julius Caesar   1200

Genji Monogatari   Murasaki-Shikibu   2400

Odyssey   Homer   400

(c)

*Gallic Wars*   Gaius Julius Caesar   1200

*Genji Monogatari*   Murasaki-Shikibu   2400

*Odyssey*   Homer   400

(d)
```
     <!DOCTYPE style-sheet system "booklist.dtd">

(element Booklist (make simple-page-sequence))
     (element Book (make paragraph
         font-family-name: "Times New Roman"
5        font-size: 10pt
         line-spacing: 11pt))
     (element Title (make sequence
         font-posture: 'italic))
     (element Author (make sequence
10       space-before: 20pt
         font-weight: 'bold))
     (element Pages (make sequence
         space-before: 20pt
         font-family-name: "Courier"))
```

Fig. 56

(a)
```
"XX012","NRT","12:00","LAX","15:30","499.00","21"
"XX567","CPH","10:30","DFW","23:15","869.00","58"
"XX3288","IAD","11:05","DEN","19:25","289.50","72"
```

(b)
```
<?XML version="1.0" ?>
<csl:stylesheet>
</csl:stylesheet>
```

(c)

| XX012 | NRT | 12:00 | LAX | 15:30 | 499.00 | 21 |
|---|---|---|---|---|---|---|
| XX567 | CPH | 10:30 | DFW | 23:15 | 869.00 | 58 |
| XX3288 | IAD | 11:05 | DEN | 19:25 | 289.50 | 72 |

Fig. 57

| Flight | From | Dep | To | Arr | Price | Avail |
|--------|------|-------|-----|-------|--------|-------|
| XX012  | NRT  | 13:00 | LAX | 15:30 | 499.00 | 21    |
| XX567  | CPH  | 18:30 | DFW | 23:15 | 869.00 | 58    |
| XX3288 | IAD  | 11:05 | DEN | 19:25 | 289.50 | 72    |

Fig. 58

```
<?XML version="1.0" ?>
<csl:stylesheet>
    <csl:header>
        <csl:cell position="1">Flight</csl:cell>
        <csl:cell position="2">From</csl:cell>
        <csl:cell position="3">Dep</csl:cell>
        <csl:cell position="4">To</csl:cell>
        <csl:cell position="5">Arr</csl:cell>
        <csl:cell position="6">Price</csl:cell>
        <csl:cell position="7">Avail</csl:cell>
    </csl:header>
    <csl:body>
        <csl:cell position="1">
            <csl:font>
                <csl:size unit="pt">12</csl:size>
            </csl:font>
        </csl:cell>
        <csl:cell position="3,5">
            <csl:font>
                <csl:font-weight>bold</csl:font-weight>
            </csl:font>
        </csl:cell>
        <csl:cell position="6-7" align="right"/>
    </csl:body>
</csl:stylesheet>
```

Fig. 59

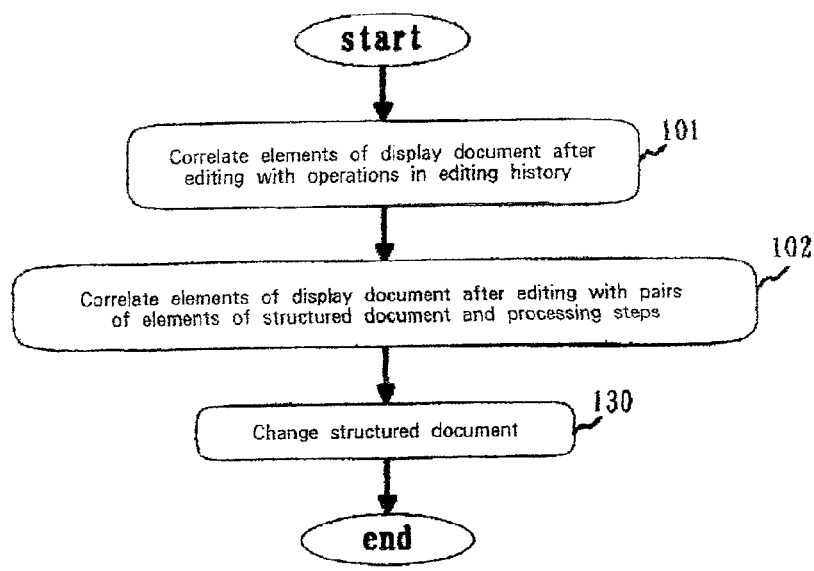

```
forall(Element node in tbl.getNodes()) {      ←(1)
    History hist = tbl.get(node);              ←(2)
    forall(Element n in hist.getNodes()) {    ←(3)
        Record rec = hist.getRecord(n);        ←(4)
        structuredDocument.modify(n, rec);    ←(5)
    }                                          ←(6)
}                                              ←(7)
```

(a)
```
<!ELEMENT stationary (item)+>
<!ELEMENT item (name price)>
<!ELEMENT name (#PCDATA)>
<!ELEMENT price (#PCDATA)>
```

```
<?XML version="1.0" ?>
<schema>
    <elementType name="stationary">
        <elementTypeRef name="item" minOccur="1"/>
    </elementType>
    <elementType name="item">
        <sequence>
            <elementTypeRef name="name" />
            <elementTypeRef name="price" />
        </sequence>
    </elementType>
    <elementType name="name">
        <elementTypeRef name="#PCDATA" />
    </elementType>
    <datatype name="priceType">
        <basetype name="integer"/>
        <minExclusive>0</minExclusive>
    </datatype>
    <elementType name="price">
        <dataTypeRef name="priceType" />
    </elementType>
</schema>
```

(b)
```
<?XML version="1.0" ?>
<!DOCTYPE stationary SYSTEM "stationary.dtd">
<stationary>
    <item>
        <name>Notebook</name>
        <price>250</price>
    </item>
    <item>
        <name>Memo pad</name>
        <price>200</price>
    </item>
    <item>
        <name>Eraser</name>
        <price>100</price>
    </item>
</stationary>
```

Fig. 62

(a)
```
<?XML version="1.0" ?>
<xsl:stylesheet>
  <xsl:template match="/">
    <HTML>
      <BODY>
        <DIV>
          <H1>stationary</H1>
          <DIV>
            <TABLE BORDER>
              <THEAD>
                <TR>
                  <TH>name</TH>
                  <TH>price</TH>
                </TR>
              </THEAD>
              <TBODY>
                <TR>
                  <TD><xsl:value-of select="text()" /></TD>
                  <TD ALIGN="RIGHT">
                    <xsl:value-of select="text()" />
                  </TD>
                </TR>
              </TBODY>
            </TABLE>
          </DIV>
        </DIV>
      </BODY>
    </HTML>
  </xsl:template>
</xsl:stylesheet>
```

(b)
```
<HTML>
  <BODY>
    <DIV>
      <H1>stationary</H1>
      <DIV>
        <TABLE BORDER>
          <THEAD>
            <TR>
              <TH>name</TH>
              <TH>price</TH>
            </TR>
          </THEAD>
          <TBODY>
            <TR>
              <TD>Notebook</TD>
              <TD ALIGN="RIGHT">250</TD>
            </TR>
            <TR>
              <TD>Memo pad</TD>
              <TD ALIGN="RIGHT">200</TD>
            </TR>
            <TR>
              <TD>Eraser</TD>
              <TD ALIGN="RIGHT">100</TD>
            </TR>
          </TBODY>
        </TABLE>
      </DIV>
    </DIV>
  </BODY>
</HTML>
```

Fig. 63

```
<?XML version="1.0" ?>
<!DOCTYPE stationary SYSTEM "stationary.dtd">
<stationary>
   <item>
      <name>Notebook</name>
      <price>300</price>
   </item>
   <item>
      <name>Memo pad</name>
      <price>200</price>
   </item>
   <item>
      <name>Eraser</name>
      <price>100</price>
   </item>
   <item>
      <name>Pencil</name>
      <price>50</price>
   </item>
</stationary>
```

(a)

(b)
```
forall(Element node in tbl.getNodes()) {          ←(1)
    History hist = tbl.get(node);                 ←(2)
    forall(Element n in hist.getNodes()) {        ←(3)
        if(!n.isValid(dtd)) {                     ←(4)
            Record rec = hist.getRecord(n);       ←(5)
            if(n.isGeneralized()) {               ←(6)
                if(rec.isInsertion()) {           ←(7)
                    dtd.addNewNode(n);            ←(8)
                } else if(rec.isMove()) {         ←(9)
                    dtd.moveNode(rec.getTarget(), n);  ←(10)
                }                                 ←(11)
            } else {                              ←(12)
                dtd.modify(rec.getTarget(), n);   ←(13)
            }                                     ←(14)
        }                                         ←(15)
    }                                             ←(16)
}                                                 ←(17)
```

(a)

stationary

| name | color | price |
|---|---|---|
| Notebook | grey | 300 |
| Memo pad | white | 200 |
| Eraser | white | 100 |
| Pencil | black | 50 |

(b)

```
<!ELEMENT stationary (item)+>
<!ELEMENT item (name color price)>
<!ELEMENT name (#PCDATA)>
<!ELEMENT color (#PCDATA)>
<!ELEMENT price (#PCDATA)>
```

(a)
```
<?XML version="1.0" ?>
<xsl:stylesheet>
    <xsl:template match="/">
        <HTML>
            <BODY>
                <DIV>
                    stationary<BR>
                    <DIV>
                        item<BR>
                        <DIV>
                            <DIV>
                                name<BR>
                                <xsl:value-of select="text()" />
                            </DIV>
                            <DIV>
                                price<BR>
                                <xsl:value-of select="text()" />
                            </DIV>
                        </DIV>
                    </DIV>
                </DIV>
            </BODY>
        </HTML>
    </xsl:template>
</xsl:stylesheet>
```

(b)
```
<HTML>
    <BODY>
        <DIV>
            stationary<BR>
            <DIV>
                item<BR>
                <DIV>
                    <DIV>
                        name<BR>
                        Notebook
                    </DIV>
                    <DIV>
                        price<BR>
                        250
                    </DIV>
                </DIV>
            </DIV>
            <DIV>
                item<BR>
                <DIV>
                    <DIV>
                        name<BR>
                        Memo pad
                    </DIV>
                    <DIV>
                        price<BR>
                        200
                    </DIV>
                </DIV>
            </DIV>
            <DIV>
                item<BR>
                <DIV>
                    <DIV>
                        name<BR>
                        Eraser
                    </DIV>
                    <DIV>
                        price<BR>
                        100
                    </DIV>
                </DIV>
            </DIV>
        </DIV>
    </BODY>
</HTML>
```

Fig. 70

(a)
```
<?XML version="1.0" ?>
<xsl:stylesheet>
    <xsl:template match="/">
        <HTML>
            <BODY>
                <DIV>
                    <H1>stationary</H1>
                    <BLOCKQUOTE>
                        <H2>item</H2>
                        <BLOCKQUOTE>
                            <H3>name</H3>
                            <BLOCKQUOTE>
                                <xsl:value-of select="text()" />
                            </BLOCKQUOTE>
                            <BLOCKQUOTE>
                                <H3>price</H3>
                                <BLOCKQUOTE>
                                    <xsl:value-of select="text()" />
                                </BLOCKQUOTE>
                            </BLOCKQUOTE>
                        </BLOCKQUOTE>
                    </BLOCKQUOTE>
                </DIV>
            </BODY>
        </HTML>
    </xsl:template>
</xsl:stylesheet>
```

(b)
```
<HTML>
    <BODY>
        <DIV>
            <H1>stationary</H1>
            <BLOCKQUOTE>
                <H2>item</H2>
                <BLOCKQUOTE>
                    <H3>name</H3>
                    <BLOCKQUOTE>
                        Notebook
                    </BLOCKQUOTE>
                    <H3>price</H3>
                    <BLOCKQUOTE>
                        250
                    </BLOCKQUOTE>
                </BLOCKQUOTE>
            </BLOCKQUOTE>
            <BLOCKQUOTE>
                <H2>item</H2>
                <BLOCKQUOTE>
                    <H3>name</H3>
                    <BLOCKQUOTE>
                        Memo pad
                    </BLOCKQUOTE>
                    <H3>price</H3>
                    <BLOCKQUOTE>
                        200
                    </BLOCKQUOTE>
                </BLOCKQUOTE>
            </BLOCKQUOTE>
            <BLOCKQUOTE>
                <H2>item</H2>
                <BLOCKQUOTE>
                    <H3>name</H3>
                    <BLOCKQUOTE>
                        Eraser
                    </BLOCKQUOTE>
                    <H3>price</H3>
                    <BLOCKQUOTE>
                        100
                    </BLOCKQUOTE>
                </BLOCKQUOTE>
            </BLOCKQUOTE>
        </DIV>
    </BODY>
</HTML>
```

Fig. 72

METHOD, SYSTEM FOR, AND PROGRAM PRODUCT FOR GENERATING A DISPLAY RULE FOR A STRUCTURED DOCUMENT, AND FOR CHANGING A STRUCTURED DOCUMENT AND ITS DOCUMENT TYPE DEFINITION

BACKGROUND OF THE INVENTION

1. Field of the Invention

The present invention relates to a method and a system for generating or changing a structured document, a display rule and a document type definition, and a storage medium therefor. In particular, the present invention can be effectively employed for a technique for referring to the history for an editing operation on a screen, and for automatically generating examples for an display rule, a document type definition and a structured document.

2. Related Art

A structured document exhibiting a superior compatibility with documents or data for computer systems or with computer networks has been focused on. In the structured document, the elements (data) provide their own explanation (are self-descriptive), and the relationship that is established between the elements is described using a document type definition. The self-defining nature of the document elements (data) enables users not only to read the document, but also reproduces the characteristic of the structured document so that an application program running on a computer can understand the definition and the contents of the data. For example, one advantage is that electronic transaction data using a web can be precisely described.

An example structured document is an XML (eXtensible Markup Language) document or an SGML (Standard Generalized Markup Language) document. XML is one of the data description languages that provides improved processing performance by simplifying the SGML grammar definitions and enhances its employment for a network. In both XML and SGML, either the DTD (Document Type Definition) or the XML Schema is employed to define document types and to structure documents.

In a structured document, such as an XML document, the relationship established between the individual elements of the document is written as a structure, and information concerning style, how the document should be represented visually, is not included. Therefore, a display rule for the visual representation of the document must be defined separately from the structured document. Generally, however, since a display rule for a structured document must written using a formatting language, it is difficult for a user to personally perform this task. Thus, a demand has arisen for a system that can easily generate display rules.

Well known methods used for generating display rules are, for example, one that indicates what procedures must be applied to generate a display rule at a specific level. Examples of such methods are the "XML Style Wizard," which is described in the "World-wide Free Distribution of the 'XML Style Wizard' that easily generates Inforteria and XSL documents," September 1999, and "Visual XML Creation," which is described in "Visual XML Transformation Tool," International Business Machines Corp., Armonk, N.Y., December, 1999.

Well known systems for editing display rules are, for example: the "XSL Editor" ("XSL Editor," International Business Machines, Corp., Armonk, N.Y., November, 1999, http://www.alphaworks.ibm.com/tech/xsleditor); the "XML Styler" ("XML Styler," ArborText Corp., 1998, http://www.arbortext.com/index.html); and the "eXcelon Stylis" ("Object Design Announces eXcelon 2.0, Industry's First XML Application Development Environment for e-Business," Object Design Inc., Burlington, Mass., October 1999, http://www.odi.com/excelon/Products/ProdMain.htm).

As an example display rule generation system, there is one system that, to generate a display rule, performs a document type transformation: the "Visual XML Transformation" ("XSL Editor," International Business Machines, Corp., Armonk, N.Y., November, 1999).

In addition, the "XML Translation Generator (XTransGen)" ("XSL Editor," International Business Machines Corp., Armonk, N.Y., November, 1999) is a well known method for providing two structured documents and for generating a translator for the two.

For a programming method that uses exemplification, generally, the technique that is next discussed is well known. It should be noted that exemplification programming is a general term used for a technique whereby collected samples are employed to automatically synthesize general operating procedures.

A method called automatic program synthesis is described in "Automatic Program Synthesis From Examples," Siklossy L. and Sykes D., Proc. of the Fourth International Joint Conference on Artificial Intelligence (IJCAI), Tbilisi, USSR, September, 1975, pp. 268–273. With the automatic program synthesis method, the developer of the program does not instruct the procedures that are to be used, but instead provides for a machine a combination of input and output to obtain a machine that can transform such input/output.

A method whereby programming is performed by demonstration is described in "Pygmalion: A Computer Program To Model And Stimulate Creative Thought," Smith D., Birkhauser, Easel, 1977; or in "Pygmalion: A Creative Programming Environment," Smith D., Report No. STAN-CS-75-499, Department of Computer Science, Stanford University 1975. According to this programming by demonstration method, a programmer performs a specific operation that a machine is intended to provide as a function, so that the machine, by repeating the specific operation, can extract a generally applicable operation.

Another programming by demonstration method is described in "Teaching A Mouse How to Draw," Maulsby D. and Witten I., Proceedings Of Graphics Interface '89, NCCGA, London Ontario, June 1989, pp. 130–137. According to this method, a metaphor of a professor is adopted to describe programming by demonstration, and the basic idea is expanded so as to provide generalized information.

In addition, a system whereby programming examples are adopted for use is described in "Watch What I Do," Cypher Allen (ed.), MIT Press, Cambridge, Mass., 1993.

However, using the conventional methods, only a simple display rule can be generated, and unless a user is well versed in the use of a pertinent description language, generating a complicated display rule is difficult.

Specifically, according to the conventional art, a display rule can be automatically generated by using either the "XML Style Wizard" or "Visual XML Creation." However, in this case, only a simple display rule can be generated; a detailed display rule can not be produced in response to a request by a user. To create a detailed display rule, a user must understand a formatting language and be able to edit a simple display rule. And although display rule editing systems are available, when such a system is used to change a simple display rule into a more complicated one, an editing tool, such as the "XSL Editor," must be employed. Thus, while systems are available that can be used for editing display rules, writing one still requires knowledge of a formatting language.

Therefore, there is a demand for a system that can automatically generate a complicated display rule, without a user being required to directly edit the rule. There especially is a demand for a system that can automatically generate a display rule and that requires that a user merely perform an exemplary editing operation while viewing a display screen. With this system, a useful and convenient display rule generation means would be provided a user, but there would be no need for the user to be conversant with the usage of the language employed to write a display rule. Further, this system would automatically generate a display rule by reflecting the exemplary editing operations performed by a user, who, to obtain a desirable display rule, must merely perform a series of editing operations that are successively presented on a display screen. Thus, since a display rule would be automatically generated at the same time as the editing operations were displayed, a very useful system would be provided for a user.

In the same manner, when "Visual XML Transformation" was employed, a display rule could be generated by the transformation that was performed for the document type definition, without requiring that a user be conversant with the employment of the description language used for the display rule. However, according to this method, a user could not change a display rule while visually confirming the resultant document.

The above described programming methods for which exemplification would be used are provided merely as background information concerning the automatic generation of display rules by a general program for which examples are used. No technique based on an exemplary operation for automatically generating a display rule for a structured document has previously been disclosed.

BRIEF SUMMARY OF THE INVENTION

It is, therefore, one object of the present invention to provide a technique, based on an exemplary operation, for automatically and visually generating a display rule for a structured document.

It is another object of the present invention to provide a technique whereby a display rule is gradually corrected while a resultant document is visually confirmed, and for interactively generating a display rule.

It is an additional object of the present invention to provide a technique for automatically generating a high-level display rule by repeatedly performing successive corrections, without requiring that a user be conversant with the employment of the description language used to alter the display rule.

It is also an object of the present invention, in addition to the generation of a display rule, to provide a technique for changing a structured document, or for changing the document type definition (grammar definition) of the structured document, based on an alteration of an exemplary document that is displayed.

As an overview of the present invention, a system according to the invention comprises: base display rule generation means, display document generation means, display document visual editing environment and display rule updating means. A drawing engine is included in the display document visual editing environment.

When a structured document and its document type definition (grammar definition) are provided for the system of the invention, first, the base display rule generation means automatically generates a first display rule for the structured document. The document definition for the structured document and a default generation rule that is defined in advance are employed for the generation of the first display rule. The default generation rule is simple, and is, for example, merely a rule for listing the elements of the structured document that is employed as the default.

The first display rule is applied for the structured document, for which the display document generation means generates a first display document. At this time, an element correlation file is generated that represents the correlations between the elements of the first display document and the elements of the structured document.

The first display document is presented on a display device by the drawing engine, and can be visually edited in the display document visual editing environment. At this time, an arbitrary editing process can be employed to obtain a complicated display form that matches the purpose of the user. During the editing process, the elements of the display document that are edited and the contents provided by the editing are stored in an editing operation history file. Then, when the editing sequence has been completed, a second display document is produced that includes the editing results and the editing operation history file.

When the editing operation is terminated, the display rule updating means generates an updated display rule (a second display rule) by referring to the first display document, the original document, before the editing was performed; the second display document, the document after the editing was performed; the editing operation history file; the element correlation file; the structure document; and the document type definition.

According to the present invention, a display rule can be automatically generated by the performance of an exemplary operation. That is, the document that is displayed can be visually processed or corrected in the display document visual editing environment, so that a display rule that matches the processing or the correction can be automatically generated. Therefore, even when a user is not conversant with the use of a description language, a complicated display rule that corresponds to the purpose of the user can be easily produced. Further, during the process of generating the display rule, the display results can be visually confirmed by the user.

A natural part of the generation of the second display rule is that, based on the second display rule, a third display rule can be generated, and that fourth and fifth display rules can be generated in the same manner.

Further, according to the invention, an example default generation rule can be one used for generating the first display rule, in accordance with a form that is consonant with the depth of the element of the structured document, a rule for displaying a document in a table form, a display rule for which a simple listing is used, or a rule for displaying a document using indentation that is consonant with the depth of an element.

In addition, the present invention is employed not only for the generation of a display rule, but also for changing a structured document, or for changing the document type definition (grammar definition) of the structured document.

BRIEF DESCRIPTION OF THE DRAWINGS

FIG. 22A is a diagram showing an XML document for a fruit price list.

FIG. 22B is a diagram showing a DTD document on which the XML document in FIG. 22A is based.

FIG. 22C is a diagram showing the XML Schema on which the XML document in FIG. 22A is based.

FIG. 23 is a diagram showing an XSL document that serves as a base for displaying the XML document in FIG. 22A.

FIG. 24 is a diagram showing an HTML document obtained from the XSL document in FIG. 23.

FIG. 25 is a diagram showing a list of element correlations between the XML document elements in FIG. 22A and the HTML document elements in FIG. 24.

FIG. 28 is a diagram showing an XSL document that is generated after the editing operation is performed on the screen in FIG. 27.

FIG. 30 is a diagram showing an HTML document for the display screen in FIG. 29.

FIG. 31 is a diagram showing an XSL document that is generated after the editing operation is performed for the screen in FIG. 29.

FIG. 33 is a diagram showing an HTML document for the display screen in FIG. 32.

FIG. 34 is a diagram showing an XSL document that is generated after the editing operation is performed for the screen in FIG. 32.

FIG. 35A is a diagram showing an XML document for a product list.

FIG. 35B is a diagram snowing a DTD document on which the XML document in FIG. 35A is based.

FIG. 35C is a diagram showing the XML Schema on which the XML document in FIG. 35A is based.

FIG. 36 is a diagram showing an XSL document that serves as a base for displaying the XML document in FIG. 35A.

FIG. 37 is a diagram showing an HTML document obtained from the XSL document in FIG. 36.

FIG. 40 is a diagram showing an HTML document for the display screen in FIG. 39.

FIG. 41 is a diagram showing an XSL document that is generated after the editing operation is performed for the screen in FIG. 39.

FIG. 43 is a diagram showing an HTML document for the display screen in FIG. 42.

FIG. 44 is a diagram showing an XSL document that is generated after the editing operation is performed for the screen in FIG. 42.

FIG. 46 is a diagram showing an HTML document for the display screen in FIG. 45.

FIG. 48 is a diagram showing an HTML document for the display screen in FIG. 47.

FIG. 49 is a diagram showing an XSL document that is generated after the editing operation is performed for the screen in FIG. 47.

FIG. 51 is a diagram showing an HTML document for the display screen in FIG. 50.

FIG. 52 is a diagram showing an XSL document that is generated after the editing operation is performed for the screen in FIG. 50.

FIGS. 53A to 53E are diagrams showing lists for explaining the transformation of an unspecified number of elements as a result of generalization of an operation sequence, FIG. 53A showing an element correlation, FIG. 53B showing a portion of the XPath used in common, FIG. 53C showing an obtained XPath, FIG. 53D showing a correlation between the position in a table and the XPath, and FIG. 53E showing a generated <xsl:for-each>.

FIG. 54 is a diagram showing an XSL document that is generated.

FIG. 55A is a diagram showing a DTD for a booklist.

FIG. 55B is a diagram showing an SGML document for the booklist.

FIG. 56A is a diagram showing a DSSSL document generated as a base display rule.

FIG. 56B is a diagram showing a display screen for an SGML document displayed by the base display rule.

FIG. 56C is a diagram showing a display screen after editing.

FIG. 56D is a diagram showing an updated DSSSL document.

FIG. 57A is a diagram showing a data list in a CSV form.

FIG. 57B is a diagram showing a rule for displaying the data list as a simple table.

FIG. 57C is a diagram showing a display screen in the table form.

FIG. 58 is a diagram showing a display screen after editing.

FIG. 59 is a diagram showing a display rule after being updated.

FIG. 60 is a flowchart showing an example method for changing the structured document.

FIGS. 62A and 62B are diagrams showing a list for explaining the structured document changing method; FIG. 62A showing a DTD and an XML Schema for a stationary price list, and FIG. 62B being an XML document for the stationary price list.

FIG. 63A is a diagram showing an XSL document that is a base for displaying the XML document in FIG. 62B.

FIG. 63B is a diagram showing an HTML document obtained from the XSL document in FIG. 63A.

FIG. 69A is a diagram showing a display screen that is obtained after additional editing is performed for the screen in FIG. 65.

FIG. 69B is a diagram showing a list indicating an updated DTD.

FIG. 70A is a diagram showing a display rule.

FIG. 70B is a diagram showing a display document.

FIG. 72A is a diagram showing a display rule.

FIG. 72B is a diagram showing a display document.

DETAILED DESCRIPTION OF THE INVENTION

Figure 1:
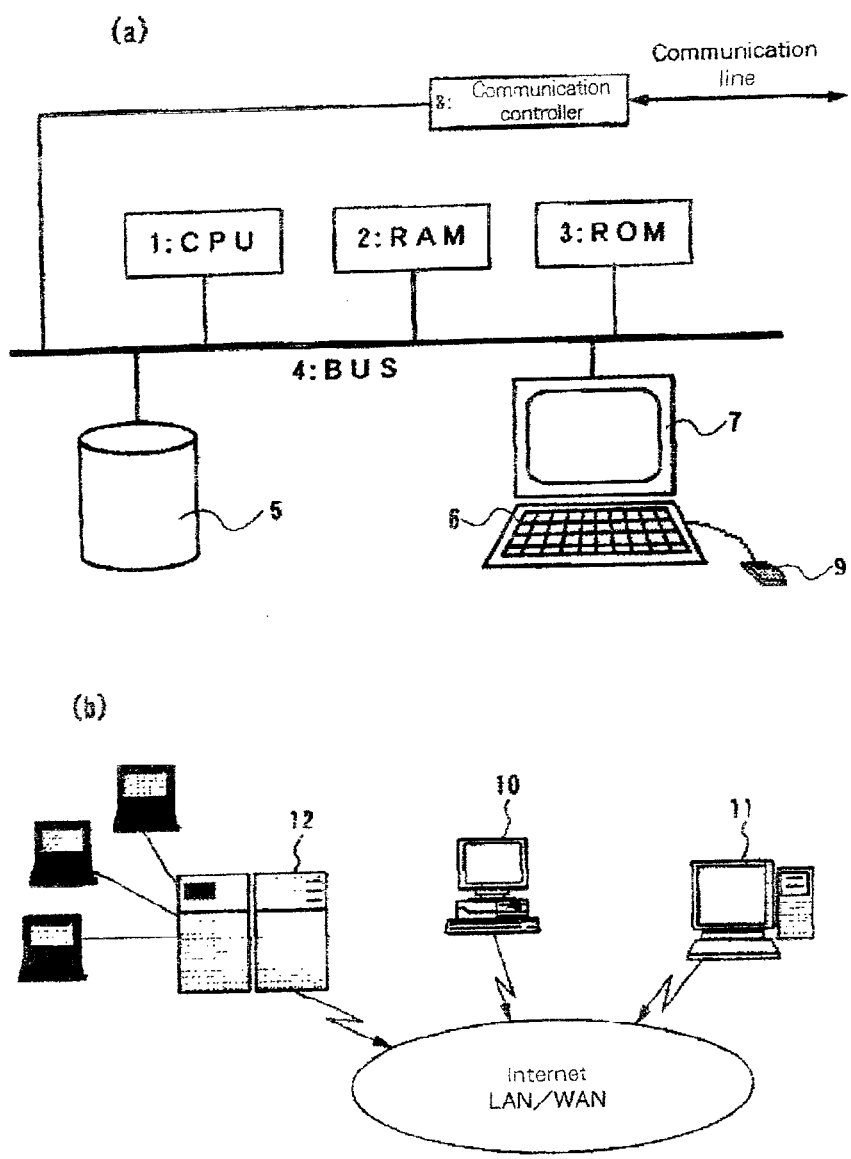
FIGS. 1A and 1B are conceptual diagrams providing an overview of a system that carries out a method according to the present invention, with FIG. 1A being a schematic diagram showing the arrangement of a stand-alone computer, and FIG. 1B being a schematic diagram showing the arrangement of a computer network.

The preferred embodiments of the present invention will now be described in detail while referring to the accompanying drawings. It should be noted, however, that a large variety of modes can be employed to carry out the present invention; it should not be understood that the present invention is limited to the embodiments described below. Relative to the embodiments, the same reference numerals are employed throughout to denote corresponding or identical components.

In the following embodiments, mainly, a method or a system will be described. As would be obvious to one having ordinary skill in the art, however, the present invention can also be implemented as a storage medium on which computer-usable program code is stored. Thus, the present invention can be applied for hardware or for software, or for a combination of software and hardware. And for the storage medium of program code, an arbitrary computer-readable storage medium, such as a hard disk, a CD-ROM, an optical storage device or a magnet storage device, can be used.

Embodiment 1

1. Hardware Arrangement of a System

FIGS. 1A and 1B are conceptual diagrams showing an overview of a system on which a method according to the present invention is implemented. The system used for the invention can be a stand-alone computer system, or a computer network constituted by a plurality of computer systems. The schematic arrangement for a stand-alone computer is shown in FIG. 1A, and the schematic arrangement for a computer network is shown in FIG. 1B.

The computer system comprises a central processing unit (CPU) 1, a main memory (RAM) 2 and a nonvolatile storage device (ROM) 3, which are interconnected by a bus 4. In addition, a co-processor, an image accelerator, a cache memory and an input/out controller (I/O) may be connected to the bus 4. An external storage device 5, a data input device 6, a display device 7 and a communication controller 8 are also connected to the bus 4 via appropriate interfaces. Naturally, this computer system can include such other hardware resources as a computer system is generally equipped with.

A hard disk drive is a specific example of an apparatus used for the external storage device 5. However, a hard disk drive is not the only external storage device 5 that can be used, a magneto-optical storage device, an optical storage device, or a semiconductor storage device, such as a flash memory, can also be used. In addition, a read only storage device, such as a CD-ROM, can also be employed as an external storage device 5 when it is used only for the reading of a program or of data.

The data input device 6 can be an input device, such as a keyboard, or a pointing device, such as a mouse 9. An audio input device can also be included as a data input device 6. And the display device 7 can be, for example, a CRT, or a liquid or a plasma display device.

When a plurality of computer systems are employed for the present invention, as is shown in FIG. 1B, the computer systems may be connected via a LAN or a WAN, or via the Internet. In such a case, either a dedicated communication line or a public network line may be employed as the communication line used for the connection. Each of the computer systems includes a variety of computer types, such as personal computers 10, work stations 11, or main frame computers 12.

In a computer network, wherein a plurality of computer systems are interconnected, a part of a program can be executed by a user's computer and the rest of the program can be executed by a remote computer. In addition, no inquiry is issued concerning a computer that is used to store data that is to be used by a program. That is, so long as information (an address, concerning the location of data is obvious, an arbitrary location on a computer network can be used for the storage of data or for a required program. Further, a well known communication technique can be employed for communication between the network computers, and TCP/IP or HTTP protocol, for example, can be used. The location (address) of each file (each data or program file) that is stored in each storage device can be specified using a DNS or URL address. In this specification, the term "Internet" also includes the terms intranet and extranet, and accordingly, accessing the Internet also includes the accessing of an intranet and an extranet. In addition, a computer network includes both an official access computer network, and a private access computer network.

2. System for Generating a Display Rule for a Structured Document

Figure 2:
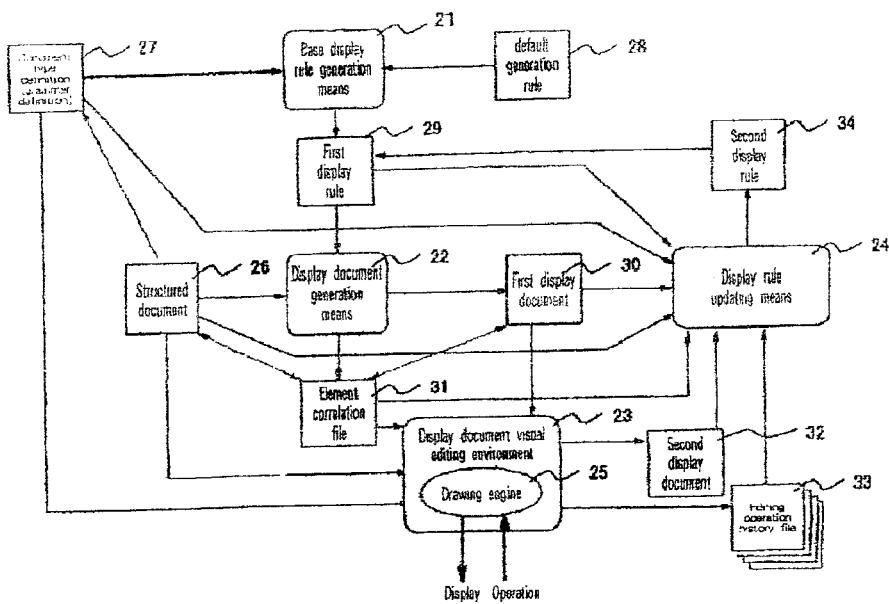
FIG. 2 is a block diagram illustrating one example display rule generation system according to the present invention.

FIG. 2 is a block diagram showing an example system for the generation of a display rule in accordance with the present invention.

The display rule generation system according to this embodiment comprises: base display rule generation means 21, display document generation means 22, a display document visual editing environment 23, and a display rule updating means 24. A drawing engine 25 for providing the document to be displayed is included in the display document visual editing environment 23.

Figure 3:
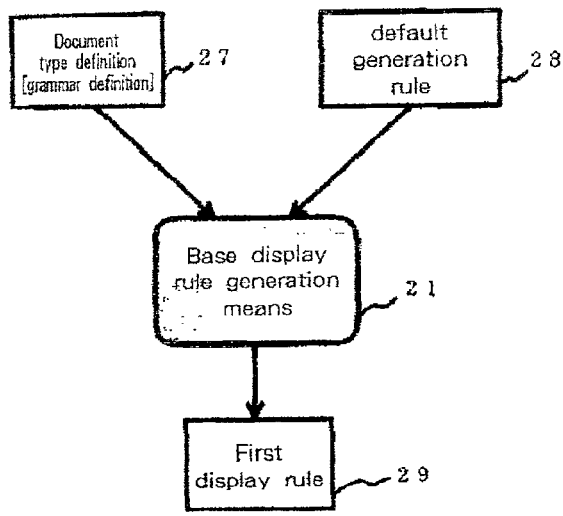
FIG. 3 is a block diagram showing a portion extracted from the periphery of the base display rule generation means in FIG. 2.

FIG. 3 is a block diagram showing a part of the arrangement in FIG. 2 that is related to the base display rule generation means 21.

The function of the base display rule generation means 21 is the execution of program code that is stored on the storage device 5, such as a hard disk, for which mainly the hardware resources, including the storage device 5, the CPU 1 and the main memory 2, are employed. The base display rule generation means 21 automatically generates a first display rule 29 by using a default generation rule 28 and a document type definition 27 for a structured document 26, which is provided for the system. The method for generating the first display rule 29 will be described later.

The structured document 26 is a document wherein the individual elements are structured in accordance with element names, the element contents, the element attributes, the attribute names and the attribute values. It can be, for example, an XML document, an SGML document or a CSV document. The structured document 26 is stored on the storage device 5, such as a hard disk.

The document type definition 27 is data for defining the type or the grammar of the structured document 26. The formats of the names, the structure and the contents of the elements are defined, and the attributes concerning the elements are declared to define the formats of the attribute names and the attribute values and the default attribute values. For example, for the XML document, the DTD or the XML Schema can be exemplified, and for the SGML document, the DTD can be exemplified. The document type definition 27, as well as the structured document 26, is stored on the storage device 5, such as a hard disk. The document type definition 27 may be written in the structured document 26, or it may be stored as a different document file, which can be referred to in the structured document 26. In this case, the structured document 26 and the document type definition 27 need not be present in the same computer system.

The default generation rule 28 is a simple rule that constitutes a base for the generation of the first display rule 29. According to the default generation rule 28, the document is changed in accordance with the grammar (the document type definition 27) of the structured document 26 into a visual representation, so that all the elements of the structured document 26 are merely listed. The default generation rule 28 is written as a document file, and this file is referred to by the program of the base display rule generation means 21. The default generation rule 20 may be coded as a program for the base display rule generation means 21.

The first display rule 29 is automatically generated for the structured document 26 by the base display rule generation means 21, and is then is stored in the storage device 5 such as a hard disk. Since at this stage, the default generation rule 28 is employed to generate the first display rule 29, the obtained display rule 29 is a simple rule. And when the structured document 26 is an XML document, the XSL document can be an example first display rule 29, and when the structured document 26 is an SGML document, a DSSSL document can be an example first display rule 29.

Figure 4:
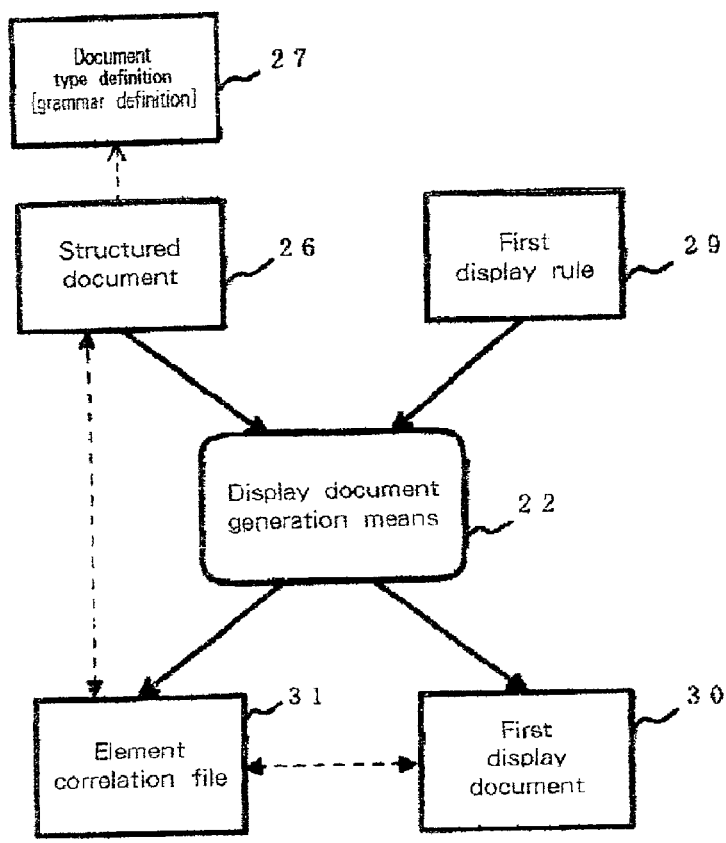
FIG. 4 is a block diagram showing a portion extracted from the periphery of the display document generation means in FIG. 2.

FIG. 4 is a block diagram illustrating a part of the arrangement in FIG. 2 on the periphery of the display document generation means 22.

The display document generation means 22 functions in response to the execution of the program code that is stored in the storage device 5, such as a hard disk, and hardware resources, such as the storage device 5, the CPU 1 and the main memory 2, are employed. The display document generation means 22 employs the structured document 26 and the first display rule 29 to generate the first display document 30 and the element correlation file 31.

The first display document 30 is constituted by replacing the individual elements of the structured document 26 with elements according to the first display rule 29. That is, when the structured document 26 and the first display rule 29 are provided for the display document generation means 22, the names and the contents of the elements of the structured document 26, and the attribute names and the attribute values of the elements are replaced with the elements of the first display document 30 in accordance with the rules of the first display rule 29. The thus obtained first display document 30, which is, for example, an HTML document or an XHTML document, is then recorded in the storage device 5 such as a hard disk.

The element correlation file 31 is used to store the correlation of elements, when the elements of the structured elements 26 are replaced with the elements of the first display document 30, and is stored in the storage device 5. As means for storing the correlation of the elements, the XPath, for example, can be employed.

Figure 5:
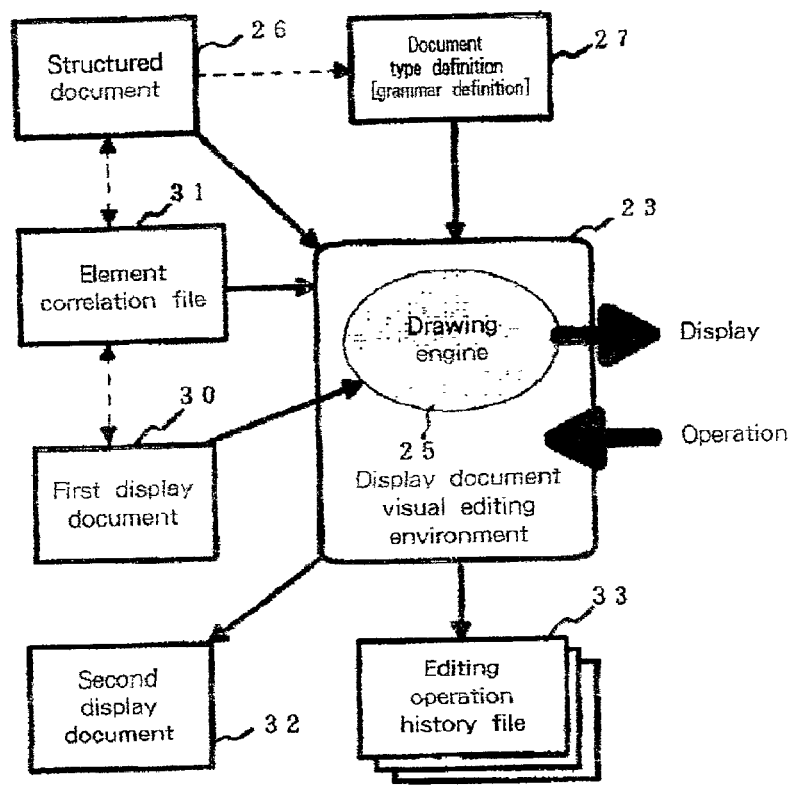
FIG. 5 is a block diagram showing a portion extracted from the periphery of a display document visual editing environment in FIG. 2.

FIG. 5 is a block diagram showing another part of the arrangement in FIG. 2 on the periphery of the display document visual editing environment 23.

The display document visual editing environment 23 is established by the execution of the program code that is stored in one type of the storage devices 5, and mainly, the CPU 1, the main memory 2, the display device 7, such as a CRT, and the input device 6, such as a keyboard or a pointing device, are employed as the hardware resources. The display document visual editing environment 23 includes the drawing engine 25, which replaces the individual elements of the display document with a visual representation and which displays all or only a part of the document.

The display document visual editing environment 23 provides an environment not only for the display of the document, but also for the visual editing or processing of the document. The user can thus perform an arbitrary editing process, such as the adding, deletion, correction, moving or uniting of the display contents, while watching the display screen, and thereafter, the edited document is stored as a second display document 32 in the storage device 5, such as a hard disk. The second display document 32 is a document that is obtained by editing or processing, and is written in the same language as the first display document 30, e.g., in the HTML or XHTML language.

The display document visual editing environment 23 generates the second display document 32, which is the edited document, and an editing operation history file 33, for recording the editing operation history. In the editing operation history file 22, the history of the editing operations, which are the processing contents, is stored for each element that is handled by the display document visual editing environment 23. The editing operation history file 33, which is stored in the storage device 5, is later referred to by the display rule updating means 24.

Figure 6:
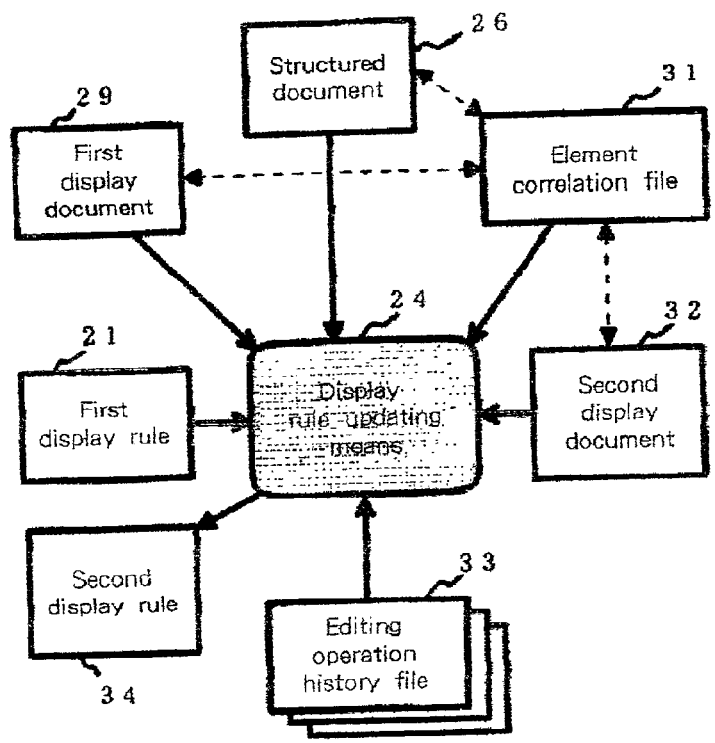
FIG. 6 is a block diagram showing a portion extracted from the periphery of display rule updating means in FIG. 2.

FIG. 6 is a block diagram illustrating a part in FIG. 2 on the periphery of the display rule updating means 24.

The function of display rule updating means 24 is carried out by the execution of the program code that is stored in the storage device 5, such as a hard disk, and mainly the hardware resources, such as the storage device 5, the CPU 1 and the main memory 2, are employed.

The display rule updating means 24 generates a second display rule 34, which is an updated display rule, by using the edited document (second display document 32), the element correlation file 31, the structured document 26, the document type definition 27 for the structured document 26, and the editing operation history file 33. The method used to generate the second display rule 34 will be described in detail later.

The second display rule 34 is written in the same language as the first display rule 29, e.g., the XSL language or the DSSSL language.

The thus arranged display rule generation system can employ the structured document 26 and the document type definition 27 to automatically generate the first display rule 29, and in accordance with the first display rule can generate the first display document 30 of the structured document 26 and then display it. That is, a user is not required to possess any special knowledge of the formatting language in order to write the display rule, and an environment can be provided for the user in which the editing and the processing of the display rule can be easily performed. Further, the first display document 30 can be arbitrarily edited or processed in accordance with the intent of a user, and a second display document 32 having a desired form can be obtained. Further, the second display rule 34 can be automatically generated so it reflects the editing operation that was performed for the second display document 32. That is, through the exemplary editing or processing that is performed, a user can obtain a desired display form, and the system can automatically generate a display rule 34 for providing such a display form, without any special knowledge being required of the user. That is, a user need only use an appropriate input device to edit or process a displayed document while watching the display screen of the computer, so that a display rule corresponding to the display can be automatically generated by the system. Therefore, a convenient system can be provided that can easily generate a complicated display rule, while the user is not aware of the details involved in the production of the display rule.

In the specifications, the possible physical locations are not limited for a file in which program code is recorded or a file in which document data are recorded. So long as the file is stored at a physical location that the computer system or the computer network can access, the data or the programs mentioned in the specifications can be stored at any location.

3. Method for generating a display rule for a structured document 3.1. Method for generating the first display rule (base display rule)

As is described above, the first display rule 29 serves as a base for the editing operation performed by the present invention, and the first display rule 29 is automatically generated by the base display rule generation means 21 while referring to the document type definition 27 and the default generation rule 28. The base display rule generation method will now be described for each type of default generation rule 28.

3.1.1. Generation of the First Display Rule Using a Header Element and a DL Element Assume that the following example rule is employed as the default generation rule 28.

Generate header elements <H1> to <H6> in accordance with the depths of the XML elements.

Use <DL> elements to represent the list of attributes of the individual elements.

Use elements to represent data provided by #PCDATA.

Figure 7:
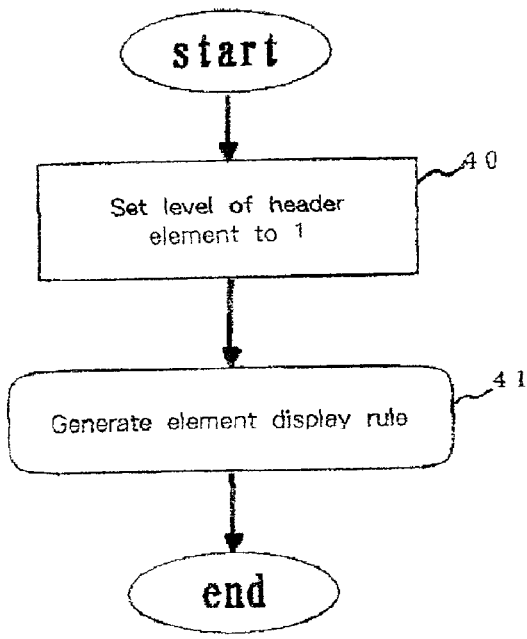
FIG. 7A is a flowchart showing an example method for generating a first display rule by using a header element and a DL element.
FIG. 7B is pseudo-code for the method in FIG. 7A.

FIG. 7A is a flowchart showing the overall method for the generation of the first display rule 29 using the header element and a DL element, and FIG. 7B is pseudo-code written in the "C++" language. Hereafter all pseudo-code will be written in "CC++." Further, numerals in parentheses with left arrows, such as "←(1)," are line numbers for a reference, and do not constitute part of the pseudo-code. This applies to all the succeeding pseudo-code entries. First, the level of the header element is defined as 1 (step 40), and the display rule for the element is generated (step 41). As is indicated by the pseudo-code, the function for generating the first display rule is "RuleGenByHeaderAnDL," and the argument is provided by a global variable. The function for generating the display rule for the element is "RuleGenOfElemByHeaderAndDL," and the element and the level are provided as local variables. In this case, "root" and "1" are provided as the arguments in order to set the header of the root element to <H1>.

Figure 8:
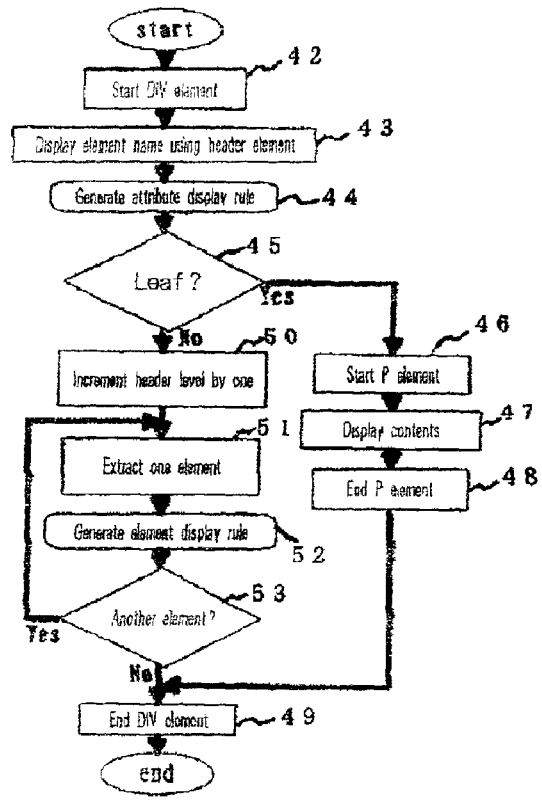
FIG. 8A is a flowchart showing an example method for generating an element display rule.
FIG. 8B is pseudo-code for the method in FIG. 8A.

FIG. 8A is a flowchart showing the method used to generate the element display rule "RuleGenOfElemByHeaderAndDL," while FIG. 8B is the pseudo-code for the method. The element is provided by a variable "elem," and the level is provided by a variable "level" (in the first pseudo-code line)

First, the <DIV> element, which is a tag for a general-purpose block level, is started (step 42, the second pseudo-code line), and the name of the element "elem" is displayed using the header element at the current level (step 43, the third pseudo-code line).

Then, the attribute display rule for the element is generated (step 44, the fourth pseudo-code line). The attribute display rule generation function is "RuleGenOfAttrByDL," according to the pseudo-code, and the element "elem" is provided as the local variable. The attribute display rule generation function will be described later.

Then, a check is performed to determine whether the element is a leaf (step 45, the fifth pseudo-code line). When the element is a leaf, the element that is a paragraph tag is begun (step 46), and the contents of the element are displayed (step 47, the eleventh pseudo-code line). The element is thereafter ended (step 48), and <DIV> is ended (step 49, the thirteenth pseudo-code line).

If the element is not a leaf, the header level is incremented by one (step 50), one element "e" is extracted from elements that are included in the element "elem" and that are greater by one level (they are nested more deeply) (step 51, the sixth to the seventh pseudo-code lines), and the element display rule generation (RuleGenOfElemByHeaderAndDL) is recursively performed for the extracted element "e" (step 52, the eighth pseudo-code line). This process is repeated for all the elements "e" (step 53, the seventh to the ninth pseudo-code lines) Then, the <DIV> element is ended (step 49), and the display rule generation for the target element "elem" is terminated.

Figure 9:
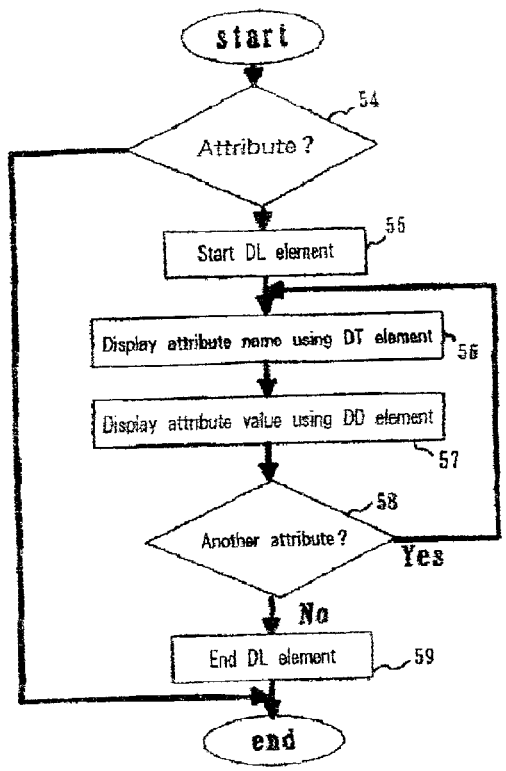
FIG. 9A is a flowchart showing an example method for generating an attribute display rule.
FIG. 9B is pseudo-code for the method in FIG. 9A.

FIG. 9A is a flowchart showing the attribute display rule generation method (RuleGenOfAttrByDL), and FIG. 9B is the pseudo-code for the method.

First, a check is performed to determine whether the target element "elem" has an attribute (step 54, the second pseudo-code line). When there is no attribute in the target element, the processing is terminated. When there is an attribute, the <DL> element that constitutes the tag for a definition list is started (step 55, the fourth pseudo-code line).

Then, the attribute name is displayed using the <DT> element that is the tag for a definition term (step 56, the sixth pseudo-code line), and the characteristic value is displayed using the <DD> element that is the tag for explaining the definition (step 57, the seventh pseudo-code line). This process is repeated for all the attributes of the target element "elem" (step 58, the fifth to the eighth pseudo-code lines), and the <DL> element is ended (step 59). As a result, the attributes of the target element "elem" are displayed.

The first display rule 29 can be automatically generated by using the header element and the DL element in the above described manner.

3.1.2. Generation of the First Display Rule Using a Table

An explanation will now be given for the method used to generate the first display rule 29 to provide a display in a table form. This method is especially used when the depth level of the element is 2.

Figure 10:
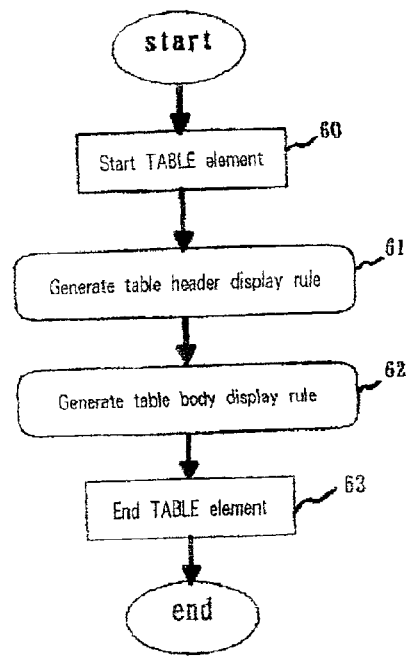
FIG. 10A is a flowchart showing an example method for generating a first display rule by using a table.
FIG. 10B is pseudo-code for the method in FIG. 10A.

FIG. 10A is a flowchart showing the overall method for generating the first display rule 29 for a table form, and FIG. 10B is the pseudo-code for this method.

First, a <TABLE> element that represents a table is begun (step 60, the second pseudo-code line), and the display rule for a table header is generated (RuleGenByTHEAD) (step 61, the third pseudo-code line). Then, the display rule for the body of the table is generated (RuleGenByTBODY) (step 62, the fourth pseudo-code line). The <TABLE> element is thereafter ended (step 63, the fifth pseudo-code line).

Figure 11:
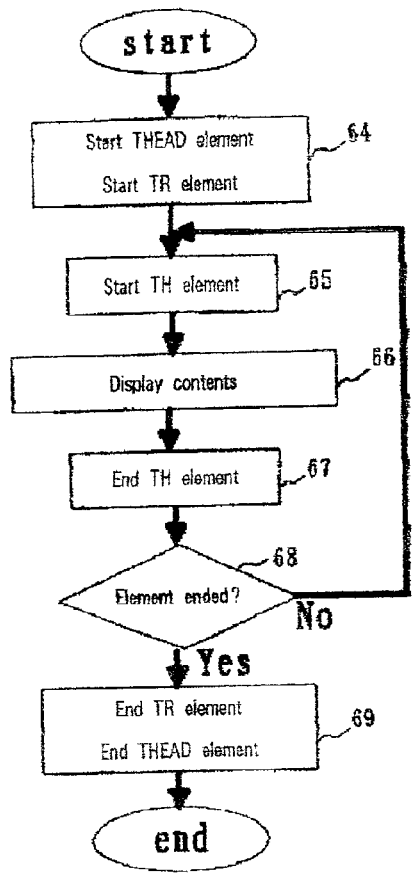
FIG. 11A is a flowchart showing an example method for generating a display rule by using a table header.
FIG. 11B is pseudo-code for the method in FIG. 11A.

FIG. 11A is a flowchart showing a method for generating a display rule for the table header (RuleGenByTHEAD), and FIG. 11B is the pseudo-code for this method.

A <THEAD> element that represents the table header is begun, and a <TR> element that is the line element of the table is begun (step 64, the third and the fourth pseudo-code lines). Then, a <TH> element that is a table header cell is started (step 65) and the element contents are displayed (step 66), and the <TH> element is thereafter ended (step 67). This process is performed for all the lower elements (step 68). That is, the elements that constitute the target element "elem" are listed (the fourth pseudo-code line), and all the elements "e" on the list are displayed while enclosed by the <TH> tag (the fifth to the seventh pseudo-code lines). Thereafter, the <TR> element is ended, and the <THEAD> element is also ended (step 69, the eighth to the ninth pseudo-code lines).

Figure 12:
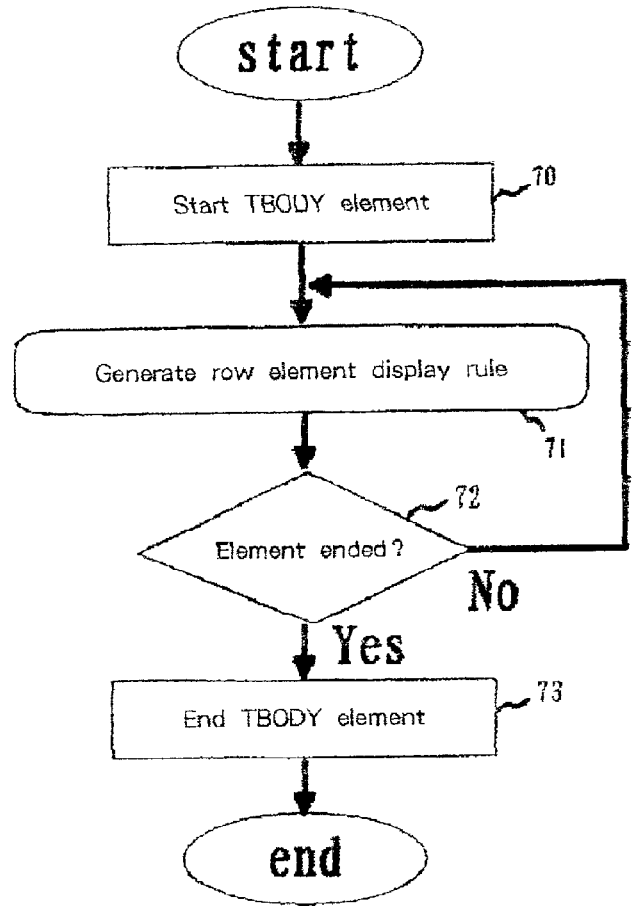
FIG. 12A is a flowchart showing an example method for generating a display rule by using the body of a table.
FIG. 12B is pseudo-code for the method in FIG. 12A.

FIG. 12A is a flowchart showing a method for generating a display rule for the body of the table (RuleGenByTBODY), and FIG. 12B is the pseudo-code for this method.

First, a <TBODY> element that represents the body of a table is started (step 70, the second pseudo-code line), and the display rule for column elements is generated (RuleGenByTR) (step 71). This process is performed for all the lower elements (step 72). Specifically, the elements that constitute the target element "elem" are listed (the third pseudo-code line), and the display rule for the column elements is generated for all the elements "e" on the list (the fourth to the sixth pseudo-code lines). Thereafter, the <TBODY> element is ended (step 73, the seventh pseudo-code line).

Figure 13:
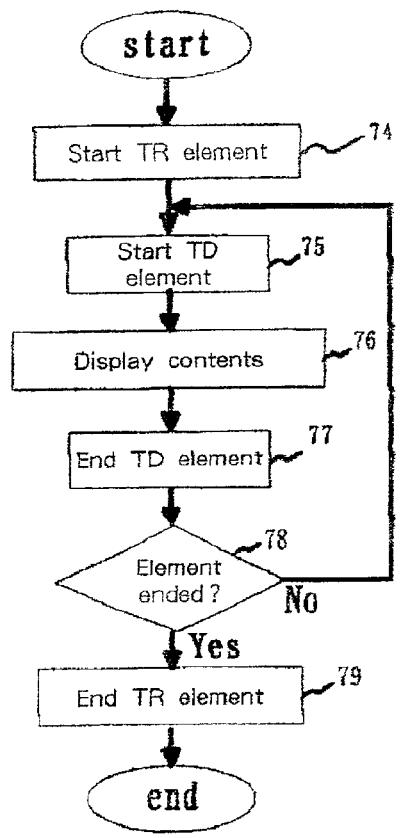
FIG. 13A is a flowchart showing an example method for generating a display rule by using a column element.
FIG. 13B is pseudo-code for the method in FIG. 13A.

FIG. 13A is a flowchart showing a method for generating a display rule for column elements (RuleGenByTR), and FIG. 13B is the pseudo-code for this method.

First, the <TR> element, which is a row element in a table, is started (step 74, the second pseudo-code line). Then, the <TD> element that is a cell in the table is started (step 75) and the element contents are displayed (step 76), and then the <TD> element is ended (step 77). This process is performed for all the lower elements (step 78). Specifically, the elements that constitute the target element "elem" are listed (the third pseudo-code line), and all the elements "e" on the list are displayed while enclosed by the <TD> tab (the fourth to the sixth pseudo-code lines). Thereafter, the <TR> element is ended (step 79, the seventh pseudo-code line).

In this manner, the first display rule 29 in the table form can be automatically generated.

3.1.3. Generation of the First Display Rule by Using Simple Enumeration

Figure 14:
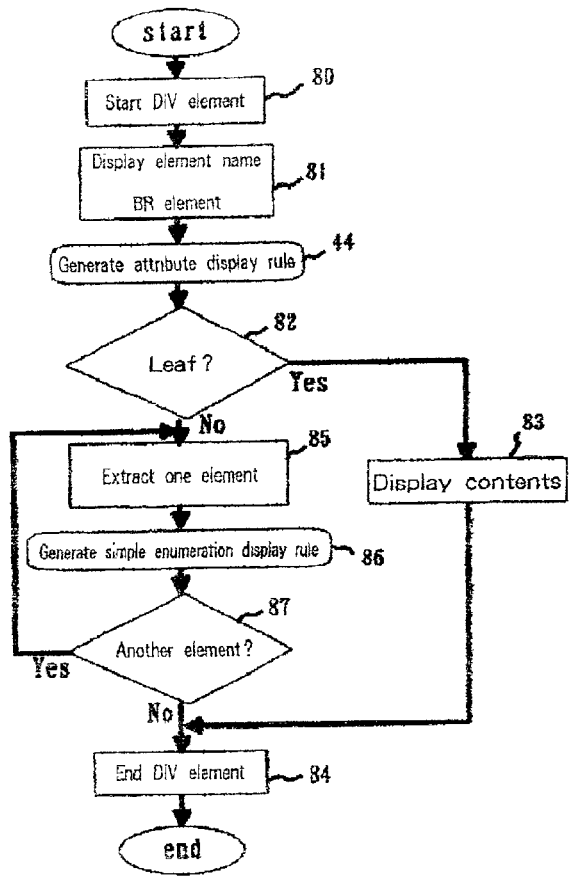
FIG. 14A is a flowchart showing an example method for generating a first display rule by simply enumerating element names and element contents.
FIG. 14B is pseudo-code for the method in FIG. 14A.

An explanation will now be given for a method for generating the first display rule 29 using the simple enumeration of elements. FIG. 14A is a flowchart showing the method used for simply enumerating the element name and contents to generate the first display rule 29. FIG. 14B is the a pseudo-code for this method.

First, the <DIV> element is started (step 80, the second pseudo-code line). The element name of the target element "elem" is displayed, and a <BR> element that is a return tag is added (step 81, the third and the fourth pseudo-code lines). Then, the rule generation is performed in the same manner as for the attribute display rule generation (step 44) explained in "3.1.1. Generation of the first display rule using a header element and a DL element," and a check is performed to determine whether the target element "elem" is a leaf (step 82, the sixth pseudo-code line). When the element "elem" is a leaf, the element contents are displayed (step 83, the twelfth pseudo-code line). Thereafter, the <DIV> element is ended (step 84, the fourteenth pseudo-code line).

When the element "elem" is not a leaf, one element "e" is extracted from the elements included in the target element "elem" (step 85, the seventh to the eighth pseudo-code lines). Then, the generation of a display rule for simple enumeration (RuleGenOfElemBySimpleEnum) is recursively performed for the extracted element "e" (step 86, the ninth pseudo-code line). This process is repeated for all the elements "e" (step 87, the eighth to the tenth pseudo-code lines). Thereafter, the <DIV> element is ended (step 84), and the generation of the display rule is terminated for the target element "elem."

In this manner, the first display rule 29 for using simple enumeration is automatically generated.

3.1.4. Generation of the First Display Rule by Using Indentation

Figure 15:
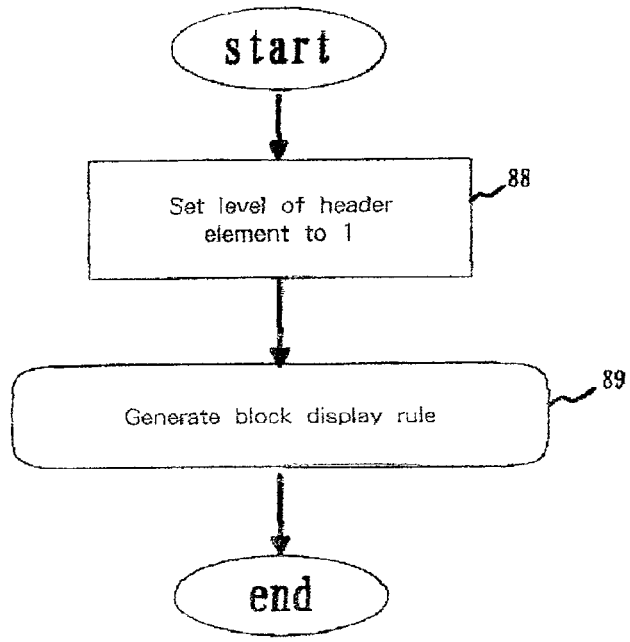
FIG. 15A is a flowchart showing an example method for generating a first display rule using indentation.
FIG. 15B is pseudo-code for the method in FIG. 15A.

An explanation will now be given for a method for generating a display rule by using indentation in accordance with the depth of an element. FIG. 15A is a flowchart showing the overall method for generating the first display rule 29 using indentation, and FIG. 15B is the pseudo-code for this method.

First, the level of the header element is defined as 1 (step 88), and a block display rule is generated (step 89). The block display rule generation function is "RuleGenOfElemByBLOCKQUOTE." The element and the level are provided as local variables, and in this case, "root" and "1" are provided as arguments in order to set the header of the root element to <H1>.

Figure 16:
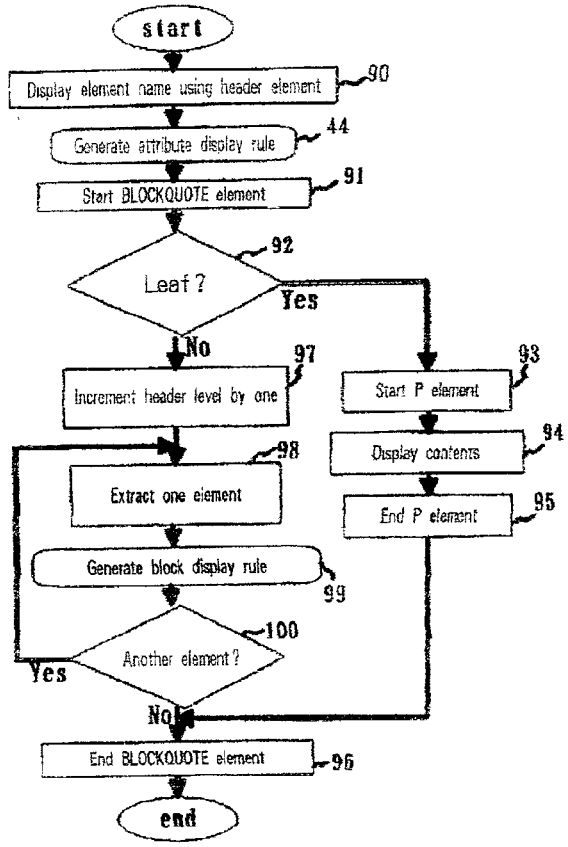
FIG. 16A is a flowchart showing an example method for generating a block display rule.
FIG. 16B is pseudo-code for the method in FIG. 15A.

FIG. 16A is a flowchart showing the block display rule generation method (RuleGenOfElemByBLOCKQUOTE), and FIG. 16B is the pseudo-code for this method. The element is provided by the variable "elem" and the level is provided by the variable "level" (the first pseudo-code line).

First, the element name of the element "elem" is displayed by using the header element of the current level (step 90, the second pseudo-code line).

Then, the rule generation is performed in the same manner as for the attribute display rule generation (step 44) explained in "3.1.1. Generation of the first display rule using a header element and a DL element," and a <BLOCKQUOTE> element, which is a quotation tag for a block level, is started (step 91, the fourth pseudo-code line).

Next, a check is performed to determine whether the element is a leaf (step 92, the fifth pseudo-code line). When the element is a leaf, an element that is a paragraph tag is started (step 93), and the element contents are displayed (step 94, the eleventh pseudo-code line). The element is thereafter ended (step 95), and the <BLOCKQUOTE> element is ended (step 96, the thirteenth pseudo-code line).

If the element is not a leaf, the header level is incremented by one (step 97) and one element "e" is extracted from the elements that are included in the target element "elem" and are greater by one level (they are nested more deeply) (step 98, the sixth and the seventh pseudo-code lines), and then the block display rule generation method (RuleGenOfElemByBLOCKQUOTE) is recursively performed for the extracted element "e" (step 99, the eighth pseudo-code line). This process is repeated for all the elements "e" (step 100, the seventh to the ninth pseudo-code lines). Thereafter, the <BLOCKQUOTE> element is ended (step 96), and the generation of the display rule for the target element "elem" is terminated.

In this manner, the first display rule 29 by indentation can be automatically generated.

The method for generating the first display rule 29, which is the function of the base display rule generation means 21, has been explained. As is described above, according to the invention, when the document type definition 27 of the structured document 26 is provided, the first display rule 29 can be automatically generated by using the default generation rule 28, and can be used as the base for the editing operation function that will be described later.

3.2. Method for Generating a Display Document

It is well known by one having ordinary skill in the art that the first display rule 29 is employed to convert the structured document 26 into a display document. When an XML document or an SGML document is used as an example for the structured document 26, for an HTML document to be produced, only an XSL style sheet or a DSSSL document need be generated as the first display rule 29, as is well known in the art.

It should be noted that in accordance with the present invention not only is a display document generated, but also the element correlation file 33 is generated in which the correlations between the elements of the structured document 26 and the elements of the display document 30 are recorded. These correlations can be specified by using, for example, the XPath.

3.3. Method for Editing a Display Document

When the display document is an HTML document, the editing (processing) of the display document appears as a change in a tag and a change in an element position. In this invention, the history of these changes is recorded in correlation with the elements of the second display document 32 each time the alteration operation is performed. The element position can be recorded using the Xpath, as in the method in 3.2. The recording of elements and the alteration operation can be performed by using a well known technique, such as a method for adding, for each change, the matter that is changed to the editing operation history file 33.

Figure 17:
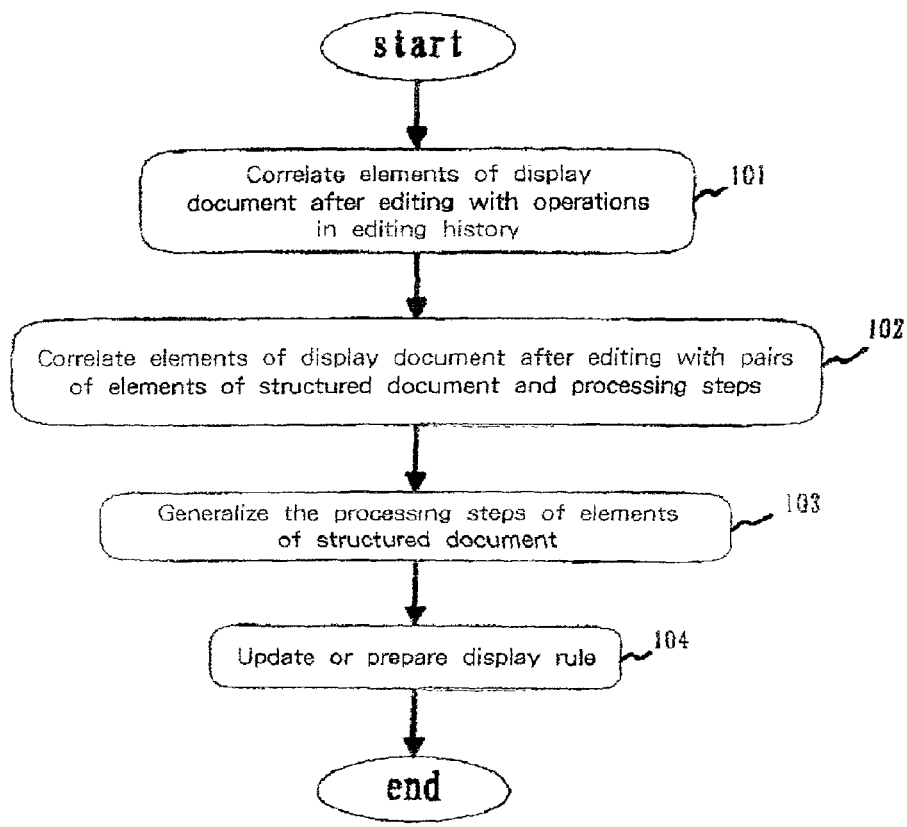
FIG. 17 is a flowchart showing an example method for updating a display rule.

3.4. Method for Updating a Display Rule FIG. 17 is a flowchart showing the overall method for updating a display rule. First, the individual elements of the second display document 32 obtained by the editing operation (a document after being edited) are correlated with the individual operations recorded in the editing operation history file 33 (step 101). Then, the individual elements of the edited document (the second display document 32) are correlated with pairs of the elements of the structured document 26 and their processes (step 102). The processing of the elements of the structured document 26 is generalized (step 103), and the first display rule 29 is updated to generate the second display rule 34 (step 104) Since the generalization of the processing of the elements of the structured document 26 (step 103) may be performed as needed, the function of the present invention can be implemented even without performing this step. In other words, the processing generalization (step 103) is not requisite for the present invention. The individual steps will now be described in detail.

Figure 18:
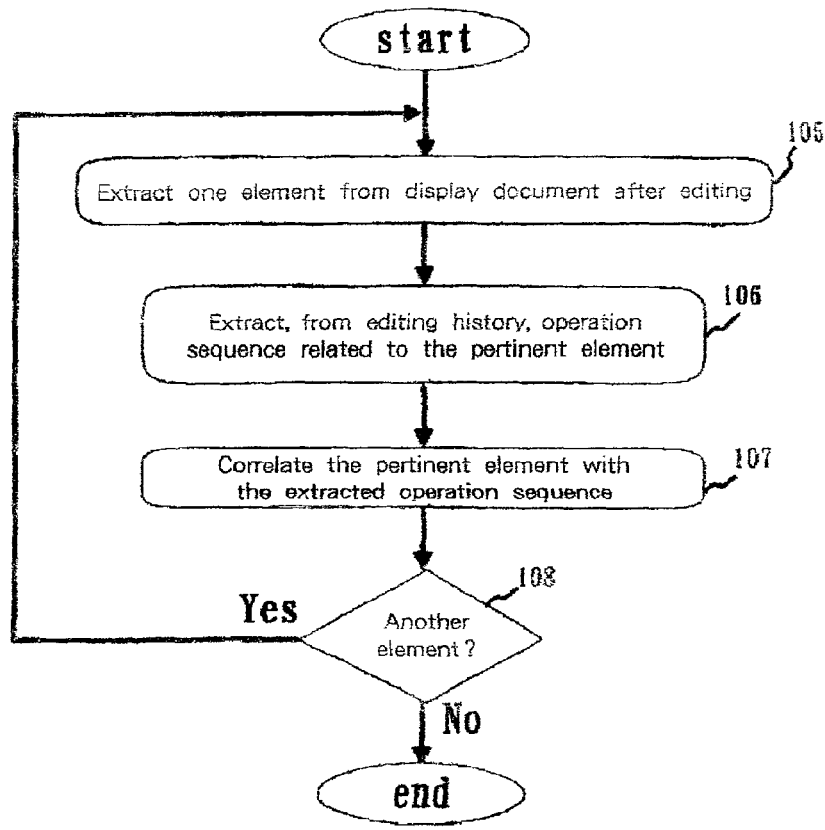
FIG. 18A is a flowchart showing an example method for correlating the elements of a display document after editing with operations in an editing operation history file.
FIG. 18B is pseudo-code for the method in FIG. 18A.

FIG. 18A is a flowchart showing a method for correlating the elements of the edited display document (the second display document 32) with the elements of the operations recorded in the editing operation history file 33. FIG. 18B is the pseudo-code for this method.

First, one element is extracted from the edited display document (second display document 32) (step 105, the second pseudo-code line), and the operation sequence relative to the element is extracted from the editing operation history file 33 (step 106, the fourth to the seventh pseudo-code lines). Then, the element and the operation sequence are correlated with each other (step 107, the ninth pseudo-code line). This process is performed for all the elements (step 108, the first to the tenth pseudo-code lines).

Figure 19:
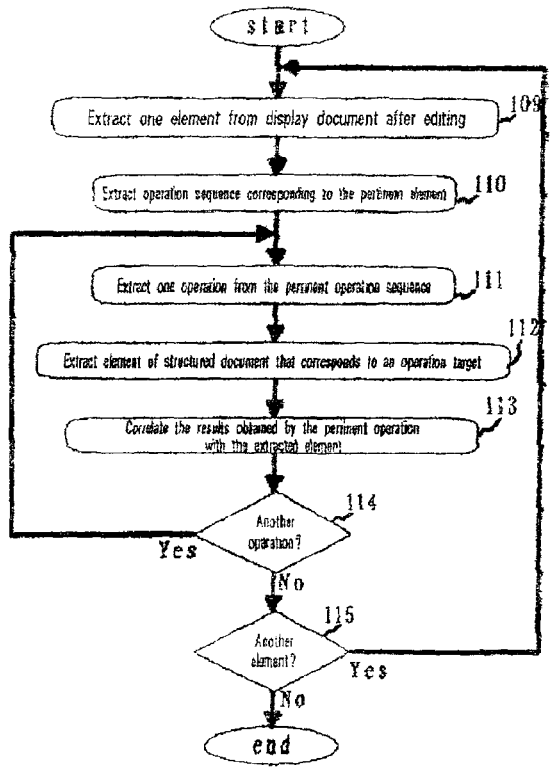
FIG. 19A is a flowchart showing an example method for correlating the elements of a display document after editing performed using pairs of structured document elements and their processing steps.
FIG. 19B is pseudo-code for the method in FIG. 19A.

FIG. 19A is a flowchart showing a method for correlating the individual elements of a display document after they are edited, with pairs of the elements of the structured document being correlated with the processes FIG. 19B is the pseudo-code for this method.

First, one element is extracted from the edited document (the second display document 32) (step 109, the second pseudo-code line), and the operation sequence extracted at step 106 is fetched (step 110, the third pseudo-code line). It should be noted that if there is no operation history for the element, the succeeding process is not performed and program control shifts to the next element. One operation is extracted from the operation sequence (step 111, the seventh pseudo-code line), and the element of the structured document that corresponds to the target element of the display document is specified (step 112, the eighth pseudo-code line). It should be noted that the element correlation file 31, in which the correlations of the elements of the structured document and the elements of the display document are recorded, is referred to for the specification of the element of the structured document (the eighth pseudo-code line). Then, the element of the structured document is correlated with the process contents prepared by the operation (step 113, the ninth and the tenth pseudo-code lines). This process is performed for all the operation sequences (step 114), and is further performed for all the elements of the display document (step 115).

Figure 20:
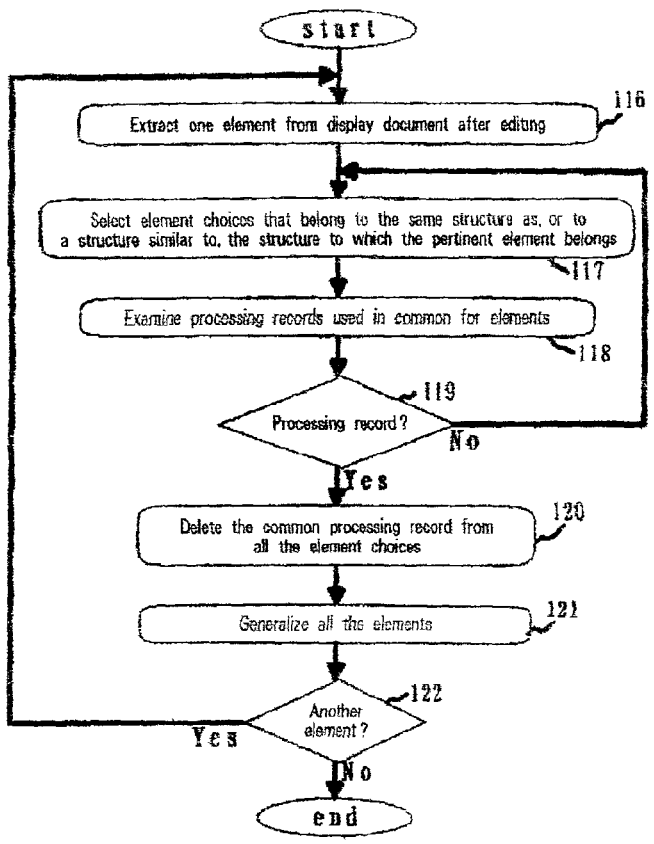
FIG. 20A is a flowchart showing an example method for generalizing the processing steps for the elements of the structured document.
FIG. 20B is pseudo-code for the method in FIG. 20A.

FIG. 20A is a flowchart showing a method for generalizing the processing for the element of the structured document. FIG. 20B is the pseudo-code for this method.

First, one element is extracted from the edited display document (the second display document 32) (step 116, the first pseudo-code line). Other element choices are selected that belong to the structure that is the same as or similar to the structure to which the extracted element belongs (step 117, the second pseudo-code line). The processing record (operation) that is used in common for the element group is then examined (step 118, the third pseudo-code line) to determine whether the processing record is present (step 119, the fourth pseudo-code line). If the processing record is present, the processing record is deleted in common from all the element choices (step 120, the fifth to the seventh pseudo-code lines), and the generalization is performed for all the elements (step 121, the eighth and ninth pseudo-code lines), and the generalized data (gnode, ghist) are added to "tbl" and stored (the tenth pseudo-code line). When there is no processing record, program control returns to step 117. This process is performed for all the elements of the display document (step 122, the first pseudo-code line).

Figure 21:
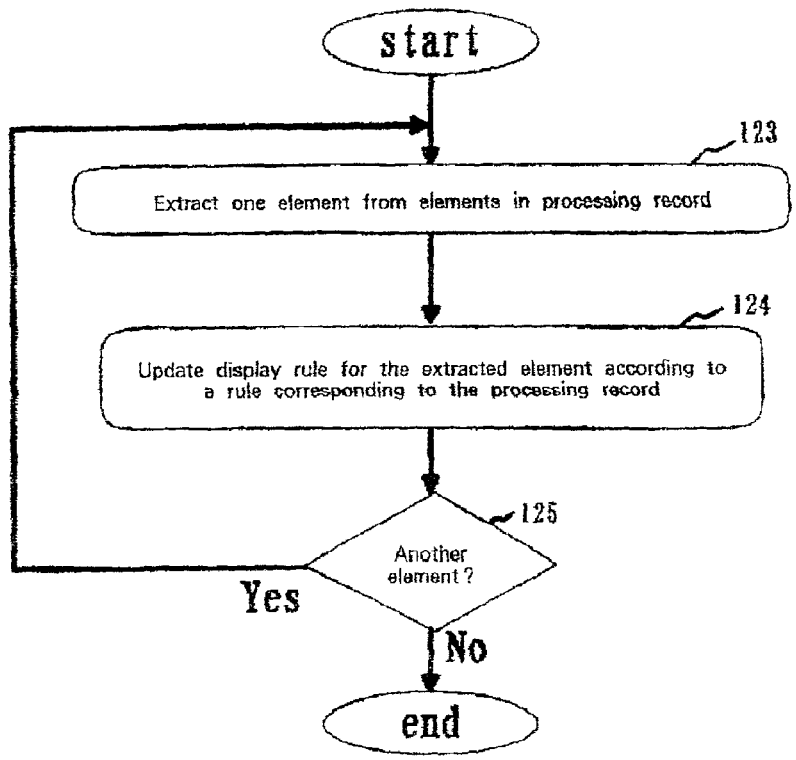
FIG. 21A is a flowchart showing an example method for updating and preparing a display rule.
FIG. 21B is pseudo-code for the method in FIG. 21A.

FIG. 21A is a flowchart showing a method for updating and generating a display rule, and FIG. 21B is the pseudo-code for this method.

First, one element is extracted from elements in the processing record (operation) (step 123, the first pseudo-code line). Then, the display rule for the element is updated using the rule that corresponds to the processing record (operation) (step 124, the second and the third pseudo-code lines). This process is performed for all the elements (step 125).

The display rule updating method has been explained. However, the updating method of this invention does not merely update the contents of the display document, but also changes the display rule that is based on the document type definition of the element of the structured document that corresponds to the element of the display document that was edited. Thus, according to the display rule generation method in this embodiment, the user need only perform an exemplary editing operation, while viewing the screen of the display device 7, for the display rule to be automatically generated while taking into account the structure of the structured document. Further, when the method of the invention is repetitively employed, the user can generate the display rule while confirming the edited contents, and can thus obtain a display rule for a high-level display form.

4. Specific example for a display rule generation method

A method for automatically generating a display rule for a structured document will now be described by using a specific example. In this explanation, an XML document is employed as the structured document 26 to be edited, a DTD/XML Schema is employed as the document type definition (grammar definition) 27, a XSL document is employed as the first display rule 29 and an HTML (XHTML) document is employed as the display document 30.

4.1. Position Change of an Element

In FIG. 22A, a fruit price list "fruitlist" written in the XML language is shown as an example for the structured document 26; in FIG. 22B, a DTD document is shown on which the XML the fruit price list document is based; and in FIG. 22C, the XML Schema is shown on which the XML fruit price list document is based. To the left of each list, the line numbering is shown every five lines. The line numbers are provided merely for convenience when referring to the lists, and do not constitute a part of the individual lists. The same thing applies for other, succeeding lists.

The structure of the fruit price list "fruitlist" includes elements "item," and each element "item" is constituted by elements "name" and "price." The element "name" includes as its contents, character data (#PCDATA), and the element "price" includes as its contents, character data (#PCDATA). The element "price" has an attribute "currency," in which CDATA data are included.

The document "fruitlist" includes four elements "item," and for each item, a fruit name (apples, oranges, bananas, or grapes) and a price are provided, the price unit being provided as an attribute.

FIG. 23 is a diagram showing an example base display rule (first display rule) that is generated by using "3.1.1. Generation of the first display rule using a header element and a DL element," so as to generate a display document for displaying the document "fruitlist." The document list in FIG. 23 is the XSL document list. The first display rule can be generated by the other method described above.

For "3.1.1. Generation of the first display rule using a header element and a DL element," the default generation rule is employed according to which the level of the header element is incremented in accordance with the depth of the elements of the document, and the element attribute is displayed by using the DL element. Thus, the element name of the root element "fruitlist" is displayed with the header <H1>, which has a level of 1 (200), and the element name of the element "item" located below the element "fruitlist" is displayed with the header <H2>, which has a level of 2 (201).

In FIG. 23, the numerals within the parentheses to which the left pointing arrows are prefixed, such as "←(200)," are used as references, and do not constitute a part of the list. The same thing applies to other, succeeding lists.

The element names of the elements "name" and "price" that are located below the element "item" are displayed with the header <H3>, which has a level of 3 (202 and 203). The contents of the elements "name" and "price" are enclosed by headers and are displayed as paragraphs (204 and 205).

Since the element "price" has an attribute, the attribute name is enclosed by the <DT> tag while the definition term is displayed (206), and the attribute value is enclosed by the <DD> tag while the explanation of the definition is displayed (207). Since the other "items" are generated in the same manner, no explanation for them will be given.

FIG. 24 is a diagram in which an HTML document is shown as an example display document (first display document 30) in order to display the structured document "fruitlist" by using the display rule.

For the first element "item," "apples" is displayed as the contents of the element "name" (208), "100" is displayed as the contents of the element "price" (209), and "Yen" is displayed as the contents of the attribute of the element "price" (210). Since the other elements "item" are displayed in the same manner, even though the contents differ, no explanation for them will be given.

FIG. 25 is a diagram showing an example list of the contents that are recorded when the first display document is generated in the element correlation file 31, which is prepared by the display document generation means 22.

In this case, the XPath is employed to specify the relationship between the individual elements. Among the elements "item" of the root element "fruitlist," the name of the element "name" of the first "item" is "/fruitlist[1]/item[1]/name[1]," and the corresponding display element is "/HTML[1]/BODY[1]/DIV[1]/DIV[1]/DIV[1]/P[1]" (211). Since the other elements are specified in the same manners, no explanation for them will be given.

Figure 26:
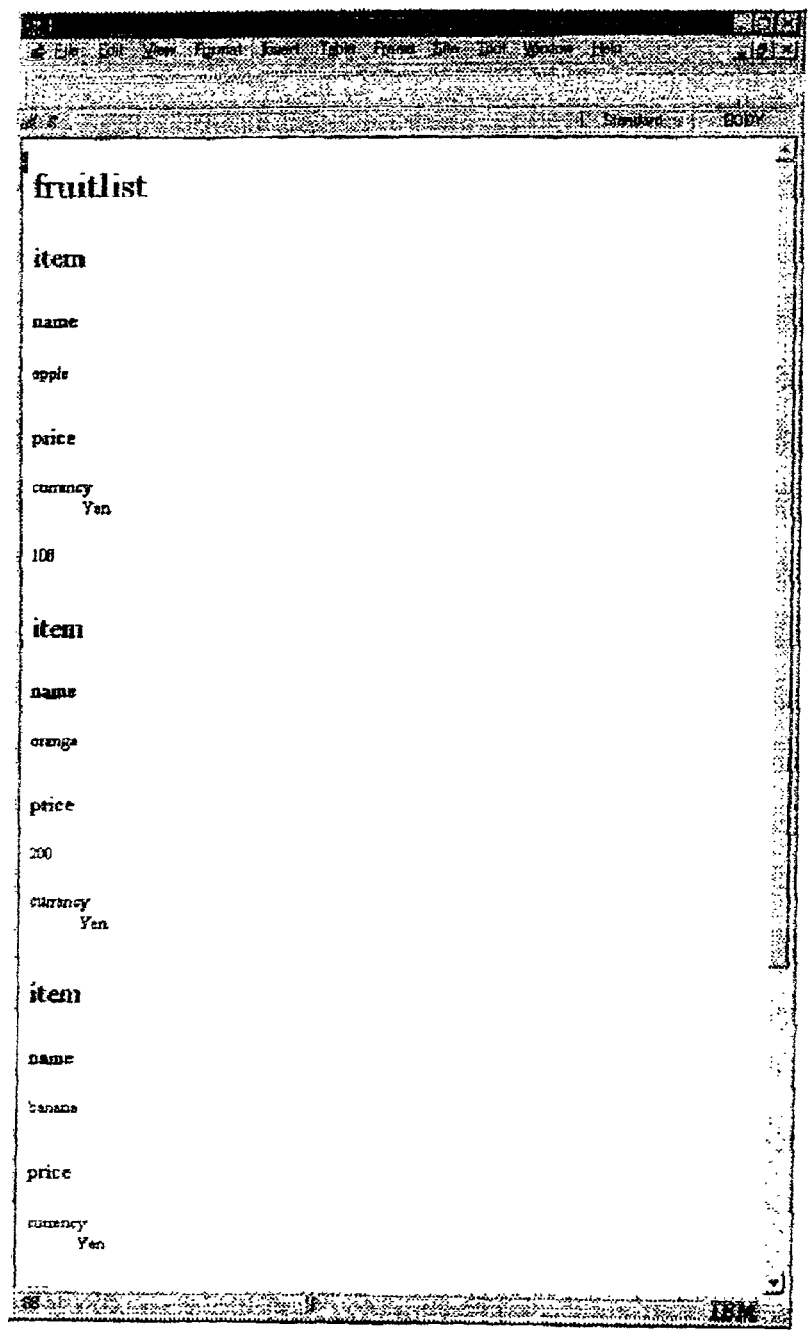
FIG. 26 is a diagram showing a display screen for the HTML document in FIG. 24.

FIG. 26 is a diagram showing the screen of the display device 7 on which the HTML document in FIG. 24 is displayed using the drawing engine 25.

While viewing this screen, the user employs an input device, such as the mouse 9 or the keyboard 6, to edit the HTML document in the display document visual editing environment 23. In this case, "currency Yen" and "200" of "oranges" are exchanged. That is, currency
  Yen
  200
are changed to
  200
  currency
  Yen.

Figure 27:
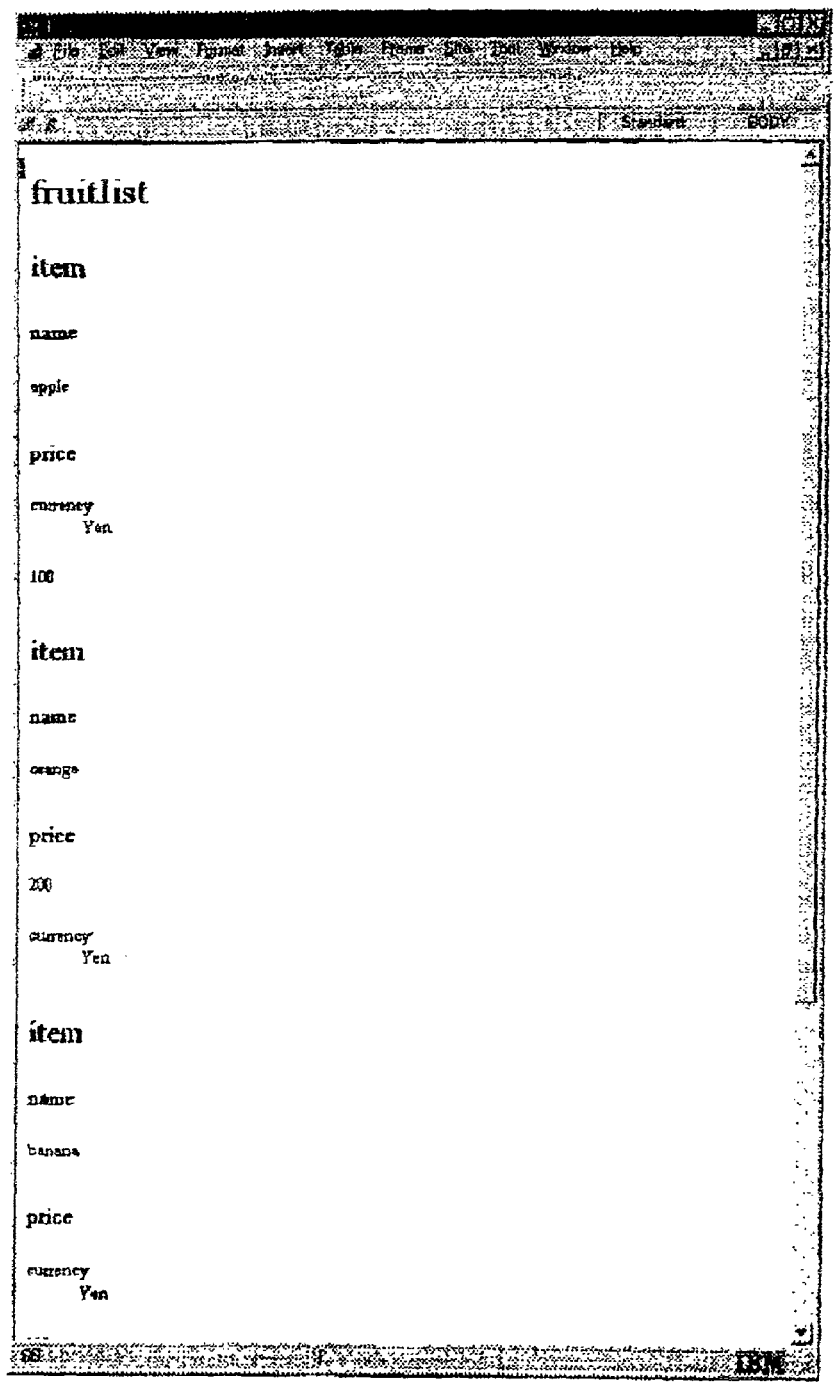
FIG. 27 is a diagram showing a display screen after the HTML document in FIG. 26 has been edited.

This change is carried out by an editing sequence that is used to delete "200" and copy it to a paste buffer, and to remove "200" from the paste buffer and insert it into a position preceding that of "currency." The display screen after this editing is performed is shown in FIG. 27. The contents of the element "price" of the element "item" to which "oranges" belongs are changed so that they are displayed above the attribute display.

When the editing operation is thereafter terminated, the display rule updating means 24 generates the second display rule 34. The display rule updating means 24 compares the HTML document before editing with the HTML document after editing, and detects the performance of the deletion and the addition of the element. However, whether in the XML document the added "200" is a fixed character string "200" or the price data "200" for "oranges" can not be determined merely by a comparison of the two HTML documents. Thus, the display rule updating means 24 examines the editing operation history file 33, and from this examination ascertains that the added "200" is the pasting in the document of a character string that was previously deleted and that is the price data for "oranges" in the XML document, and that, therefore, the operation sequence was performed to change the position for the display of the price for the "oranges."

Specifically, in the history file 33, the operation for the insertion of "200" is identified as an insertion performed using the paste buffer, and the history file 33 is traced backward to find an operation for the copying of data to the paste buffer. This process corresponds to steps 105 and 106 in the above described processing.

Since the operation consists of the deletion of the element, the XPath of the element is obtained from the operation history. In other words, correlation with the operation for the display element is obtained. This process corresponds to step 107, above. The XPath in this case is "/HTML[1]/BODY[1]/DIV[1]/DIV[2]/DIV[2]/P[1]."

The element relationship between the XML document and the HTML document is employed to acquire the XPath of the element in the XML document to which the pertinent element corresponds. This process corresponds to step 102 (steps 109 to 115). The XPath in this case is "/fruitlist[1]/item[2]/price[1]."

In the XSL that is a base, the portion corresponding to "/fruitlist[1]/item[2]/price[1]" is changed in accordance with the structure of the HTML document that has been changed. This process corresponds to step 104 (steps 123 to 125).

The XSL document (display rule) is updated in this manner, and the second display rule 34 is generated. FIG. 28 is a list showing the updated XSL document. As is indicated by (212) in FIG. 28, the contents of the "price" of the second "item" are changed for display before the attribute, in accordance with the operation (cut-and-paste). It should be noted that not merely is the display position for "200" changed, but that the display position for the contents of the element "price" for the second "item" is also changed. As is described above, since the display rule for the structured document is updated according to this invention, the updated display rule (the second display rule 34) can be employed for another structured document that matches the structure, so that it also can be displayed by reflecting the editing results.

Figure 29:
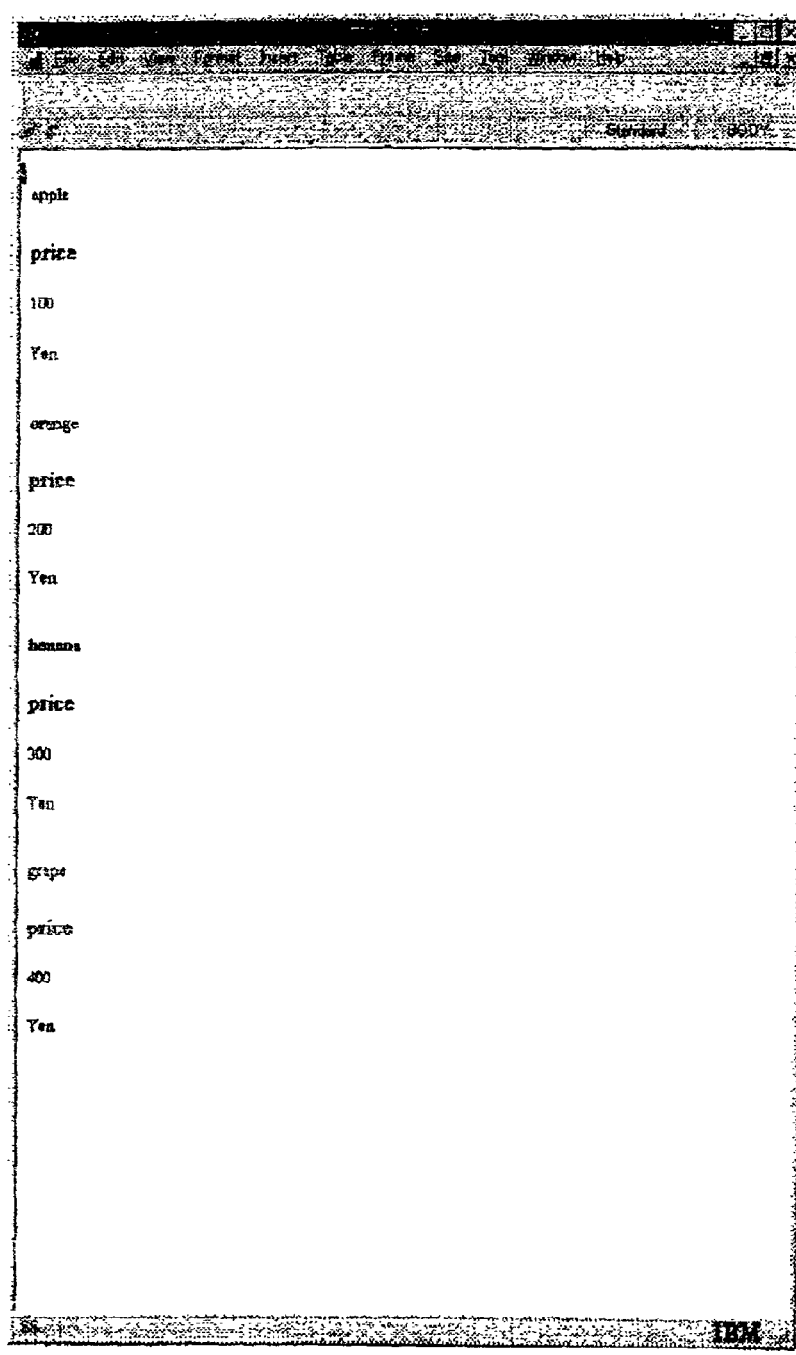
FIG. 29 is a diagram showing a display screen after additional editing is performed for the screen in FIG. 27.

An explanation will now be given for a case wherein another display element is deleted. The elements "item," "name" and "currency" are deleted, and the <DL> <DT> and <DD> elements are removed to change a definition list display into a paragraph element display. The same alteration is performed for "apples," "bananas" and "grapes." Further, the "fruitlist" display is deleted so it can be changed into a simple display. FIG. 29 is a diagram showing the resultant display screen, and FIG. 30 is a diagram showing the list for the HTML document in this case. In the HTML document, tags and elements for the erased display elements are deleted, and "Yen" is changed from the <DD> element into a paragraph element (213).

In accordance with the operation history, the display rule updating means 24 generates the XSL document shown in FIG. 31. FIG. 31 is a diagram showing the XSL document list indicating the display rule that is updated. When the updated XSL document is employed, the same HTML document as that provided by the editing can be obtained from the XML document. In addition, while confirming the editing results, the user can sequentially obtain an XML document that matches the editing operation.

4.2. Coupling of Elements

Figure 32:
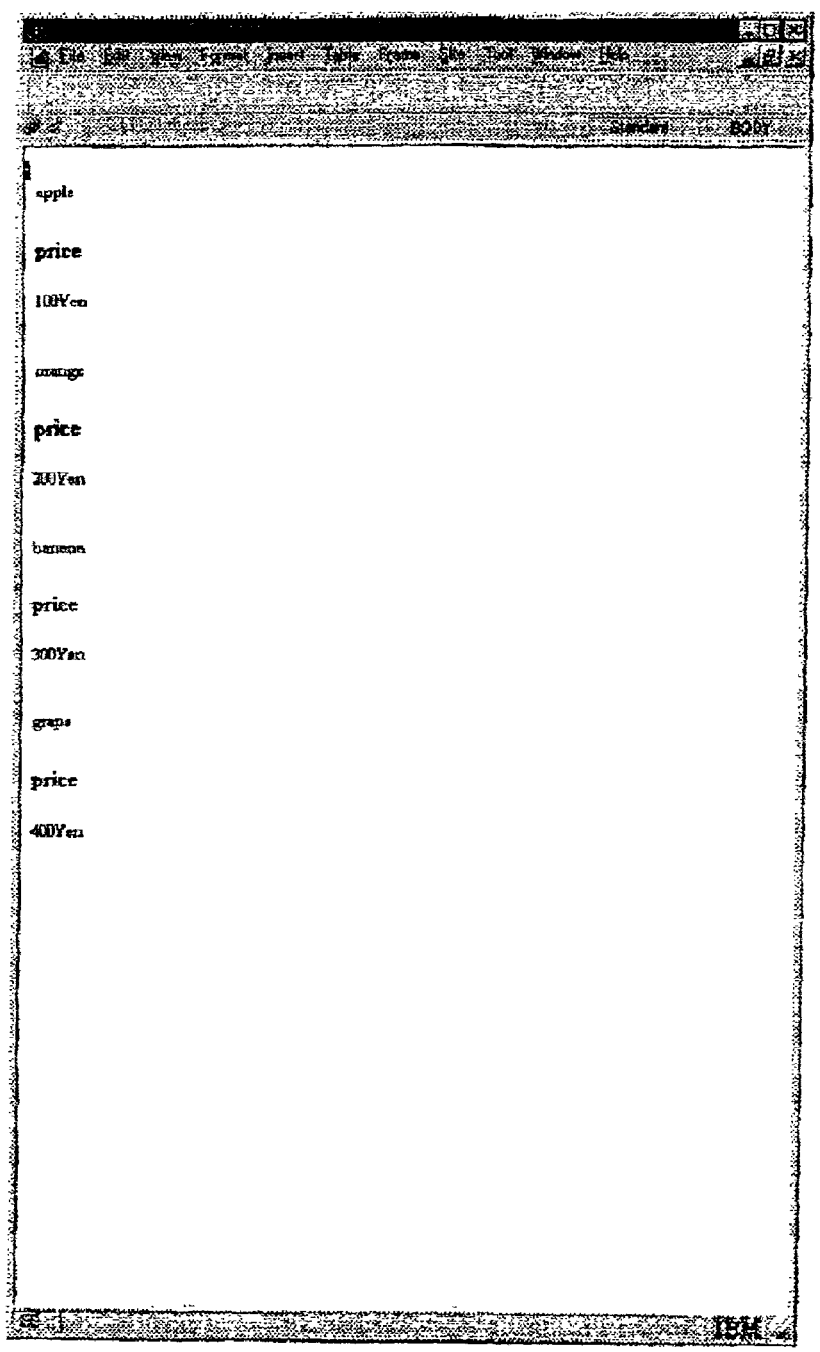
FIG. 32 is a diagram showing a display screen for explaining the coupling of elements after the editing operation is performed.

An example of the further editing of the HTML document in FIG. 30 will now be described. Assume that price "100" and currency "Yen" are coupled together in a character string element "100Yen," as is shown in FIG. 32, a diagram showing the display screen after the elements have been coupled. In FIG. 33 is shown the HTML document after the editing has been completed. The character string elements, such as "100Yen," are changed and are enclosed by tags (214).

The display rule updating means 24 changes the second display rule 34 by reflecting the alteration results. If the HTML document before the changes were effected was merely compared with the HTML document after the changes were completed, it could only be ascertained that the two elements "100" and "Yen" had been deleted and that a new element, "100Yen", had been inserted. However, since display rule updating means 24 of this invention can employ the element correlation (element correlation file 31) and the operation history (the editing operation history file 33), through the use of the following procedures it is possible to determine that the elements were coupled, one with the other.

Specifically, a record attesting to the creation of the element "100Yen" is present in the history. According to this record, "Yen" was connected to the end of the element "100" (/HTML[1]/BODY[1]/DIV[1]/DIV[1]/DIV[1]/P[1]) to create a new element, character string "100Yen" (corresponding to steps 105 and 106).

Then, the history is traced backward to establish the source of the character string "Yen." This examination reveals that an element "Yen" (/HTML[1]/BODY[1]/DIV[1]/DIV[1]/DlV[1]/P[2]) was removed and was subsequently connected to the end of the preceding element (step 107).

Next, element correlation is employed to obtain the XPath of the element in the XML document that corresponds to two elements (corresponding to step 102 (steps 109 to 115)), and the correlation "/fruitlist[1]/item[1]/price[1]" and "/fruitlist[1]/item[1]/price[1]/attribute::currency" is found.

Thus, it is determined which portion in the XSL document corresponds to two elements that have been joined together (step 104 (corresponding to steps 123 to 125)).

This operation can be implemented using the above described display rule updating method. The resultant, generated XSL document (the second display rule) is shown in FIG. 34.

4.3. Replacement of Elements

An explanation will now be given for a change in representation by the replacement of the display document. The correlation of the operation sequence for the replacement, the individual elements in the display document and the individual elements in the structured document is employed to extract, from the structured document, an element that can be assumed to be a replacement choice. Thereafter, a display rule is generated to instruct the condition determination and the replacement of the element.

Assume that an XML document for a PC (personal computer) product list is provided as an example structured document. The XML document for the product list is shown in FIG. 35A, its DTD is shown in FIG. 35B, and its XML Schema is shown in FIG. 35C. The product list includes two PCs (Japanese FreePC 750J, and US FreePC 600E). The individual product data consist of a name, a model, a price and a stock. The currency is defined as an attribute of the price.

The XSL document (the first display rule), which serves as a base, is generated by using the DTD and the XML Schema. The method in "3.1.1. Generation of the first display rule using a header element and a DL element" is employed for this document generation.

Figure 38:
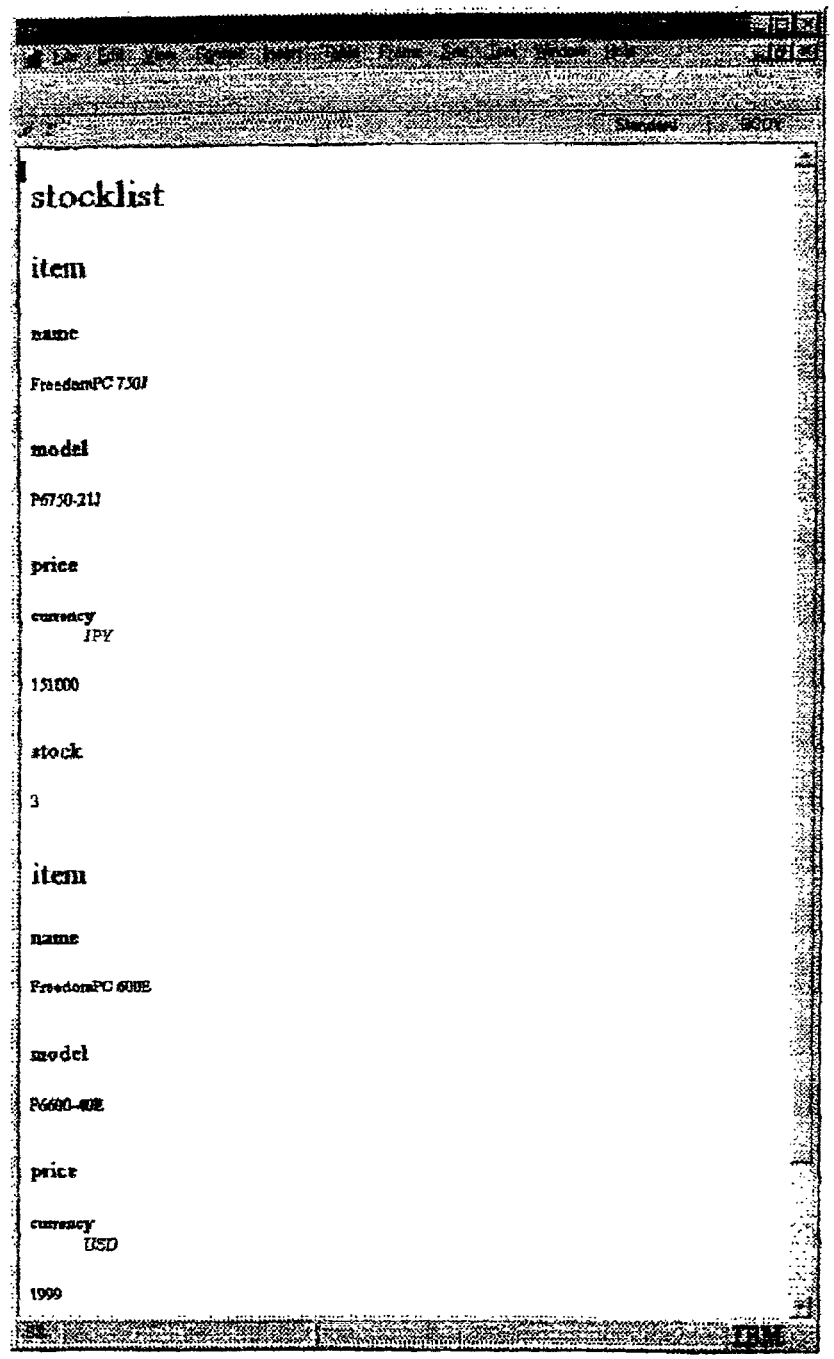
FIG. 38 is a diagram showing a display screen for the HTML document in FIG. 37.

The generated XSL document is shown in FIG. 36, the HTML document obtained from the XSL document is shown in FIG. 37, and the display results are shown in FIG. 38.

Figure 39:
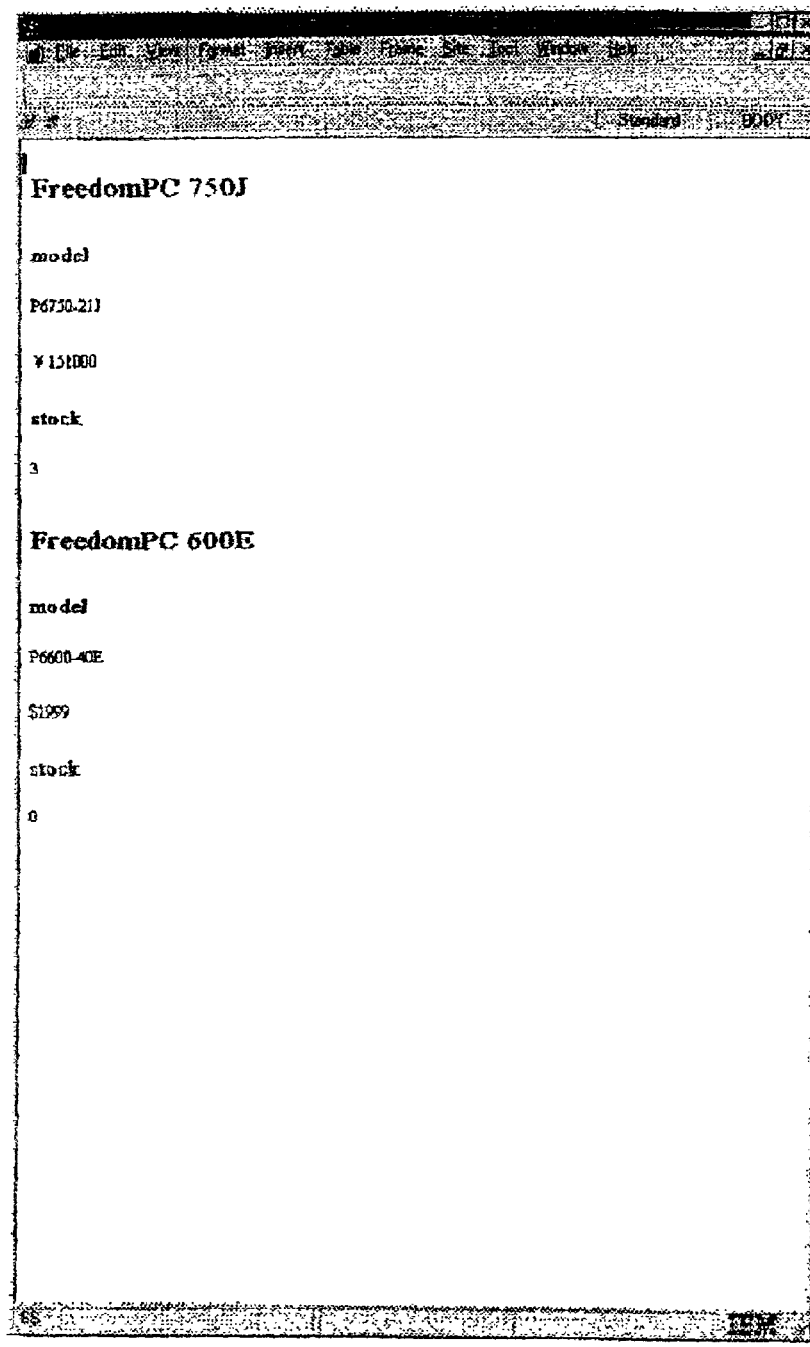
FIG. 39 is a diagram showing a display screen after the editing operation is performed for the screen in FIG. 38.

Assume that the movement, the deletion or the coupling ("JPY"+"151000"→"JPY151000") of elements is performed for the HTML document, and that "JPY" and "USD" are respectively replaced with "¥" and "$" to change the representation of the currency. The editing results provided by the replacements are shown in FIG. 39, and the HTML document is shown in FIG. 40.

The HTML document (FIG. 37) before the replacements were performed merely to be compared with the HTML document (FIG. 40) after the replacements were performed, it could only be ascertained that the elements "JPY" and "151000" were deleted and that a new element "¥151000" was added. However, when the element correlation (the element correlation file 31) and the operation history (the editing operation history file 33) are employed, it can be ascertained that the representation of the elements in the XML document was changed as follows, while the movement and the deletion of the elements were performed in the same manner as described above.

The operation history (the editing operation history file 33) is employed to examine a record attesting to the fact that a new element ("¥151000" and "$1999"), one that was not present before the replacement process, was inserted into the HTML document. According to this record, it is ascertained that "JPY151000" (/HTML[1]/BODY[1]/DIV[1]/DIV[1]/DIV[2]) was deleted, and that "¥151000" was inserted (steps 105 and 106).

The data indicating that the operation that precipitated the deletion/insertion was the replacement "JPY"→"¥" are recorded in the history (step 107).

"¥151000" is divided into the portion (¥) that matches the replacement parameter and the other portion (151000). Since it is understood that "JPY151000" was formed by coupling the two elements "JPY" and "151000," it is ascertained that the element "JPY" was changed to "¥." The position of the element in the XML document that corresponds to "JPY" in the HTML document is obtained from the element correlation file 31 (steps 112 and 113). In this case, it is found that "/stocklist[1]/item[1]/price[1]/attribute::currency" is the element of the XML document.

The same process is performed for "USD"→"$," and the position of the element in the XML document that corresponds to "USD" in the HTML document, (/stocklist[1]/item[2]/price[1]/attribute::currency), is obtained.

The range that is designated for the replacement is obtained from the operation history, and it is confirmed that within that range two replacements have been effected and that included in that range are the individual XPaths. Therefore, it is ascertained that the two replacements consist of the operation sequence performed for the same purpose (steps 117 and 118).

A minimum XPath is prepared that can designate a target within the replacement range wherein all the XPaths are included. In this case, the minimum XPath is /stocklist[1]/ item/price[1]/attribute::currency. The portion in the XSL document that corresponds to the XPath is updated by using <xsl:choose>, <xsl:when> and <xsl:otherwise>, so that "¥" is output when the element contents are equal to "JPY" or that "$" is output when the element contents are equal to "USD," or that the unchanged element is output when the element contents are not equal to either one (steps 123 and 124).

Thus, the XSL document in FIG. 41 is obtained.

Figure 42:
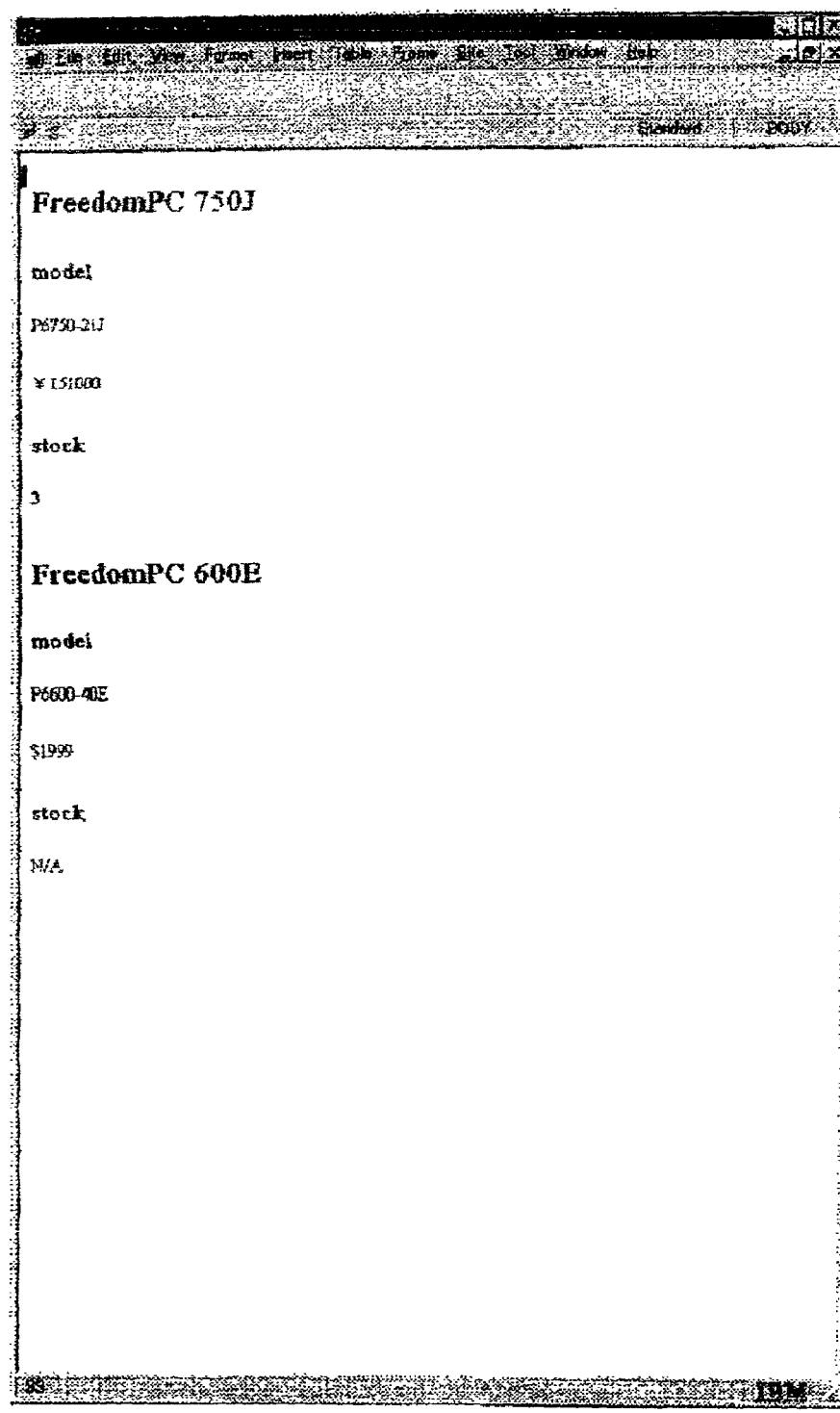
FIG. 42 is a diagram showing a display screen after additional editing is performed for the screen in FIG. 39.

When the stock count is 0, the character string is changed to "N/A." This, and the editing results provided by the replacement are shown in FIG. 42, while the display document (HTML document) is shown in FIG. 43. In this case, when a character string of "0s" is completely replaced using the "N/A" rule for the generation of the second display, the price "0s" would also be replaced, and this is not a valid function. Therefore, the character string should be selected and replaced interactively. The XSL document is updated using the same procedures, so that when the contents of /stocklist[1]/item/stock[1] are 0, the character string is changed to "N/A," and so that when the contents are not 0, the character string is output unchanged. The updated XSL document is shown in FIG. 44.

4.4. Employment of the Grammar Definition for a Structured Document

When the copying and the insertion, or the movement of an element in a document on the display is performed, the grammar definition information for the structured document, and the correlation between the elements of the display document and the elements of the structured document are employed to prepare a display rule for designating the attribute of an element.

Figure 45:
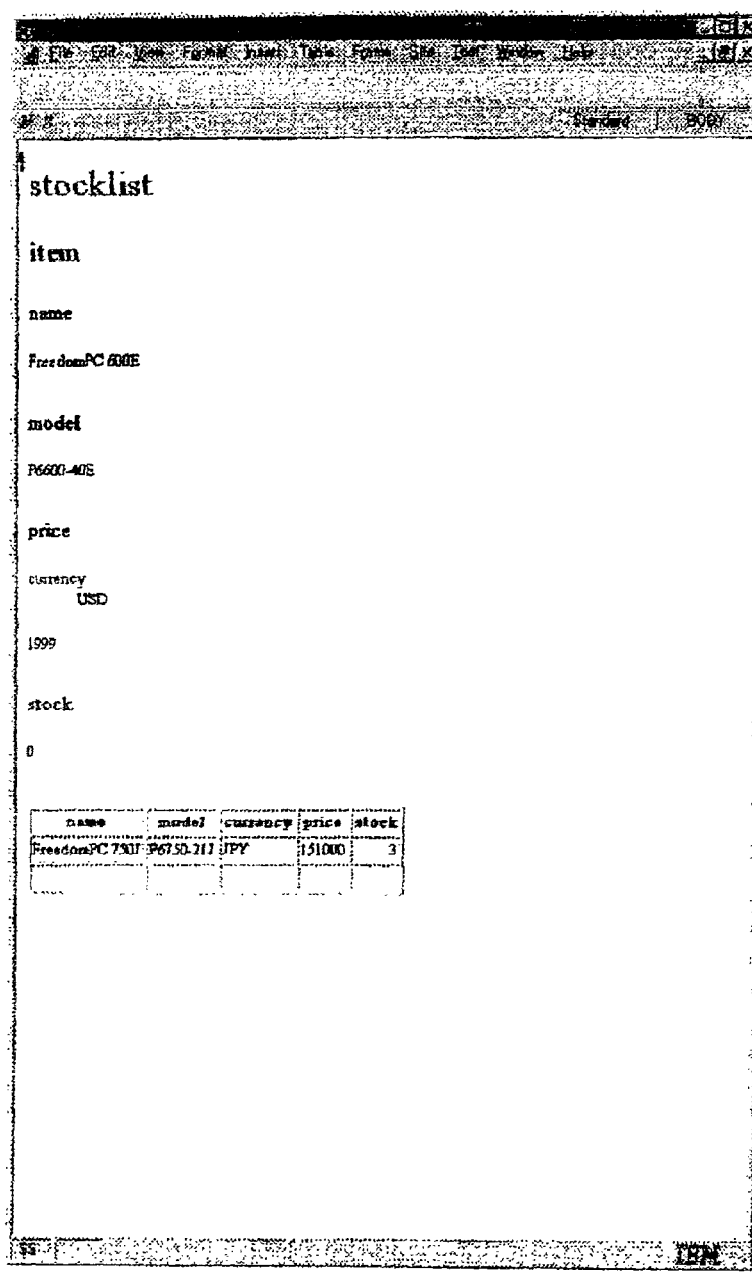
FIG. 45 is a diagram showing a display screen for explaining the employment of the grammar definition of a structured document after editing.

An explanation will now be given for an example wherein a new table is created based on the HTML document (FIG. 37) for the PC product lists that was changed using the XSL, which is the base, and wherein data are individually moved to the columns in the table. FIG. 45 is a diagram showing the editing results obtained by moving the first product data (Free PC 750J), and FIG. 46 is a diagram showing the thus provided HTML document.

For the price and the stock count, which are numerical data, the attribute is automatically provided when the entries are right adjusted. This process is performed in the following manner.

The operation history is examined when "151000" is inserted into the table, and it is found that "151000" is inserted from the paste buffer.

A backward trace of the operation history is performed and it is found that a cut and paste procedure was employed to copy the data to the table.

The XPath (/stocklist[1]/item[1]/price[1]) is obtained for the element in the XML document that corresponds to the element (/HTML[1]/BODY[1]/DIV[1]/DIV[1]/DIV[3]/P[1]) that was cut.

Then, the XML Schema is employed to examine the type of element that was cut, and it is found that the element was an integer, having a value equal to or greater than 0.

When the integer data are to be inserted into the TD element in the TABLE, the XSL document is updated so that the attribute ALIGN="RIGHT" is provided as a default.

Further, a new row is created for the entry of the next product data. Assume that this row is the same row as is used for the first product data. At this time, as is apparent from the XPath and the XML Schema that are assigned for the HTML document, the data type of the Xpath (/stocklist[1]/item[1]/name[1]/) in the first column is "string"; similarly, the data type in the second column is /stocklist[1]/item[1]/model[1]=string; the data type in the third column is /stocklist[1]/item[1]/price[1]/attribute::currency=string; the data type in the fourth column is /stocklist[1]/item[1]/price[1]=integer (>0); and the data type in the fifth column is /stocklist[1]/item[1]/stock[1]=integer (>0).

Therefore, when the cut and paste procedure is performed for the second product data, the erroneous positioning of the "model" data in the fourth column can be prevented.

As is described above, in the editing process for the HTML document, since the correlation with the elements of the XML document is employed even for the simple copying and movement of a character string, an editing operation in compliant with the data type can be performed.

Figure 47:
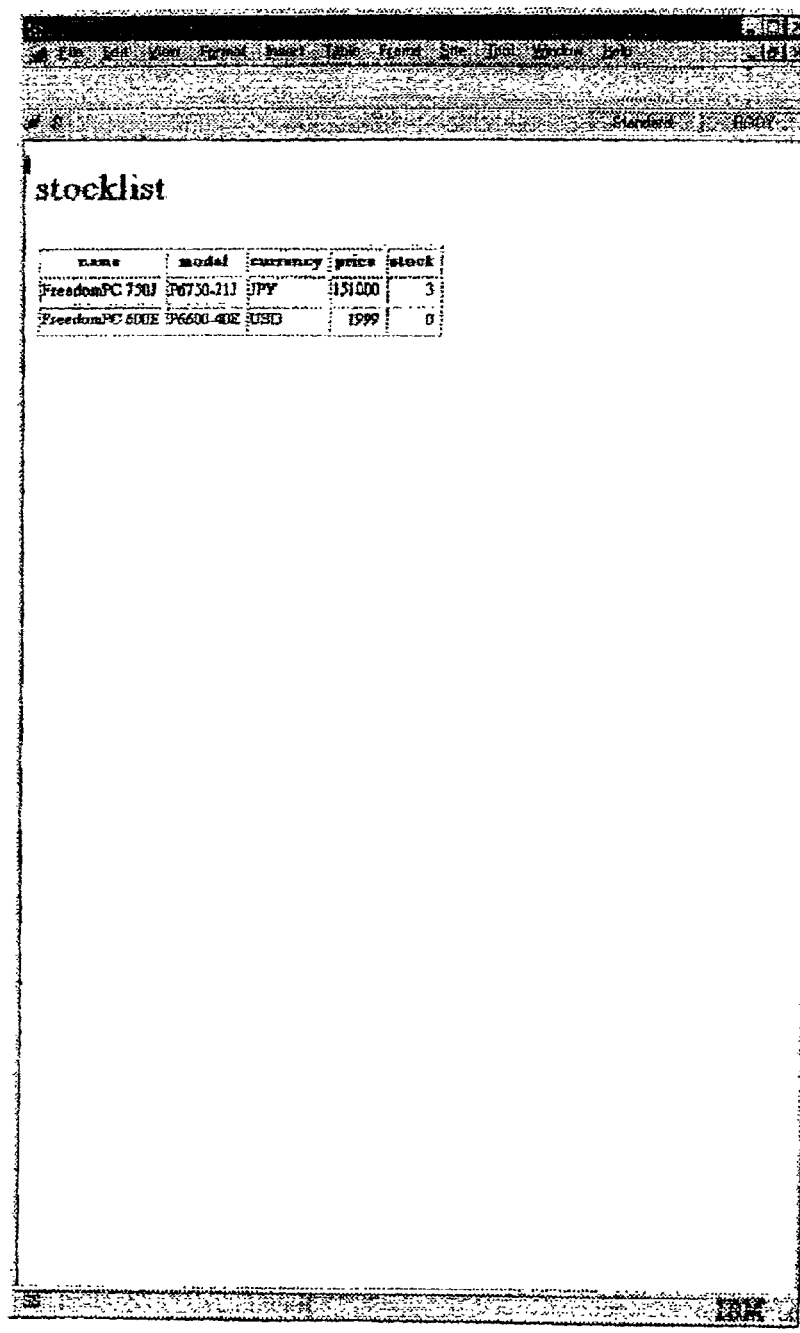
FIG. 47 is a diagram showing a screen after additional editing is performed for the screen in FIG. 45.

Through this operation, the final editing results shown in FIG. 47 are obtained, the HTML document in FIG. 48 is finally provided, and the XSL document in FIG. 49 is generated.

Figure 50:
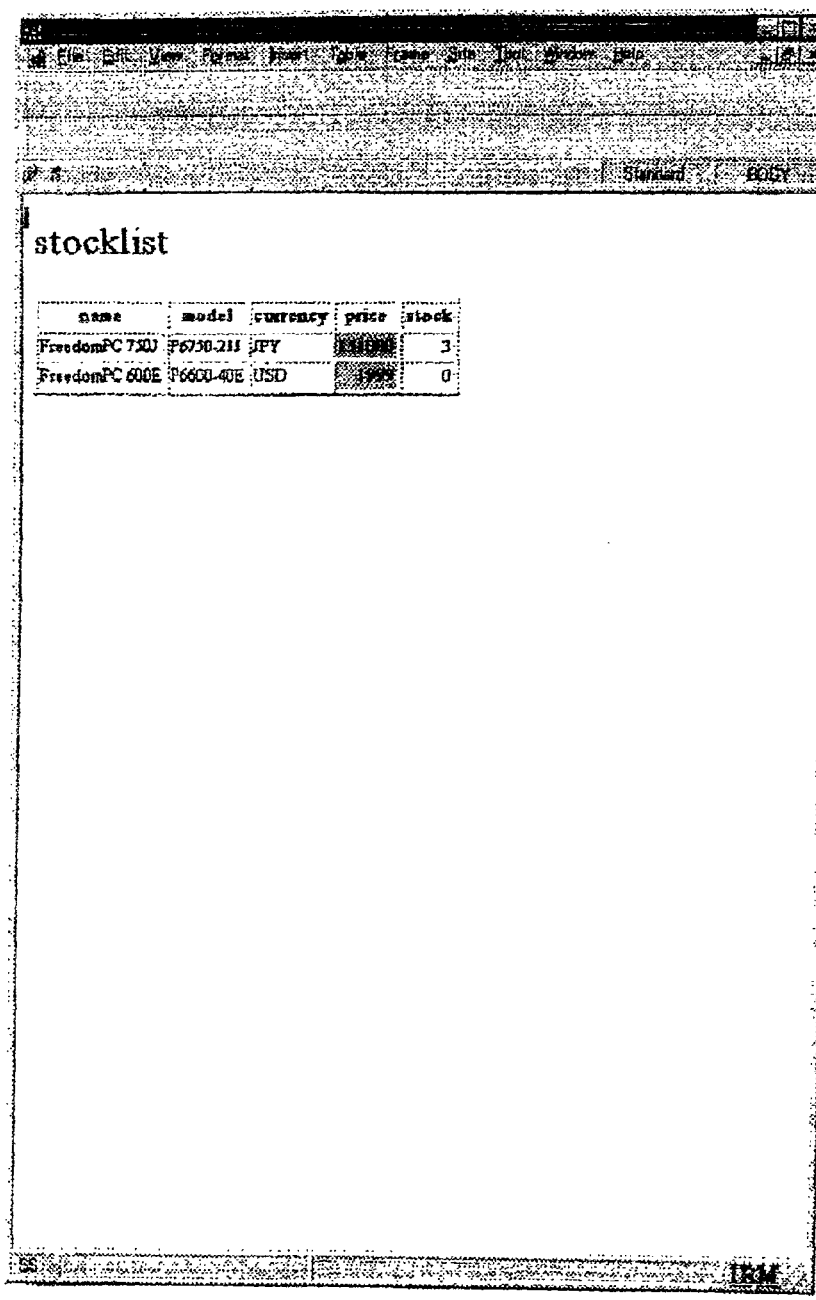
FIG. 50 is a diagram showing a display screen after additional editing is performed for the screen in FIG. 47.

When the characters in the price column are displayed in bold and the background color is changed, the edited results are as shown in FIG. 50. This operation is performed to prepare the HTML document in FIG. 51, and the same process as is described above is performed to obtain the XSL document in FIG. 52. That is, the editing operation of this invention can be applied not only for the movement, deletion, coupling and replacement of elements and the allocation of space in a table, but also for all other editing operations, including the editing of a character font, a character color, a background color and a background pattern.

4.5. Transform for an Unspecified Number of Elements by the Generalization of an Operation Sequence An operation sequence must be generalized in order to prepare an XSL document that can be applied for the replication of an unspecified number of elements, as in a product list. Specifically, a group of operation sequences for performing one element is extracted from the operation history, and is generalized. This process will now be described by employing an example (4.4.) for the preparation of a table for the PC product list.

Marks, for example, are provided for operation sequences in the operation history in order to locate a target operation sequence to be generalized. That is, a start mark and an end mark for the target operation sequence are provided for an operation stored in the history. For example, a start mark is provided when an operation is initiated for the movement of first product data to a table, and an end mark is provided when the operation is terminated.

For the first product data, it is apparent from the element correlation file 31 that the correlations shown in FIG. 53A are established for the elements of the HTML document and the XML document. An example generalization of the correlations will now be described.

First, a portion is used in common for the XPaths of the two documents. The common portions for the display document (HTML) and the structured document (XML) are as is shown in FIG. 53B.

From among these common portions, the repetitive portion axe that appears in the DTD/XML Schema is to be generalized. In this example, the last axe is a generalization target, and as a result, the XPath shown in FIG. 53C is obtained. If the axe data are generalized in all the TR elements "TR" and all the item elements "item," the results can not cope with a case wherein a start index is shifted. Thus, the instruction for the generalization of data following the first data is issued to obtain the results shown in FIG. 53C.

The generalized XPath is employed to create the correlations shown in FIG. 53D. From these correlations, <xsl:for-each> is generated for the transformation of a repetitive, unspecified number of elements, as is shown in FIG. 53E.

The XSL document generated using <xsl:for-each> is shown in FIG. 54. In this manner, the operation sequence can be generalized.

In sub-division "4 Specific example for a display rule generation method," the XML document was employed as a structured document; the DTD/XML Schema was employed as the document type definition; the XSL document was employed as the display rule; and the HTML document was employed as the display document. However, the present invention is not limited to these uses, and can be applied for other structured documents, other document type definitions, other display rules, and other display documents. This will be explained below.

5. Generation of a DSSSL Document for an SGML Document

An SGML (Standard Generalized Markup Language) document is employed as a structured document. And a DSSSL (Document Style Semantics and Specification Language) document is employed as a display rule for the SGML document.

For this example, an SGML document for a book list (booklist) is employed, and it is assumed that the document type of the book list is defined by using the DTD shown in FIG. 55A.

The example SGML document, written in accordance with the DTD is shown in FIG. 55B. Three books (Commentaries on the Gallic Wars, The Tale of Genji and the Odyssey) are entered in the SGML document.

For the SGML document, a DSSSL document in FIG. 56A is prepared as a base display rule. According to the base display rule, the entry (Booklist) is displayed as page rows, elements (in the Book) at the first level are displayed as paragraphs, and the other elements are displayed as data rows, with the elements on the second and the following rows being indented 20 points from the positions of the preceding elements. By applying this base display rule, the SGML document is displayed as in FIG. 56B.

The SGML document is then edited visually to display the title in italics, the author name in gothic and the page numbers in Courier, and the editing results in FIG. 56C are obtained. In accordance with the history of the editing operation, the DSSSL document in FIG. 56D is thereafter generated by the display rule updating means 24.

As is described above, the display rule generation method and system of the invention can be applied for an SGML/DSSSL document.

6. Preparation of a display rule for a CSV document

A CSV (Comma Separated Value) document, which is widely employed for data exchange by spreadsheet software, is employed as a structured document.

In this example, a data list for flight ticket prices and vacancies is employed, and the representation of the data list in the CSV form is shown in FIG. 57A. The elements on the individual lines respectively represent flight numbers, names of departure airports, departure times, names of destination airports, arrival times, fares, and vacancies.

The CSL (CSV Stylesheet Language) is uniquely defined as a display rule, and a rule for displaying a simple table in FIG. 57B is employed as an example base display rule using the CSL. The table form obtained by using the display rule is shown on the editing screen in FIG. 57C.

This table is now being edited. The header in the table is added to the first line, the flight number is changed to 12 points, the departure time and the arrival time are changed to gothic, and the fare and the number of vacancies are changed so they are right adjusted. The obtained display screen is shown in FIG. 58.

Based on this editing history, the display rule updating means 24 can generate a display rule in the CSL form shown in FIG. 59.

As is described above, the display rule generation method and the system of the invention can also be applied for the CSV document.

Embodiment 2

In the first embodiment, the example for the updating and the generation of a display rule for a structured document was explained. However, the editing history and results of the display document can be employed not only to generate a display rule, but also to change a structured document. An explanation will now be given for an example wherein the structured document is changed instead of the display rule.

The hardware configuration used for this embodiment is the same as that used in the first embodiment, and the system in this embodiment also has many portions that are the same as those for the system and the method of the first embodiment. Thus, only the characteristic portion for this embodiment will be described.

In this embodiment, the display rule can be generated by the "method for generating a first display rule." This display rule is fixed, and is not updated in accordance with the editing results. Further, the generation and editing of a display document can be performed in the same manner as described above.

The method for changing a structured document by using the editing history and the editing results (the second display document) is shown in FIG. 60. FIG. 60 is a flowchart for the overall method for changing a structured document.

Steps 101 and 102 are the same as explained in "3.4. Method for updating a display rule." In this embodiment, following steps 101 and 102, the structured document is changed (step 130).

Figure 61:
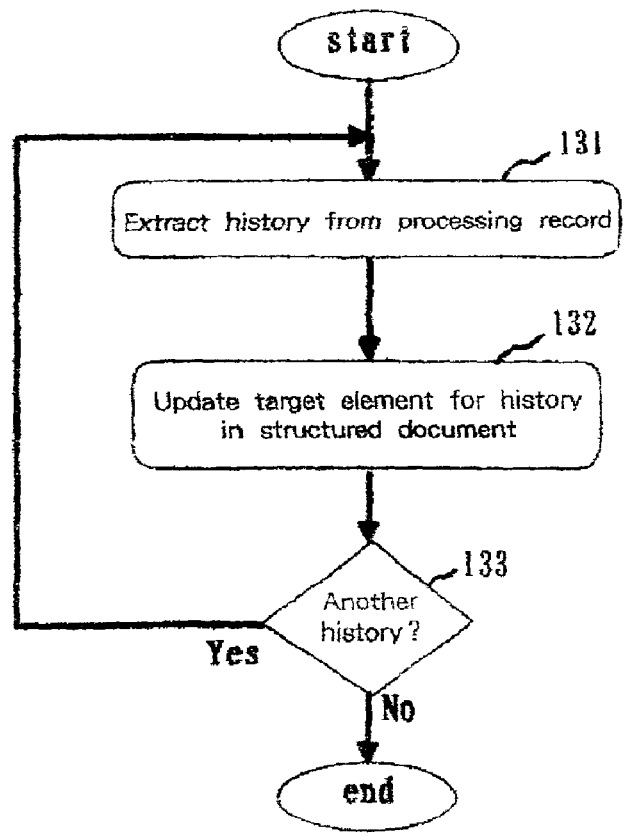
FIG. 61A is a flowchart showing the method for changing the structured document.
FIG. 61B is a diagram showing pseudo-code for the method in FIG. 61A.

FIG. 61A is a flowchart showing an example method for changing the structured document, and FIG. 61B is pseudo-code.

The history is extracted from the processing record (step 131, the second pseudo-code line), and a target element (the third pseudo-code line) for the history in the structured document is updated (step 132, the fourth and the fifth pseudo-code lines). This process is repeated for all the histories (step 133).

A specific example is shown below. First, a base display rule is generated. In this embodiment, a base display rule is generated by using the method explained in "3.1.2. Generation of the first display rule using a table."

The structured document for a price list of stationery is employed as an example. Assume that the DTD and the XML Schema in FIG. 62A are provided, and that a structured document written in accordance with the document type definition is provided, as shown in FIG. 62B. The base display rule shown in FIG. 63A is generated using the method explained in "3.1.2. Generation of the first display rule using a table," and the display document is displayed as is shown in FIG. 64.

Figure 64:
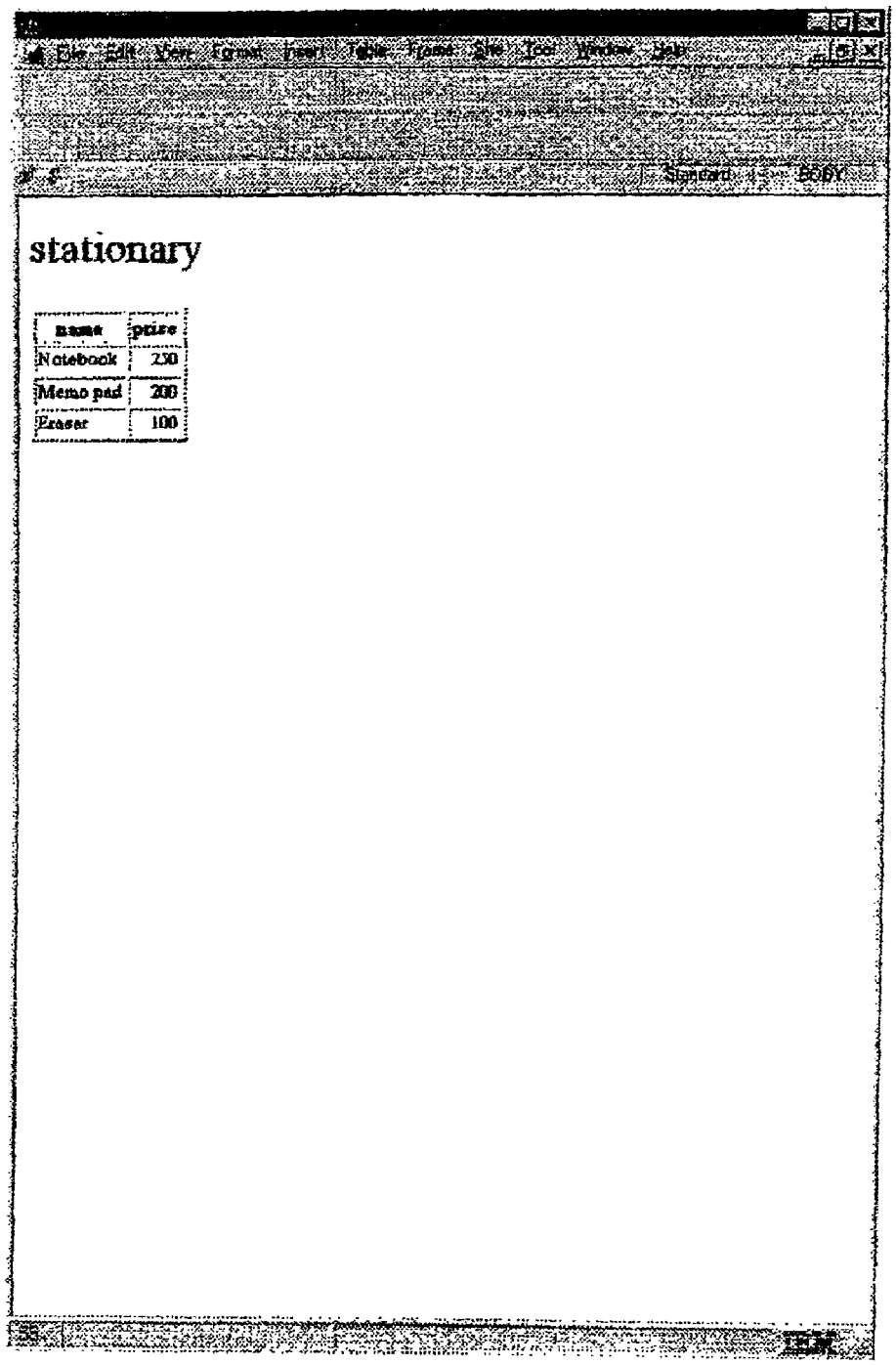
FIG. 64 is a diagram showing a display screen for the HTML document in FIG. 63B.
Figure 65:
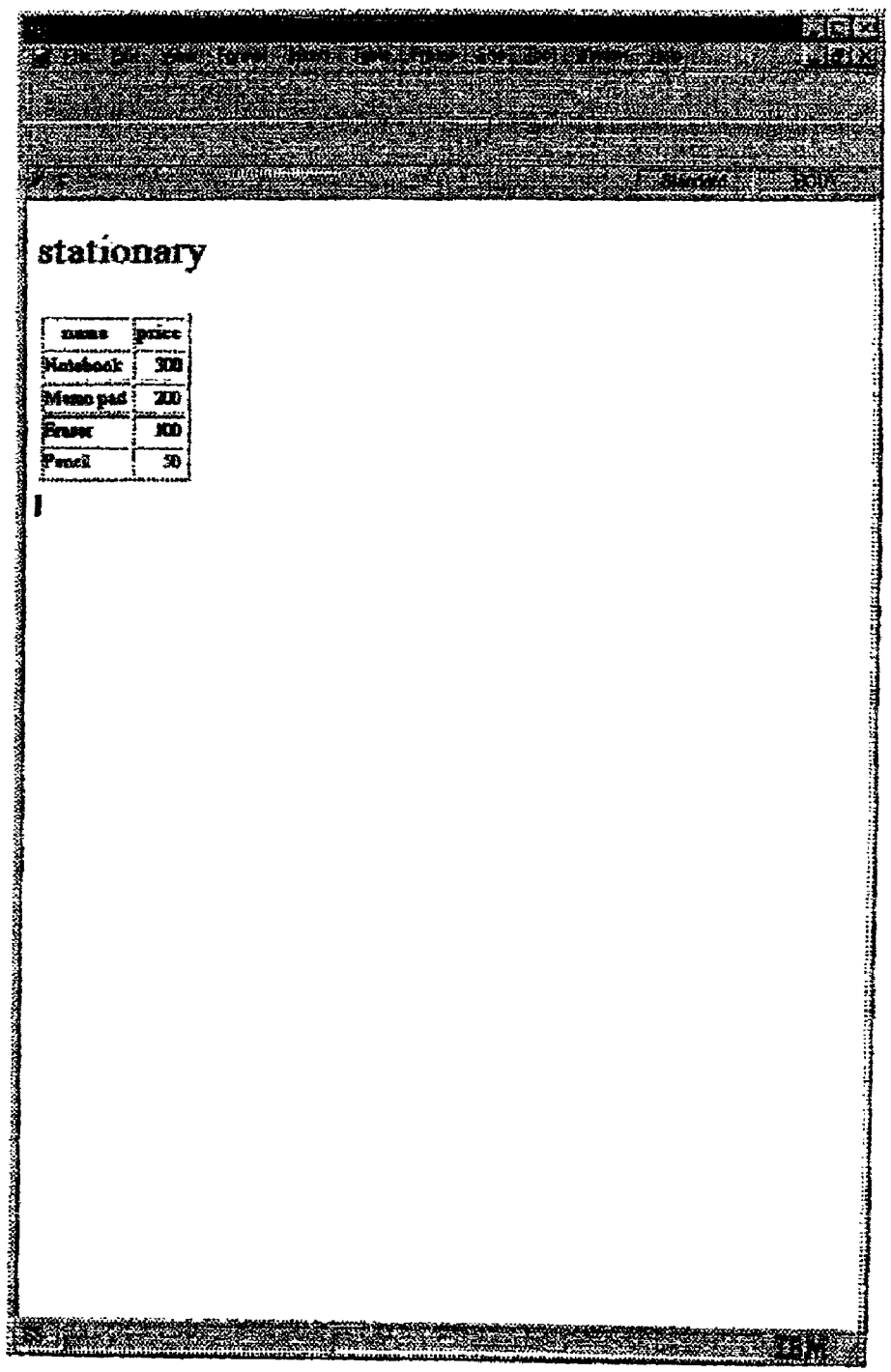
FIG. 65 is a diagram showing a display screen after the editing operation is performed for the screen in FIG. 64.

While watching the screen in FIG. 64, the user edits the display document to obtain the display in FIGS. 65. The editing contents are "change the price for Notebook from 250 to 300" and "add a new Pencil at a price of 50."

Figures 66, 67:
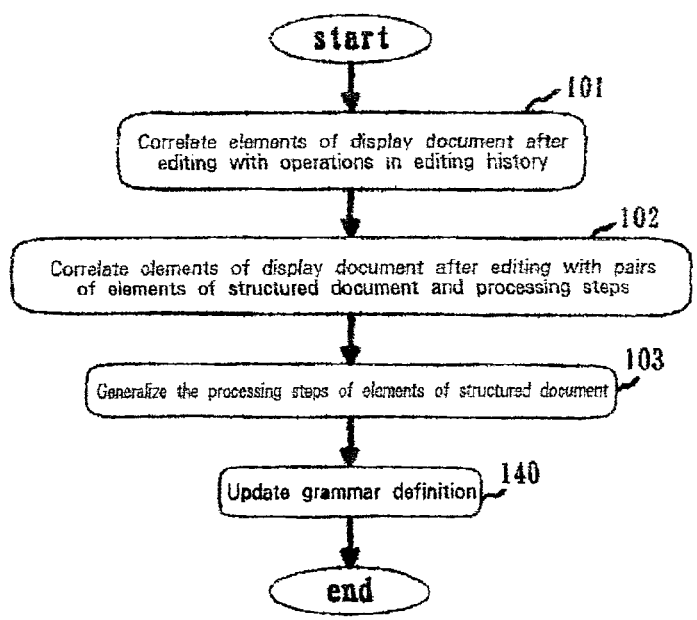
FIG. 66 is a diagram showing an XML document that is generated after the editing operation is performed for the screen in FIG. 65.
FIG. 67 is a flowchart showing an example method for changing the grammar definition of a structured document.

From the editing history and the display results, an XML document in FIG. 66 is obtained by the structured document changing method.

As is described above, according to the system and the method of the invention, the display document can be edited while the display screen is being viewed, and a structured document that reflects the editing contents can be automatically updated.

In this embodiment, the changing and the adding of an element has been employed as an example; however, deletion and movement can be performed in the same manner. Furthermore, a table form has been employed as an example display document; however, the structured document can be edited in the above described manner, during an editing operation using a base display rule, by employing a list for which the header and the DL element are used, simple enumeration, or indentation.

Embodiment 3

In addition, instead of generating a display rule, the editing history and the editing results of the display document can be employed to change the grammar definition of a structured document.

The hardware configuration used for this embodiment is the same as that used in the first embodiment, and the system in this embodiment also has many portions that are the same as those used for the system and the method of the first embodiment. Thus, only the characteristic portion for this embodiment will be described.

In this embodiment, a display rule is generated according to the "method for generating the first display rule." This display rule is fixed, and is not updated in accordance with the editing results. The generation and the editing of the display document can be performed in the same manner.

In FIG. 67 is shown the method for changing the grammar definition of the structured document by using the editing history and the editing results (the second display document). FIG. 67 is a flowchart showing the overall method employed for changing the grammar definition for a structured document.

Steps 101 to 103 are the same as those explained in "3.4. Method for updating a display rule." In this embodiment, following steps 101, 102 and 103, the grammar definition is updated (step 140).

Figure 68:
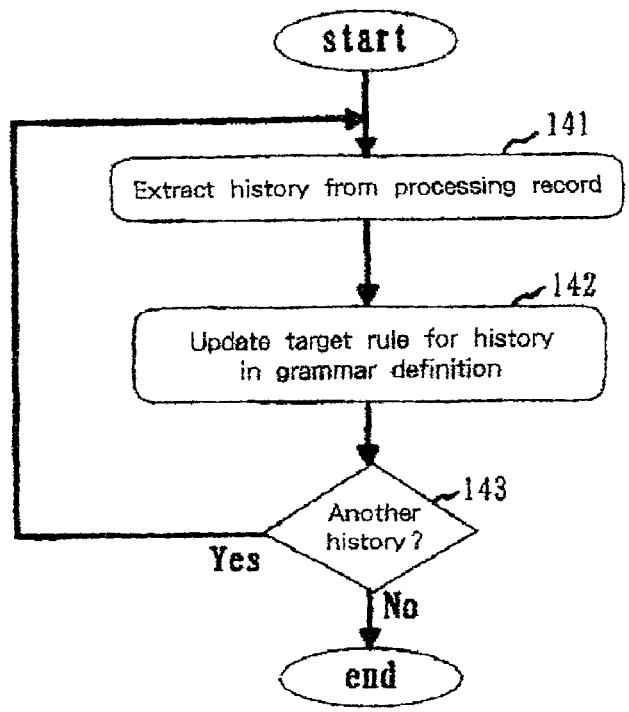
FIG. 68A is a flowchart showing an example method for updating the grammar definition.
FIG. 68B is a diagram showing pseudo-code for the method in FIG. 68A.

FIG. 68A is a flowchart showing an example method for updating the grammar definition, and FIG. 68B is pseudo-code.

First, the history is extracted from the processing record (step 141, the second pseudo-code line), and a target rule (the fourth and fifth pseudo-code lines) for the history in the grammar definition is updated (step 142, the eighth, the tenth and the thirteenth lines). This process is repeated for all the histories (step 133).

An explanation will be given for a specific example stationery price list as used in the second embodiment. Assume that the editing results shown in FIG. 65 are further edited to obtain the results shown in FIG. 69A. The editing contents are "add an entry 'color' to the second column of the table header" and "add the color of each stationery item to the second column in each row of the table."

From the editing history and results, the DTD, which is the grammar definition shown in FIG. 69B, is obtained by using the grammar definition changing method.

As is described above, according to the system and the method of the invention, the display document can be edited while the display screen is being viewed, and a grammar definition that reflects the editing contents can be automatically updated.

In this embodiment, the changing of an element has been employed as an example; however, the deletion and the movement can be performed in the same manner. Furthermore, although a table form has been employed as an example display document, during an editing operation, the grammar definition can be edited in the above described manner, using a base display rule, by employing a list using the header and the DL element, simple enumeration, or indentation.

Embodiment 4

In this embodiment, a specific example for the first display rule will be explained. In the above embodiments, the method for using the header element and the DL element to generate the first display rule, and the method for using a table to generate the first display rule have been explained using specific examples. In the fourth embodiment, an explanation will be given for specific examples of the method by which a simple enumeration is used to generate the first display rule, and of the method by which indentation is employed to generate the first display rule.

1. Generation of a base display rule using simple enumeration

Figure 71:
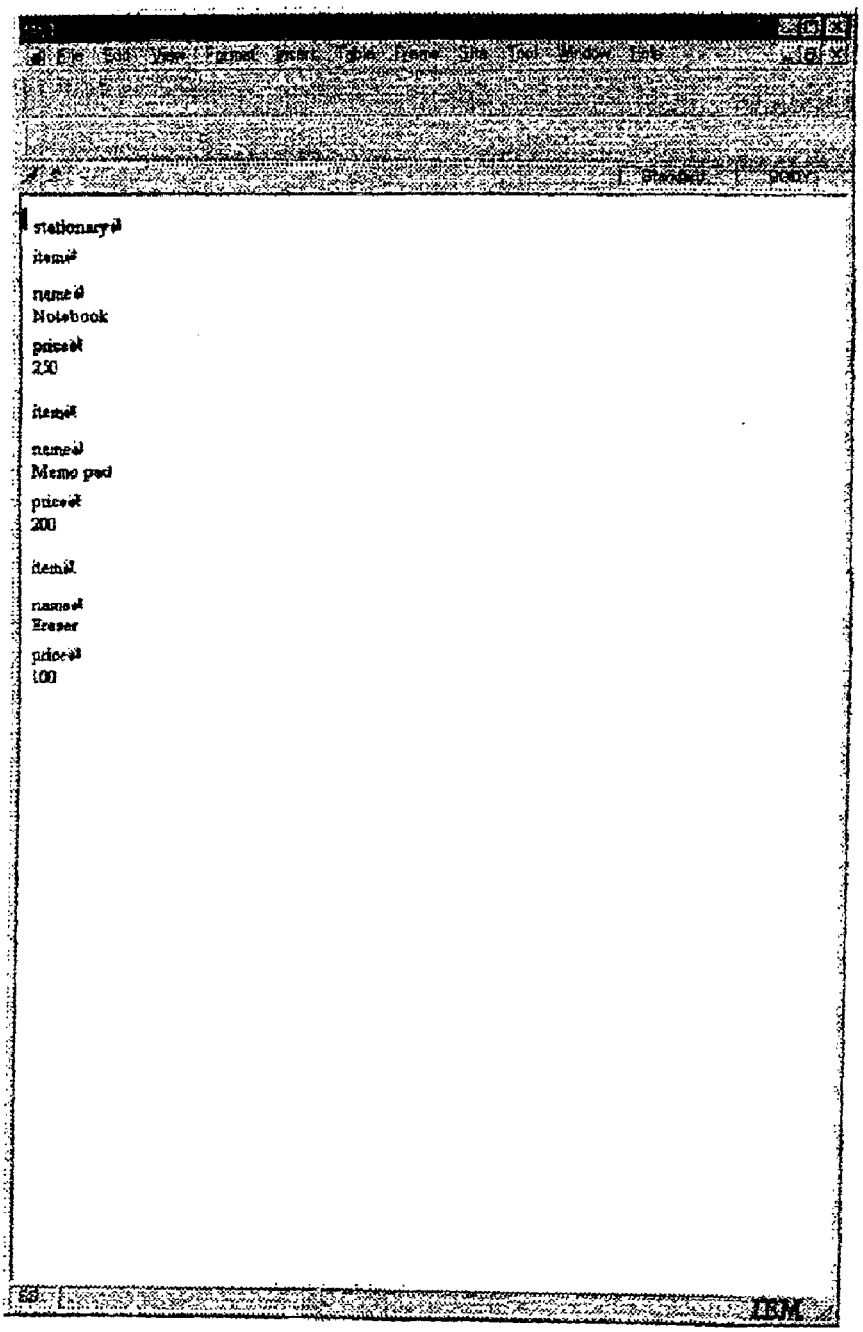
FIG. 71 is a diagram showing a display screen.

An explanation will now be given for a method for generating a display rule using the stationery price list (FIG. 62) employed for the third embodiment. A display rule shown in FIG. 70A is generated by using the method explained in "3.1.3. Generation of the first display rule by simple enumeration." According to the display rule, a display document shown in FIG. 70B is generated and is displayed as is shown in FIG. 71.

2. Generation of a base display rule using indentation

Figure 73:
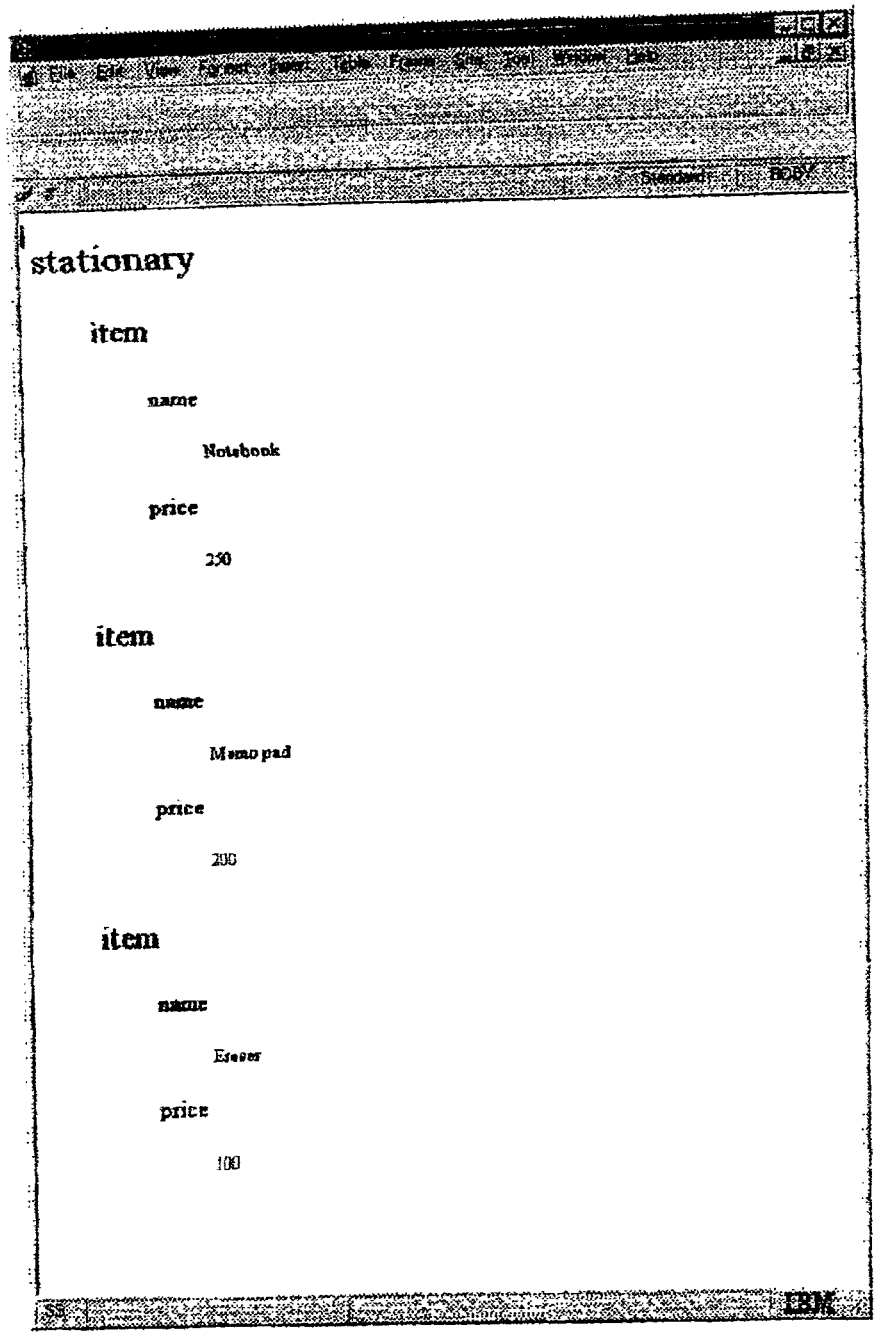
FIG. 73 is a diagram showing a display screen.

An explanation will now be given for a method for generating a display rule using the stationery price list (FIG. 62) employed for the third embodiment. A display rule shown in FIG. 72A is generated by using the method explained in "3.1.4. Generation of the first display rule by using indentation." According to the display rule, a display document shown in FIG. 72B is generated, and is displayed as is shown in FIG. 73.

The present invention has been specifically described during the course of the explanations given for the embodiments; however, the invention is not limited to these embodiments, and can be variously modified without departing from the scope of the invention.

For example, the base display rule (the first display rule) and the specific examples, as explained in the second to the fourth embodiments, may be employed for the first embodiment.

Further, the generation of the second display rule (the changing and the generation of the display rule) in the first embodiment and the changing of the structured document in the second embodiment may be employed together for the system and the method. Further, a combination of the first and the third embodiments, or a combination of the first to the third embodiments can also be employed.

In the above embodiments, character data have mainly been edited or processed. However, the present invention can also be applied for the editing and the processing of object display forms, such as image data or audio data, in addition to character data. The image data naturally include moving pictures.

The editing and processing explained in the above embodiments involved the deletion, the addition, the position changing, the coupling or the replacement of elements or of attributes. However, the present invention can also be applied for the changing and the correction of other display forms that is permitted in accordance with the language specifications in which the display rules are written. For example, the invention can be used for changing a character font, a color, a background and a size, and for changing and for correcting an image size, a scale, a list element, a link or a button element.

Furthermore, in the explanations for the above embodiment, mainly systems and methods have mainly been covered. However, since the functions of the systems and the methods are carried out by a computer-readable program, it is obvious that a storage medium on which the computer-readable program can be stored should be disclosed for the above embodiments. Such a storage medium is not only one that is incorporated in a storage device, such as a hard disk, but is also one that can be handled separately, such as a CD-ROM, a DVD-ROM, a flash memory or a floppy disk.

In conclusion, the following matters are disclosed that are related to the configuration of the present invention.

(1) A method for generating a display rule for a structured document comprising the steps of: employing a default generation rule and a document type definition for the structured document to generate a first display rule; employing the first display rule and the structured document to generate a first display document, and generating an element correlation file in which correlations between elements of the structured document and elements of the first display document are recorded; and editing the first display document in a document editing environment in order to generate a second display document, and generating an editing operation history file in which editing operations are recorded.

(2) The display rule generation method according to (1) further comprising the step of: generating a second display rule for the structured document by using the second display document, the editing operation history file, the element correlation file and the structured document.

(3) The display rule generation method according to (2), wherein the default generation rule is the correlation of the depth of each of the elements of the structured document with the level of a header element of the first display rule, the correlation of attributes of each of the elements of the structured document with definitions listed for the first display rule, and the correlation of values for each of the elements of the structured document with paragraph elements of the first display rule.

(4) The display rule generation method according to (2), wherein the default generation rule is the correlation of the values of the elements of the structured document with table elements of the first display rule.

(5) The display rule generation method according to (2), wherein the default generation rule is an addition of a return element of the first display rule to element names and values thereof in the structured document, and the simple enumeration of the element names and the values of the structured document.

(6) The display rule generation method according to (2), wherein the default generation rule is the correlation of the depth of each of the elements of the structured document with a block level of the first display rule, the correlation of the attribute of each of the elements of the structured document with the definition list of the first display rule, and the correlation of the value of each of the elements of the structured document with the paragraph element of the first display rule.

(7) The display rule generation method according to (2), wherein the step of generating a second display rule includes the steps of: extracting one element from the second display document, extracting an operating sequence concerning the extracted element from the editing operation history file, correlating the extracted element with the operating sequence, and executing the same process for all the other elements in the second display document; extracting one element from the second display document, extracting one operation from an operating sequence that corresponds to the extracted element, preparing editing records while correlating the contents of the extracted operation with a corresponding element of the structured document, executing the same process for all the operating sequences, and further executing the same process for all the other elements of the second display document; and extracting one element from elements in the editing records, updating a display rule for the extracted element to a rule that corresponds to the editing records, and executing the same process for all the other elements in the editing records.

(8) The display rule generation method according to (7), wherein the step of generating the second display rule includes the steps of: extracting one element from the second display document, selecting different element choices that belong to a structure that is the same as or similar to structure to which the extracted element belongs, examining the editing records to determine whether there is a common editing record for the different element choices, deleting the common editing record from all the element choices when the common editing record is present, generalizing the structure for all of the element choices, and executing the same process for all the other elements in the second display document.

(9) The display rule generation method according to (1) to (8), wherein the structured document and the display rule are an XML document and an XSL document, a SGML document and a DSSSL document, or a CSV document and an XML-based document.

(10) A method for changing a display rule for a structured document comprising the steps of: employing a default generation rule and a document type definition for the structured document to generate a first display rule; employing the first display rule and the structured document to generate a first display document, and generating an element correlation file in which correlations between elements of the structured document and elements of the first display document are recorded; editing the first display document in a document editing environment in order to generate a second display document, and generating an editing operation history file in which editing operations are recorded; and changing the structured document by using the second display document, the editing operation history file and the element correlation file, wherein the step of changing the structured document includes the steps of extracting one element from the second display document, extracting an operating sequence concerning the extracted element from the editing operation history file, correlating the extracted element with the operating sequence, and executing the same process for all the other elements in the second display document, extracting one element from the second display document, extracting one operation from an operating sequence that corresponds to the extracted element, preparing editing records while correlating the contents of the extracted operation with a corresponding element of the structured document, executing the same process for all the operating sequences, and further executing the same process for all the other elements of the second display document, and extracting one operation from the editing records, changing the element of the structured document related to the operation so as to match the operation, and executing the same process for all the operations in the editing records.

(11) A method for changing a document type definition for a structured document comprising the steps of: employing a default generation rule and a document type definition for the structured document to generate a first display rule; employing the first display rule and the structured document to generate a first display document, and generating an element correlation file in which correlations between elements of the structured document and elements of the first display document are recorded; editing the first display document in a document editing environment in order to generate a second display document, and generating an editing operation history file in which editing operations are recorded; and changing the document type definition for the structured document by using the second display document, the editing operation history file and the element correlation file, wherein the step of changing the document type definition for the structured document includes the steps of extracting one element from the second display document, extracting an operating sequence concerning the extracted element from the editing operation history file, correlating the extracted element with the operating sequence, and executing the same process for all the other elements in the second display document, extracting one element from the second display document, extracting one operation from an operating sequence that corresponds to the extracted element, preparing editing records while correlating the contents of the extracted operation with a corresponding element of the structured document, executing the same process for all the operating sequences, and further executing the same process for all the other elements of the second display document, and extracting one operation from the editing records, changing the document type definition for the structured document related to the operation so as to match the operation, and executing the same process for all the operations in the editing records.

(12) The document type definition changing method according to (11), wherein the step of changing the document type definition for the structured document includes the steps of: extracting one element from the second display document, selecting different element choices that belong to a structure that is the same as or similar to a structure to which the extracted element belongs, examining the editing records to determine whether there is a common editing record for the different element choices, deleting the common editing record from all the element choices when the common editing record is present, generalizing the structure for all of the element choices, and executing the same process for all the other elements in the second display document.

(13) A system for generating a display rule for a structured document comprising: means for employing a default generation rule and a document type definition for the structured document to generate a first display rule; means for employing the first display rule and the structured document to generate a first display document, and for generating an element correlation file in which correlations between elements of the structured document and elements of the first display document are recorded; and means for editing the first display document in a document editing environment in order to generate a second display document, and for generating an editing operation history file in which editing operations are recorded.

(14) The display rule generation system according to (13), further comprising: means for generating a second display rule for the structured document by using the second display document, the editing operation history file, the element correlation file and the structured document.

(15) The display rule generation system according to (14), wherein the default generation rule is the correlation of the depth of each of the elements of the structured document with the level of a header element of the first display rule, the correlation of attributes of each of the elements of the structured document with definitions listed for the first display rule, and the correlation of values for each of the elements of the structured document with paragraph elements of the first display rule.

(16) The display rule generation system according to (14), wherein the default generation rule is the correlation of the values of the elements of the structured document with table elements of the first display rule.

(17) The display rule generation system according to (14), wherein the default generation rule is an addition of a return element of the first display rule to element names and values thereof in the structured document, and the simple enumeration of the element names and the values of the structured document.

(18) The display rule generation system according to (14), wherein the default generation rule is the correlation of the depth of each of the elements of the structured document with a block level of the first display rule, the correlation of the attribute of each of the elements of the structured document with the definition list of the first display rule, and the correlation of the value of each of the elements of the structured document with the paragraph element of the first display rule.

(19) The display rule generation system according to (14), wherein the means for generating a second display rule includes: means for extracting one element from the second display document, for extracting an operating sequence concerning the extracted element from the editing operation history file, for correlating the extracted element with the operating sequence, and for executing the same process for all the other elements in the second display document; means for extracting one element from the second display document, for extracting one operation from an operating sequence that corresponds to the extracted element, for preparing editing records while correlating the contents of the extracted operation with a corresponding element of the structured document, for executing the same process for all the operating sequences, and for further executing the same process for all the other elements of the second display document; and means for extracting one element from elements in the editing records, for updating a display rule for the extracted element to a rule that corresponds to the editing records, and for executing the same process for all the other elements in the editing records.

(20) The display rule generation system according to (19), wherein the means for generating the second display rule includes: means for extracting one element from the second display document, for selecting different element choices that belong to a structure that is the same as or similar to a structure to which the extracted element belongs, for examining the editing records to determine whether there is a common editing record for the different element choices, for deleting the common editing record from all the element choices when the common editing record is present, for generalizing the structure for all of the element choices, and for executing the same process for all the other elements in the second display document.

(21) The display rule generation system according to (13) to (20), wherein the structured document and the display rule are an XML document and an XSL document, a SGML document and a DSSSL document, or a CSV document and an XML-based document.

(22) A system for changing a display rule for a structured document comprising: means for employing a default generation rule and a document type definition for the structured document to generate a first display rule; means for employing the first display rule and the structured document to generate a first display document, and for generating an element correlation file in which correlations between elements of the structured document and elements of the first display document are recorded; means for editing the first display document in a document editing environment in order to generate a second display document, and for generating an editing operation history file in which editing operations are recorded; and means for changing the structured document by using the second display document, the editing operation history file and the element correlation file, wherein the means for changing the structured document includes means for extracting one element from the second display document, for extracting an operating sequence concerning the extracted element from the editing operation history file, for correlating the extracted element with the operating sequence, and for executing the same process for all the other elements in the second display document, means for extracting one element from the second display document, for extracting one operation from an operating sequence that corresponds to the extracted element, for preparing editing records while correlating the contents of the extracted operation with a corresponding element of the structured document, for executing the same process for all the operating sequences, and for further executing the same process for all the other elements of the second display document, and means for extracting one operation from the editing records, for changing the element of the structured document related to the operation so as to match the operation, and for executing the same process for all the operations in the editing records.

(23) A system for changing a document type definition for a structured document comprising: means for employing a default generation rule and a document type definition for the structured document to generate a first display rule; means for employing the first display rule and the structured document to generate a first display document, and for generating an element correlation file in which correlations between elements of the structured document and elements of the first display document are recorded; means for editing the first display document in a document editing environment in order to generate a second display document, and for generating an editing operation history file in which editing operations are recorded; and means for changing the document type definition for the structured document by using the second display document, the editing operation history file and the element correlation file, wherein the means for changing the document type definition for the structured document includes means for extracting one element from the second display document, for extracting an operating sequence concerning the extracted element from the editing operation history file, for correlating the extracted element with the operating sequence, and for executing the same process for all the other elements in the second display document, means for extracting one element from the second display document, for extracting one operation from an operating sequence that corresponds to the extracted element, for preparing editing records while correlating the contents of the extracted operation with a corresponding element of the structured document, for executing the same process for all the operating sequences, and for further executing the same process for all the other elements of the second display document, and means for extracting one operation from the editing records, for changing the document type definition for the structured document related to the operation so as to match the operation, and for executing the same process for all the operations in the editing records.

(24) The document type definition changing system according to (23), wherein the means for changing the document type definition for the structured document includes: means for extracting one element from the second display document, for selecting different element choices that belong to a structure that is the same as or similar to a structure to which the extracted element belongs, for examining the editing records to determine whether there is a common editing record for the different element choices, for deleting the common editing record from all the element choices when the common editing record is present, for generalizing the structure for all of the element choices, and for executing the same process for all the other elements in the second display document.

(25) A storage medium on which program code for generating a display rule for a structured document is stored, the program code comprising: program code for employing a default generation rule and a document type definition for the structured document to generate a first display rule; program code for employing the first display rule and the structured document to generate a first display document, and for generating an element correlation file in which correlations between elements of the structured document and elements of the first display document are recorded; and program code for editing the first display document in a document editing environment in order to generate a second display document, and for generating an editing operation history file in which editing operations are recorded.

(26) The storage medium according to (25), wherein the program code further comprises: program code for generating a second display rule for the structured document by using the second display document, the editing operation history file, the element correlation file and the structured document.

(27) A storage medium according to (26), wherein the program code for generating a second display rule includes: program code for extracting one element from the second display document, for extracting an operating sequence concerning the extracted element from the editing operation history file, for correlating the extracted element with the operating sequence, and for executing the same process for all the other elements in the second display document; program code for extracting one element from the second display document, for extracting one operation from an operating sequence that corresponds to the extracted element, for preparing editing records while correlating the contents of the extracted operation with a corresponding element of the structured document, for executing the same process for all the operating sequences, and for further executing the same process for all the other elements of the second display document; and program code for extracting one element from elements in the editing records, for updating a display rule for the extracted element to a rule that corresponds to the editing records, and for executing the same process for all the other elements in the editing records.

(28) The storage medium according to (27), wherein the program code for generating the second display rule includes: program code for extracting one element from the second display document, for selecting different element choices that belong to a structure that is the same as or similar to a structure to which the extracted element belongs, for examining the editing records to determine whether there is a common editing record for the different element choices, for deleting the common editing record from all the element choices when the common editing record is present, for generalizing the structure for all of the element choices, and for executing the same process for all the other elements in the second display document.

(29) A storage medium on which program code for changing a display rule for a structured document is stored, the program code comprising: program code for employing a default generation rule and a document type definition for the structured document to generate a first display rule; program code for employing the first display rule and the structured document to generate a first display document, and for generating an element correlation file in which correlations between elements of the structured document and elements of the first display document are recorded; program code for editing the first display document in a document editing environment in order to generate a second display document, and for generating an editing operation history file in which editing operations are recorded; and program code for changing the structured document by using the second display document, the editing operation history file and the element correlation file, wherein the program code for changing the structured document includes program code for extracting one element from the second display document, for extracting an operating sequence concerning the extracted element from the editing operation history file, for correlating the extracted element with the operating sequence, and for executing the same process for all the other elements in the second display document, program code for extracting one element from the second display document, for extracting one operation from an operating sequence that corresponds to the extracted element, for preparing editing records while correlating the contents of the extracted operation with a corresponding element of the structured document, for executing the same process for all the operating sequences, and for further executing the same process for all the other elements of the second display document, and program code for extracting one operation from the editing records, for changing the element of the structured document related to the operation so as to match the operation, and for executing the same process for all the operations in the editing records.

(30) A storage medium on which program code for changing a document type definition for a structured document is stored, the program code comprising: program code for employing a default generation rule and a document type definition for the structured document to generate a first display rule; program code for employing the first display rule and the structured document to generate a first display document, and for generating an element correlation file in which correlations between elements of the structured document and elements of the first display document are recorded; program code for editing the first display document in a document editing environment in order to generate a second display document, and for generating an editing operation history file in which editing operations are recorded; and program code for changing the document type definition for the structured document by using the second display document, the editing operation history file and the element correlation file, wherein the program code for changing the document type definition for the structured document includes: program code for extracting one element from the second display document, for extracting an operating sequence concerning the extracted element from the editing operation history file, for correlating the extracted element with the operating sequence, and for executing the same process for all the other elements in the second display document; program code for extracting one element from the second display document, for extracting one operation from an operating sequence that corresponds to the extracted element, for preparing editing records while correlating the contents of the extracted operation with a corresponding element of the structured document, for executing the same process for all the operating sequences, and for further executing the same process for all the other elements of the second display document; and program code for extracting one operation from the editing records, for changing the document type definition for the structured document related to the operation so as to match the operation, and for executing the same process for all the operations in the editing records.

(31) The storage medium according to (30), wherein the program code for changing the document type definition for the structured document includes: program code for extracting one element from the second display document, for selecting different element choices that belong to a structure that is the same as or similar to a structure to which the extracted element belongs, for examining the editing records to determine whether there is a common editing record for the different element, for deleting the common editing record from all the element choices when the common editing record is present, for generalizing the structure for all of the element choices, and for executing the same process for all the other elements in the second display document.

The representative effects obtained by the present invention are as follows.

Automatically and visually, a display rule can be generated for a structured document based on an exemplary operation. Further, a display rule can be interactively generated, while it is gradually being corrected by confirming the resultant document on the display. In addition, a high-level display rule can be automatically generated by repeating successive corrections, without requiring a user to have any knowledge of the description language that is used to alter the display rule. Furthermore, a technique can be provided whereby a structured document or the document type definition (grammar definition) of the structured document can be changed based on changes applied to an exemplary document that is displayed, in the same manner as a display rule is generated.

What is claimed is:

1. A method for generating a display rule for a structured document comprising the steps of:
   employing a default generation rule and a document type definition for said structured document to generate a first display rule;
   employing said first display rule and said structured document to generate a first display document, and generating an element correlation file in which correlations between elements of said structured document and elements of said first display document are recorded;
   editing said first display document in a document editing environment in order to generate a second display document, and generating an editing operation history file in which editing operations are recorded; and
   generating a second display rule for said structured document by using said element correlation file and said structured document, and
   extracting one element from said second display document, selecting different element choices that belong to a structure that is the same as or similar to a structure to which said extracted element belongs, extracting an operating sequence concerning said extracted element from said editing operation history file, correlating said extracted element with said operating sequence, and executing the same process for all the other elements in said second display document;
   extracting one element from said second display document, extracting one operation from an operating sequence that corresponds to said extracted element, preparing editing records while correlating the contents of said extracted operation with a corresponding element of said structured document, executing the same process for all the operating sequences, and further executing the same process for all the other elements of said second display document; and
   extracting one element from elements in said editing record, examining said editing records to determine whether there is a common editing record for said different element choices, deleting said common editing record from all the element choices when said common editing record is present, updating a display rule for said extracted element to a rule that corresponds to said editing records, and executing the same process for all the other elements in said editing records.

2. The display rule generation method according to claim 1, wherein said default generation rule is the correlation of the depth of each of said elements of said structured document with the level of a header element of said first display rule, the correlation of attributes of each of said elements of said structured document with definitions listed for said first display rule, and the correlation of values for each of said elements of said structured document with paragraph elements of said first display rule.

3. The display rule generation method according to claim 1, wherein said default generation rule is the correlation of said values of said elements of said structured document with table elements of said first display rule.

4. The display rule generation method according to claim 1, wherein said default generation rule is an addition of are element of said first display rule to element names and values thereof in said structured document, and the simple enumeration of said element names and said values of said structured document.

5. The display rule generation method according to claim 1, wherein said default generation rule is the correlation of said depth of each of said elements of said structured document with a block level of said first display rule, the correlation of said attribute of each of said elements of said structured document with said definition list of said first display rule, and the correlation of said value of each of said elements of said structured document with said paragraph element of said first display rule.

6. The display rule generation method according to claim 1, wherein said structured document and said display rule are an XML document and an XSL document, a SGML document and a DSSSL document, or a CSV document and an XML-based document.

7. A method for changing a display rule for a structured document comprising the steps of:
   employing a default generation rule and a document type definition for said structured document to generate a first display rule;
   employing said first display rule and said structured document it to generate a first display document, and generating an element correlation file in which correlations between elements of said structured document and elements of said first display document are recorded;
   editing said first display document in a document editing environment in order to generate a second display document, and generating an editing operation history file in which editing operations are recorded; and
   changing said structured document by using said second display document, said editing operation history file and said element correlation file,
   wherein said step of changing said structured document includes the steps of
   extracting one element from said second display document, extracting an operating sequence concerning said extracted element from said editing operation history file,
   correlating said extracted element with said operating sequence, and executing the same process for all the other elements in said second display document,
   extracting one element from said second display document, extracting one operation from an operating sequence that corresponds to said extracted element, preparing editing records while correlating the contents of said extracted operation with a corresponding element of said structured document, executing the same process for all the operating sequences, and further executing the same process for all the other elements of said second display document, and extracting one operation from said editing records, changing said element of said structured document related to said operation so as to match said operation, and executing the same process for all the operations in said editing records.

8. A method for changing a document type definition for a structured document comprising the steps of:

employing a default generation rule and a document type definition for said structured document to generate a first display rule; employing said first display rule and said structured document to generate a first display document, and generating an element correlation file in which correlations between elements of said structured document and elements of said first display document are recorded;

editing said first display document in a document editing environment in order to generate a second display document, and generating an editing operation history file in which editing operations are recorded; and changing said document type definition for said structured document by using said second display document, said editing operation history file and said element correlation file, wherein said step of changing said document type definition for said structured document includes the steps of extracting one element from said second display document, extracting an operating sequence concerning said extracted element from said editing operation history file, correlating said extracted element with said operating sequence, and executing the same process for all the other elements in said second display document, extracting one element from said second display document, extracting one operation from an operating sequence that corresponds to said extracted element, preparing editing records while correlating the contents of said extracted operation with a corresponding element of said structured document, executing the same process for all the operating sequences, and further executing the same process for all the other elements of said second display document, extracting one element from said second display document, selecting different element choices that belong to a structure that is the same as or similar to a structure to which said extracted element belongs, examining said editing records to determine whether there is a common editing record for said different element choices, deleting said common editing record from all the element choices when said common editing record is present, generalizing said structure for all of said element choices, and executing the same process for all the other elements in said second display document; and extracting one operation from said editing records, changing said document type definition for said structured document related to said operation so as to match said operation, and executing the same process for all the operations in said editing records.

9. A system for generating a display rule for a structured document comprising:

means for employing a default generation rule and a document type definition for said structured document to generate a first display rule;

means for employing said first display rule and said structured document to generate a first display document, and for generating an element correlation file in which correlations between elements of said structured document and elements of said first display document are recorded; and means for editing said first display document in a document editing environment in order to generate a second display document, and for generating an editing operation history file in which editing operations are recorded; and means for generating a second display rule for said structure document by using said element correlation file and said structured document, and means for extracting one element from said second display document, selecting different element choices that belong to a structure that is the same as or similar to a structure to which said extracted element belongs, extracting an operating sequence concerning said extracted element from said editing operation history file, correlating said extracted element with said operating sequence, and executing the same process for all the other elements in said second display document;

means for extracting one element from said second display document, extracting one operation from an operating sequence that corresponds to said extracted element, preparing editing records while correlating the contents of said extracted operation with a corresponding element of said structured document, executing the same process for all the operating sequences, and further executing the same process for all the other elements of said second display document; and means for extracting one element from elements in said editing records, examining said editing records to determine whether there is a common editing record for said different element choices, deleting said common editing record from all the element choices when said common editing record is present, updating a display rule for said extracted element to a rule that corresponds to said editing records, and executing the same process for all the other elements in said editing records.

10. The display rule generation system according to claim 9, wherein said default generation rule is the correlation of the depth of each of said elements of said structured document with the level of a header element of said first display rule, the correlation of attributes of each of said elements of said structured document with definitions listed for said first display rule, and the correlation of values for each of said elements of said structured document with paragraph elements of said first display rule.

11. The display rule generation system according to claim 9, wherein said default generation rule is the correlation of said values of said elements of said structured document with table elements of said first display rule.

12. The display rule generation system according to claim 9, wherein said default generation rule is an addition of a return element of said first display rule to element names and values thereof in said structured document, and the simple enumeration of said element names and said values of said structured document.

13. The display rule generation system according to claim 9, wherein said default generation rule is the correlation of said depth of each of said elements of said structured document with a block level of said first display rule, the correlation of said attribute of each of said elements of said structured document with said definition list of said first display rule, and the correlation of said value of each of said elements of said structured document with said paragraph element of said first display rule.

14. The display rule generation system according to claim 9, wherein said structured document and said display rule are an XML document and an XSL document, a SGML document and a DSSSL document, or a CSV document and an XML-based document.

15. A system for changing a display rule for a structured document comprising: means for employing a default generation rule and a document type definition for said structured document to generate a first display rule; means for employing said first display rule and said structured document to generate a first display document, and for generating an element correlation file in which correlations between elements of said structured document and elements of said first display document are recorded; means for editing said first display document in a document editing environment in order to generate a second display document, and for generating an editing operation history file in which editing operations are recorded; and means for changing said structured document by using said second display document, said editing operation history file and said element correlation file, wherein said means for changing said structured document includes means for extracting one element from said second display document, for extracting an operating sequence concerning said extracted element from said editing operation history file, for correlation said extracted element with said operating sequence, and for executing the same process for all the other elements in said second display document, means for extracting one element from said second display document, for extracting one operation from an operating sequence that corresponds to said extracted element, for preparing editing records while correlating the contents of said extracted operation with a corresponding element of said structured document, for executing the same process for all the operating sequences, and for further executing the same process for all the other elements of said second display document, and means for extracting one operation from said editing records, for changing said element of said structured document related to said operation so as to match said operation, and for executing the same process for all the operations in said editing records.

16. A system for changing a document type definition for a structured document comprising:
    means for employing a default generation rule and a document type definition for said structured document to generate a first display rule;
    means for employing said first display rule and said structured document to generate a first display document, and for generating an element correlation file in which correlations between elements of said structured document and elements of said first display document are recorded;
    means for editing said first display document in a document editing environment in order to generate a second display document, and for generating an editing operation history file in which editing operations are recorded; and
    means for changing said document type definition for said structured document by using said second display document, said editing operation history file and said element correlation file,
    wherein said means for changing said document type definition for said structured document includes
        means for extracting one element from said second display document, for extracting an operating sequence concerning said extracted element from said editing operation history file, for correlating said extracted element with said operating sequence, and for executing the same process for all the other elements in said second display document,
        means for extracting one element from said second display document, for extracting one operation from an operating sequence that corresponds to said extracted element, for preparing editing records while correlating the contents of said extracted operation with a corresponding element of said structured document, for executing the same process for all the operating sequences, and for further executing the same process for all the other elements of said second display document,
        means for extracting one element from said second display document, for selecting different element choices that belong to a structure that is the same as or similar to a structure to which said extracted element belongs, for examining said editing records to determine whether there is a common editing record for said different element choices, for deleting said common editing record from all the element choices when said common editing record is present, for generalizing said structure for all of said element choices, and for executing the same process for all the other elements in said second display document and
        means for extracting one operation from said editing records, for changing said document type definition for said structured document related to said operation so as to match said operation, and for executing the same process for all the operations in said editing records.

17. A storage medium on which program code for generating a display rule for a structured document is stored, said program code comprising: program code for employing a default generation rule and a document type definition for said structured document to generate a first display rule; program code for employing said first display rule and said structured document to generate a first display document, and for generating an element correlation file in which correlations between elements of said structured document and elements of said first display document are recorded; and program code for editing said first display document in a document editing environment in order to generate a second display document, and for generating an editing operation history file in which editing operations are recorded for generating the display rule for the structured document by a method comprising the steps of:
    employing a default generation rule and a document type definition for said structured document to generate a first display rule;
    employing said first display rule and said structured document to generate a first display document, and generating an element correlation file in which correlations between elements of said structured document and elements of said first display document are recorded;
    editing said first display document in a document editing environment in order to generate a second display document, and generating an editing operation history file in which editing operations are recorded; and
    generating a second display rule for said structured document by using said element correlation file and said structured document, and extracting one element from said second display document, selecting different element choices that belong to a structure that is the same as or similar to a structure to which said extracted element belongs, extracting an operating sequence concerning said extracted element from said editing operation history file, correlating said extracted element with said operating sequence, and executing the same process for all the other elements in said second display document;

extracting one element from said second display document, extracting one operation from an operating sequence that corresponds to said extracted element, preparing editing records while correlating the contents of said extracted operation with a corresponding element of said structured document, executing the same process for all the operating sequences, and further executing the same process for all the other elements of said second display document; and extracting one element from elements in said editing records, examining said editing records to determine whether there is a common editing record for said different element choices, deleting said common editing record from all the element choices when said common editing record is present, updating a display rule for paid extracted element to a rule that corresponds to said editing records, and executing the same process for all the other elements in said editing records.

* * * * *